(12) United States Patent
Mor Yosef et al.

(10) Patent No.: US 11,330,887 B2
(45) Date of Patent: *May 17, 2022

(54) AUTOMATED NAIL POLISH APPLICATION APPARATUS

(71) Applicant: Nailomatic Ltd., Tel-Aviv (IL)

(72) Inventors: Avichay Mor Yosef, Jerusalem (IL); Ron Miller, Herzlia (IL); Gil Sokol, Tel-Aviv (IL); Omri Moran, Brooklyn, NY (US)

(73) Assignee: Nailomatic Ltd., Tel-Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/191,847

(22) Filed: Mar. 4, 2021

(65) Prior Publication Data
US 2021/0186177 A1 Jun. 24, 2021

Related U.S. Application Data

(63) Continuation of application No. 16/481,856, filed as application No. PCT/IL2018/050111 on Jan. 31, 2018, now Pat. No. 10,939,739.
(Continued)

(51) Int. Cl.
*H04N 1/00* (2006.01)
*A45D 29/18* (2006.01)
(Continued)

(52) U.S. Cl.
CPC ........... *A45D 29/18* (2013.01); *A45D 34/042* (2013.01); *A45D 34/045* (2013.01); *A46B 9/021* (2013.01);
(Continued)

(58) Field of Classification Search
None
See application file for complete search history.

(56) References Cited

U.S. PATENT DOCUMENTS 3,130,734 A ‡ 4/1964 Mcvay ................. A45D 29/004
132/74
3,292,642 A * 12/1966 Del Vecchio ........ A45D 40/262
132/73.6
(Continued)

FOREIGN PATENT DOCUMENTS

CN 85203506 ‡ 4/1986
CN 1277589 ‡ 12/2000
(Continued)

OTHER PUBLICATIONS

Invitation to Pay Additional Fees Dated May 4, 2018 From the International Searching Authority Re. Application No. PCT/IL2018/050109. (3 Pages).‡
(Continued)

*Primary Examiner* — Ted W Barnes

(57) ABSTRACT

A nail polish application apparatus, comprising a mounting element comprising a capsule compartment adapted to receive one or more capsules containing a nail polish fluid wherein the mounting element is moveable by actuator(s) in longitudinal axis crossing a nail polish applying space and in lateral axis perpendicular to the longitudinal axis and is rotatable by the actuator(s) around the longitudinal axis, a pressure applying element adapted to apply pressure on a body portion of the capsule(s) installed in the capsule compartment wherein the body portion defines a reservoir containing a nail polish fluid, the pressure builds an internal pressure in the reservoir forcing extrusion of the nail polish fluid to a nail polish applying element integrated with the capsule(s), sensor(s) adapted to generate sensory data depicting the nail polish applying space and a control unit adapted to operate the actuator(s) and the pressure according to analysis of the sensory data.

20 Claims, 33 Drawing Sheets

Related U.S. Application Data

(60) Provisional application No. 62/574,241, filed on Oct. 19, 2017, provisional application No. 62/533,720, filed on Jul. 18, 2017, provisional application No. 62/452,461, filed on Jan. 31, 2017.

(51) Int. Cl.
*A45D 34/04* (2006.01)
*A46B 9/02* (2006.01)
*H04N 1/60* (2006.01)
*A45D 29/00* (2006.01)
*A45D 34/00* (2006.01)

(52) U.S. Cl.
CPC .............. *H04N 1/60* (2013.01); *H04N 1/6041* (2013.01); *A45D 29/007* (2013.01); *A45D 2034/002* (2013.01); *A45D 2200/054* (2013.01); *A45D 2200/055* (2013.01); *A46B 2200/1046* (2013.01); *H04N 1/00076* (2013.01); *H04N 1/00734* (2013.01); *H04N 1/6027* (2013.01)

(56) References Cited

U.S. PATENT DOCUMENTS

| | | | | |
|---|---|---|---|---|
| 3,411,853 A ‡ | 11/1968 | Hoff | ...... | A45D 34/042 401/13 |
| 3,840,136 A ‡ | 10/1974 | Lanfranconi | ...... | B65D 81/3222 215/6 |
| 4,149,814 A ‡ | 4/1979 | Manwaring | ...... | A46B 11/0055 401/15 |
| 4,599,008 A ‡ | 7/1986 | Furlong | ...... | A45D 34/042 132/74 |
| 4,640,637 A ‡ | 2/1987 | Winthrop | ...... | A46B 11/0055 132/74 |
| 4,854,760 A ‡ | 8/1989 | Pike | ...... | A46B 11/0013 401/13 |
| 4,955,745 A ‡ | 9/1990 | Vauquelin | ...... | A45D 34/045 141/24 |
| 5,253,942 A ‡ | 10/1993 | Stokes | ...... | B05C 17/01 222/38 |
| 5,778,901 A * | 7/1998 | Abrahamian | ...... | A45D 29/00 132/313 |
| 5,947,622 A ‡ | 9/1999 | Akyildiz | ...... | B65D 41/02 401/12 |
| 6,085,756 A | 7/2000 | Sexton et al. | | |
| 6,174,099 B1 ‡ | 1/2001 | Patel | ...... | A46B 11/0041 401/11 |
| 6,209,548 B1 ‡ | 4/2001 | Harrison | ...... | A45D 34/042 132/20 |
| 6,283,660 B1 ‡ | 9/2001 | Furlong | ...... | A45D 34/042 401/13 |
| 6,286,517 B1 * | 9/2001 | Weber | ...... | B41J 3/4073 132/73 |
| 6,530,709 B1 ‡ | 3/2003 | Washington | ...... | A45D 34/042 401/11 |
| 6,805,512 B2 | 10/2004 | King | | |
| 7,472,709 B1 ‡ | 1/2009 | Nickerson | ...... | A45D 29/20 132/73 |
| 7,918,620 B2 | 4/2011 | De Ponte | | |
| 8,814,291 B2 * | 8/2014 | Bitoh | ...... | A45D 29/00 347/3 |
| 8,893,731 B2 | 11/2014 | Pires et al. | | |
| 8,978,665 B2 * | 3/2015 | Liu | ...... | A45D 34/045 132/73 |
| 8,991,405 B2 ‡ | 3/2015 | Rose | ...... | A45D 34/045 132/73 |
| 9,007,588 B1 * | 4/2015 | Igarashi | ...... | A45D 44/005 356/402 |
| 9,179,753 B2 ‡ | 11/2015 | Huynh | ...... | A45D 29/00 |
| 9,462,869 B2 * | 10/2016 | Bitoh | ...... | A45D 29/00 |
| 9,510,658 B2 * | 12/2016 | Nagao | ...... | A45D 29/00 |
| 9,526,313 B2 * | 12/2016 | Asako | ...... | A45D 29/00 |
| 9,635,923 B2 * | 5/2017 | Bitoh | ...... | A45D 29/00 |
| 9,642,436 B2 * | 5/2017 | Miyamoto | ...... | A45D 29/00 |
| 9,675,159 B2 * | 6/2017 | Bitoh | ...... | A45D 29/00 |
| 9,743,740 B2 * | 8/2017 | Teshima | ...... | A45D 34/04 |
| 9,799,116 B2 * | 10/2017 | Kafuku | ...... | G06T 7/73 |
| 9,820,547 B2 * | 11/2017 | Yamasaki | ...... | A45D 44/005 |
| 9,888,759 B2 * | 2/2018 | Asako | ...... | A45D 29/00 |
| 9,894,976 B2 * | 2/2018 | Shimizu | ...... | B43L 13/024 |
| 9,894,978 B2 * | 2/2018 | Nagao | ...... | G06T 7/0002 |
| 10,022,984 B2 * | 7/2018 | Irie | ...... | A45D 34/04 |
| 10,130,154 B2 * | 11/2018 | Irie | ...... | A45D 34/04 |
| 2001/0047309 A1 * | 11/2001 | Bartholomew | .... | G06Q 30/0641 700/233 |
| 2002/0010528 A1 * | 1/2002 | Bartholomew | ..... | B01F 13/1063 700/239 |
| 2005/0156097 A1 ‡ | 7/2005 | Tatarsky | ...... | B65D 23/003 248/69 |
| 2006/0273200 A1 ‡ | 12/2006 | Williams | ...... | A45D 34/04 239/33 |
| 2007/0014624 A1 | 1/2007 | Fogelson et al. | | |
| 2007/0269255 A1 * | 11/2007 | Marcellus | ...... | A61M 35/003 401/188 R |
| 2008/0185012 A1 * | 8/2008 | Tran | ...... | A45D 29/007 132/73.6 |
| 2010/0252058 A1 * | 10/2010 | Rehkemper | ...... | A45D 34/042 132/73 |
| 2011/0304877 A1 * | 12/2011 | Bitoh | ...... | A45D 44/005 358/1.15 |
| 2012/0287183 A1 * | 11/2012 | Bitoh | ...... | B41J 3/407 347/3 |
| 2013/0206156 A1 ‡ | 8/2013 | Salo | ...... | A45D 29/11 132/73 |
| 2013/0287472 A1 ‡ | 10/2013 | Cheng | ...... | B65D 1/09 401/19 |
| 2014/0076342 A1 ‡ | 3/2014 | Huynh | ...... | A45D 29/22 132/20 |
| 2014/0132968 A1 * | 5/2014 | Bitoh | ...... | A45D 29/00 358/1.6 |
| 2014/0133895 A1 ‡ | 5/2014 | Dockery | ...... | A45D 40/24 401/6 |
| 2014/0352709 A1 * | 12/2014 | Liu | ...... | A45D 34/045 132/73 |
| 2015/0082654 A1 ‡ | 3/2015 | Jaegal | ...... | A45D 29/00 34/275 |
| 2015/0335131 A1 * | 11/2015 | Ortiz | ...... | A45D 29/004 132/73.6 |
| 2016/0083153 A1 ‡ | 3/2016 | Apodaca | ...... | A01N 43/713 514/34 |
| 2016/0270504 A1 * | 9/2016 | Miyamoto | ...... | B41J 3/407 |
| 2016/0345708 A1 * | 12/2016 | Walia | ...... | B41J 3/407 |
| 2016/0353859 A1 * | 12/2016 | Melul | ...... | A45D 34/042 |
| 2017/0071314 A1 * | 3/2017 | Irie | ...... | F26B 3/04 |
| 2017/0072702 A1 * | 3/2017 | Collett | ...... | B41J 3/407 |
| 2017/0181521 A1 * | 6/2017 | Yamasaki | ...... | A45D 29/00 |
| 2017/0273432 A1 * | 9/2017 | Irie | ...... | B41J 3/407 |
| 2019/0313765 A1 * | 10/2019 | Leong | ...... | A45D 29/00 |
| 2019/0365077 A1 ‡ | 12/2019 | Mor Yosef | ...... | A46B 11/002 |
| 2020/0060406 A1 ‡ | 2/2020 | Mor Yosef | ...... | A45D 29/00 |
| 2020/0205549 A1 | 7/2020 | Mor Yosef et al. | | |
| 2021/0244156 A1 | 8/2021 | Mor Yosef et al. | | |

FOREIGN PATENT DOCUMENTS

| | | | |
|---|---|---|---|
| CN | 2508611 | ‡ | 9/2002 |
| CN | 1957797 | | 5/2007 |
| CN | 201718715 | ‡ | 1/2011 |
| CN | 201743178 | ‡ | 2/2011 |
| CN | 202941595 | | 5/2013 |
| CN | 104544907 | ‡ | 4/2015 |
| CN | 104621952 | | 5/2015 |
| CN | 106263462 | | 1/2017 |
| DE | 337676 | ‡ | 1/1922 |
| EP | 0208454 | ‡ | 1/1987 |
| EP | 0751724 | ‡ | 1/1997 |
| FR | 2770495 | ‡ | 5/1999 |
| FR | 2941217 | ‡ | 7/2010 |

(56) References Cited

FOREIGN PATENT DOCUMENTS

| GB | 2206486 | ‡ | 1/1989 | | |
|----|---------|---|--------|---|---|
| GB | 2344776 | ‡ | 6/2000 | | |
| GB | 2344776 A | * | 6/2000 | ............ | A45D 29/00 |
| JP | 2006043383 | | 2/2006 | | |
| JP | 2006043383 A | * | 2/2006 | | |
| JP | 2014147442 | | 8/2014 | | |
| JP | 2019-128633 | | 8/2019 | | |
| JP | 2019128633 A | * | 8/2019 | | |
| WO | WO 2016/014132 | ‡ | 1/2016 | | |
| WO | WO-2016014132 A1 | * | 1/2016 | ............ | A45D 29/00 |
| WO | WO 2016/193108 | ‡ | 12/2016 | | |
| WO | WO 2017/163237 | ‡ | 9/2017 | | |
| WO | WO-2017163237 A1 | * | 9/2017 | | |
| WO | WO 2018/142399 | ‡ | 8/2018 | | |
| WO | WO 2018/142400 | ‡ | 8/2018 | | |
| WO | WO 2018/142401 | ‡ | 8/2018 | | |

OTHER PUBLICATIONS

International Search Report and the Written Opinion Dated Jul. 13, 2018 From the International Searching Authority Re. Application No. PCT/IL2018/050111. (14 Pages).‡
Dreamstime "Bottle Wrapped With Gold Foil, Stock Image—Image of Bubbles", Dreamstime, ID 33924547, Retrieved From the Internet, 2 P., Aug. 13, 2013. Fig.1.‡
Yusuf "Heat Shrinking Caps of Bottles", YouTube, Retrieved From the Internet, 1 P., Aug. 27, 2015. 0:53, 1:24, Description.‡
Invitation to Pay Additional Fees Dated May 15, 2018 From the International Searching Authority Re. Application No. PCT/IL2018/050111. (2 Pages).‡
International Preliminary Report on Patentability Dated Aug. 15, 2019 From the International Bureau of WIPO Re. Application No. PCT/1L2018/050111. (7 Pages).‡
International Search Report and the Written Opinion Dated Jul. 6, 2018 From the International Searching Authority Re. Application No. PCT/IL2018/050109. (21 Pages).‡
International Search Report and the Written Opinion Dated May 1, 2018 From the International Searching Authority Re. Application No. PCT/IL2018/050110. (16 Pages).‡
International Preliminary Report on Patentability Dated Aug. 15, 2019 From the International Bureau of WIPO Re. Application No. PCT/IL2018/050110. (10 Pages).‡
International Preliminary Report on Patentability Dated Aug. 15, 2019 From the International Bureau of WIPO Re. Application No. PCT/IL2018/050109. (12 Pages).‡
Notification of Office Action and Search Report Dated Jul. 3, 2020 From the State Intellectual Property Office of the People's Republic of China Re. Application No. 201880018297.0. (8 Pages).‡
Supplementary European Search Report and the European Search Opinion Dated Aug. 10, 2020 From the European Patent Office Re. Application No. 18748805.1. (7 Pages).‡
Supplementary European Search Report and the European Search Opinion Dated Aug. 4, 2020 From the European Patent Office Re. Application No. 18747330.1. (9 Pages).‡
Official Action Dated Jan. 27, 2021 From the US Patent and Trademark Office Re. U.S. Appl. No. 16/481,851. (22 Pages).
International Preliminary Report on Patentability Dated Aug. 15, 2019 From the International Bureau of WIPO Re. Application No. PCT/IL2018/050111. (7 Pages).
Notice of Allowance Dated Nov. 20, 2020 From the US Patent and Trademark Office Re. U.S. Appl. No. 16/481,856. (13 Pages).
Official Action Dated Jul. 8, 2020 From the US Patent and Trademark Office Re. U.S. Appl. No. 16/481,856. (41 Pages).
Supplementary European Search Report and the European Search Opinion Dated Aug. 10, 2020 From the European Patent Office Re. Application No. 18747437.4. (7 Pages).
Notice of Imported Citations Action Dated Apr. 19, 2021 from the US Patent and Trademark Office Re. U.S. Appl. No. 17/191,847. (6 pages).
Notice of Allowance Dated May 14, 2021 from the US Patent and Trademark Office Re. U.S. Appl. No. 16/482,269. (6pages).
Notification of Office Action Dated Mar. 9, 2021 From the State Intellectual Property Office of the People's Republic of China Re. Application No. 201880018297.0. (5 Pages).
Official Action Dated Feb. 5, 2021 From the US Patent and Trademark Office Re. U.S. Appl. No. 16/482,269. (22 Pages).
Translation Dated Mar. 18, 2021 of Notification of Office Action Dated Mar. 9, 2021 From the State Intellectual Property Office of the People's Republic of China Re. Application No. 201880018297.0. (8 Pages).
Notification of Office Action and Search Report Dated Jul. 6, 2021 From the State Intellectual Property Office of the People's Republic of China Re. Application No. 201880013196.4.(12 Pages).
Translation Dated Jul. 21, 2021 of Notification of Office Action Dated Jul. 6, 2021 From the State Intellectual Property Office of the People's Republic of China Re. Application No. 201880013196.4. (8 Pages).
Notice of Reason(s) for Rejection dated Feb. 22, 2022 From the Japan Patent Office Re. Application No. 2019-561391 and Its Translation Into English.(11 pages).

\* cited by examiner
‡ imported from a related application

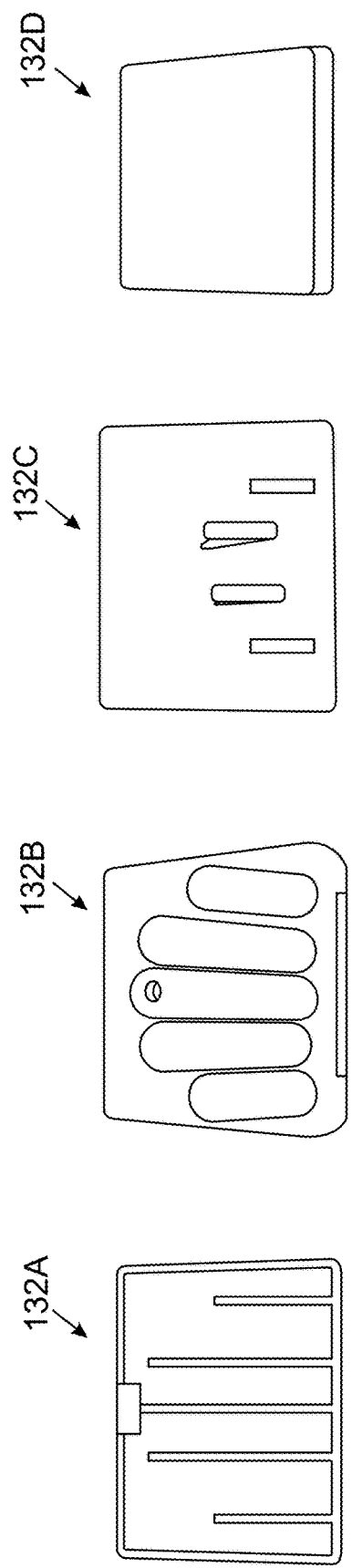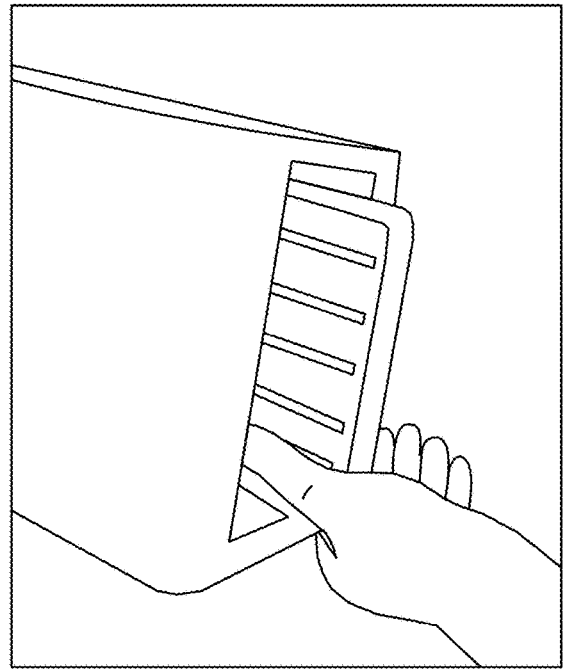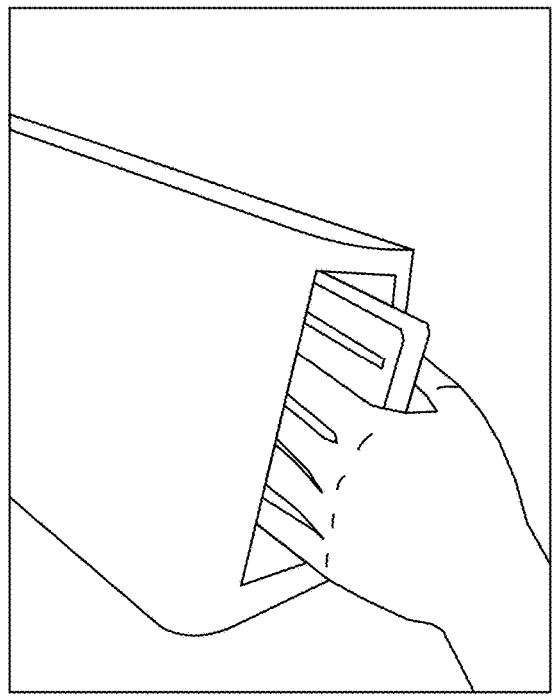
FIG. 2A
FIG. 2B

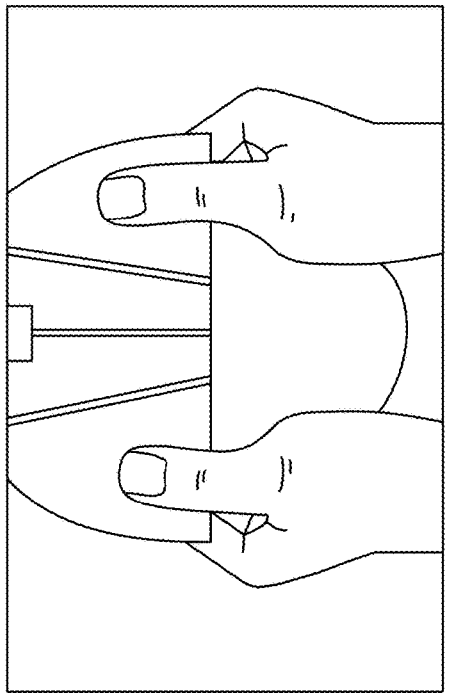
FIG. 2C
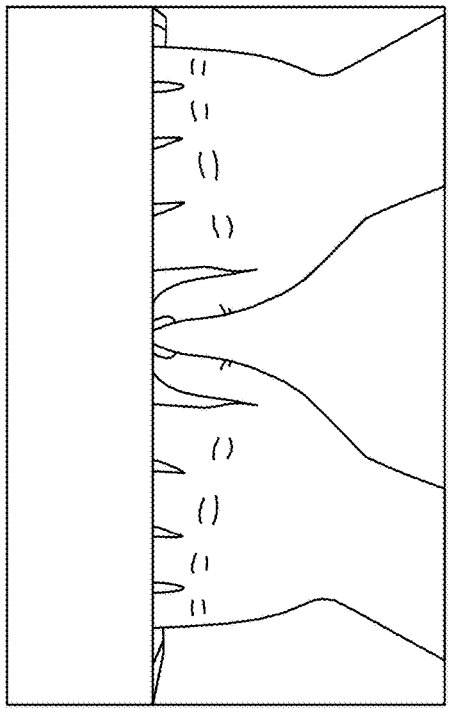
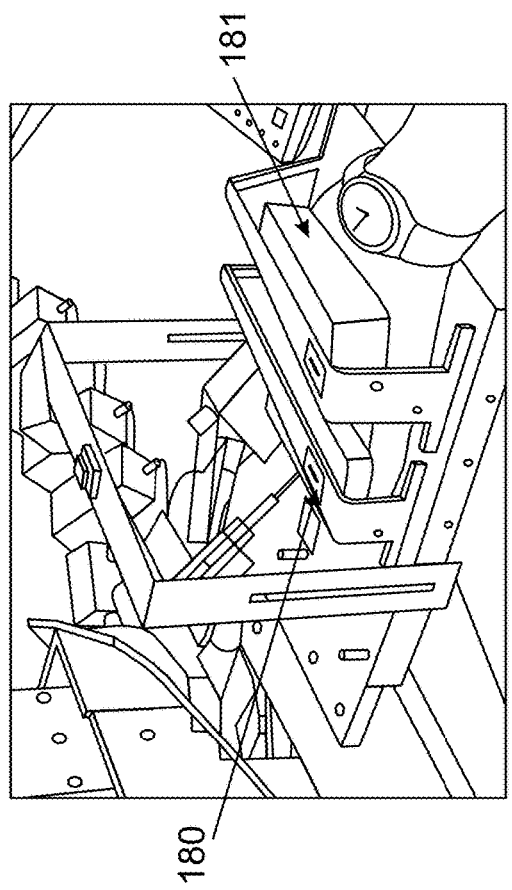
FIG. 2D

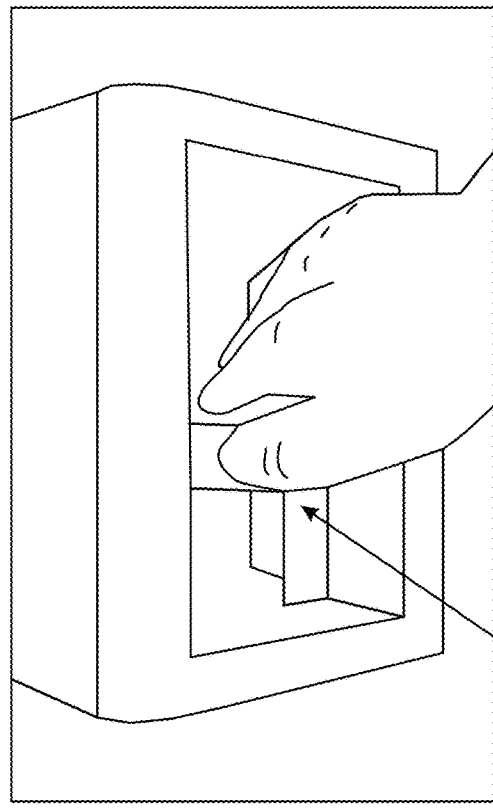
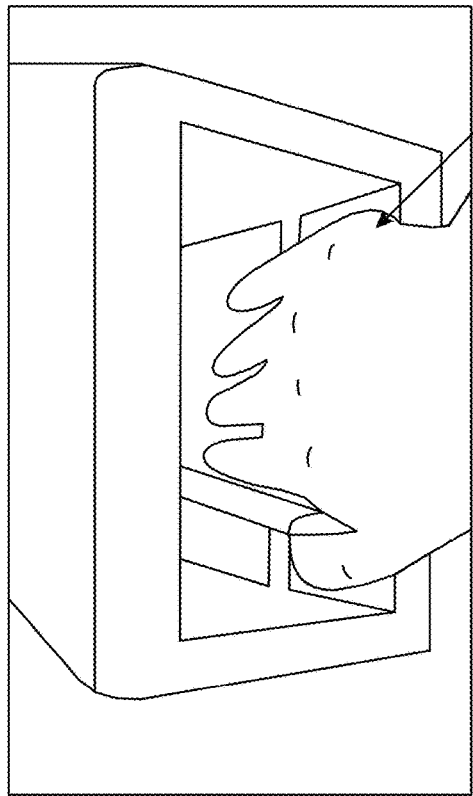
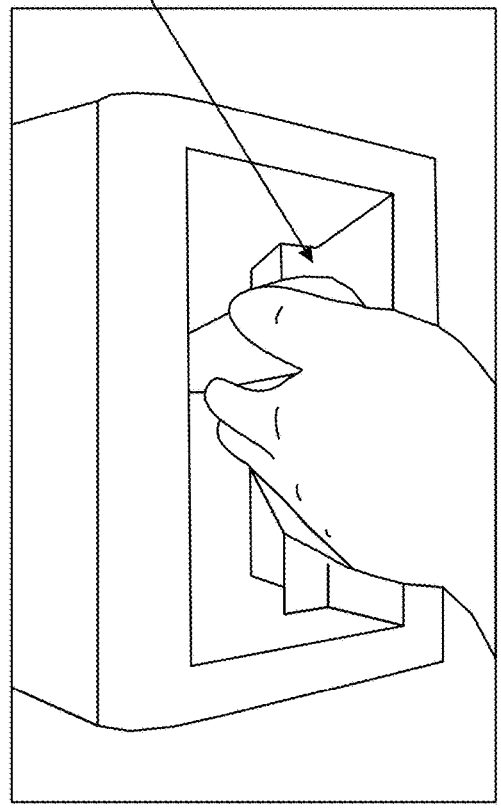
FIG. 2J

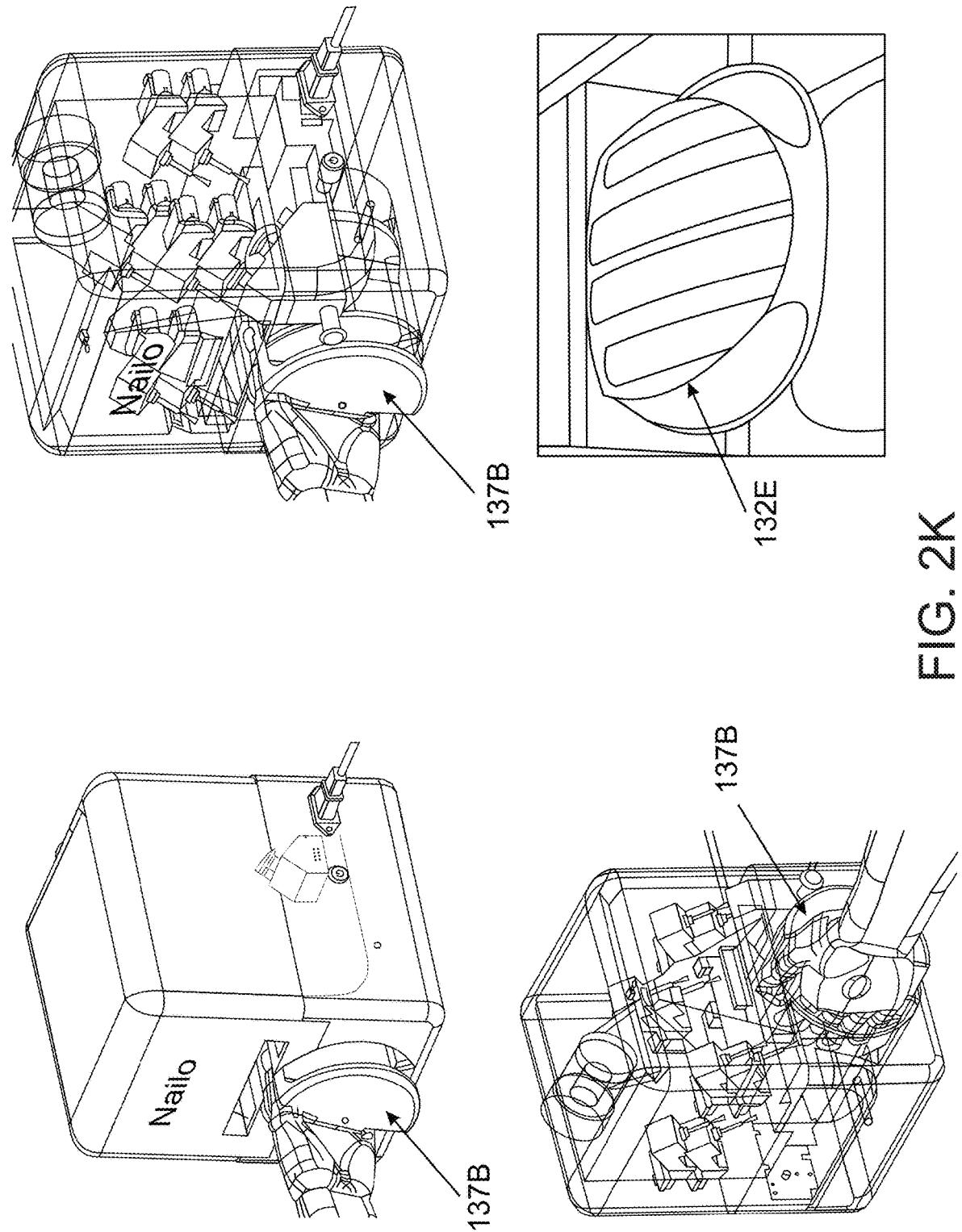

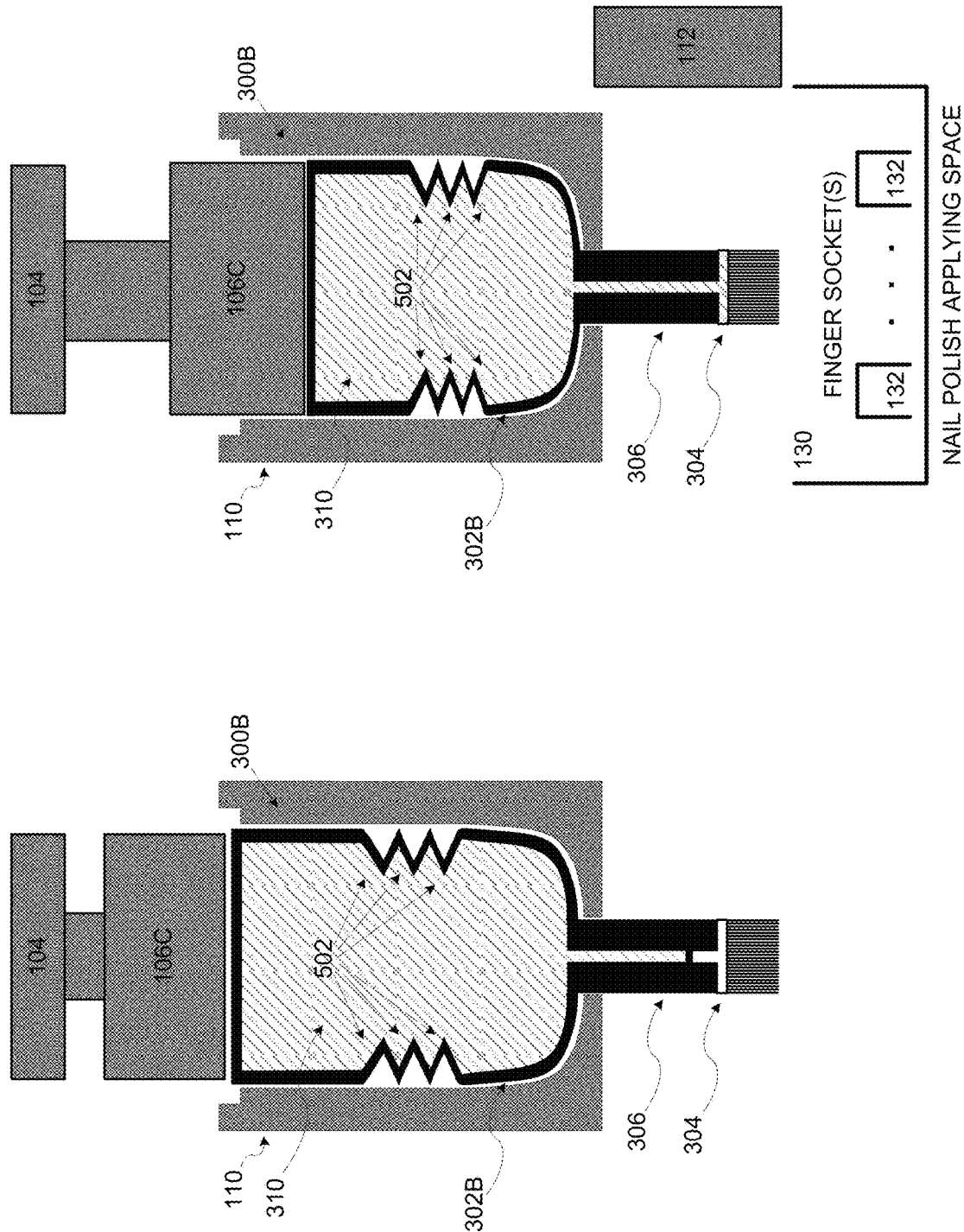

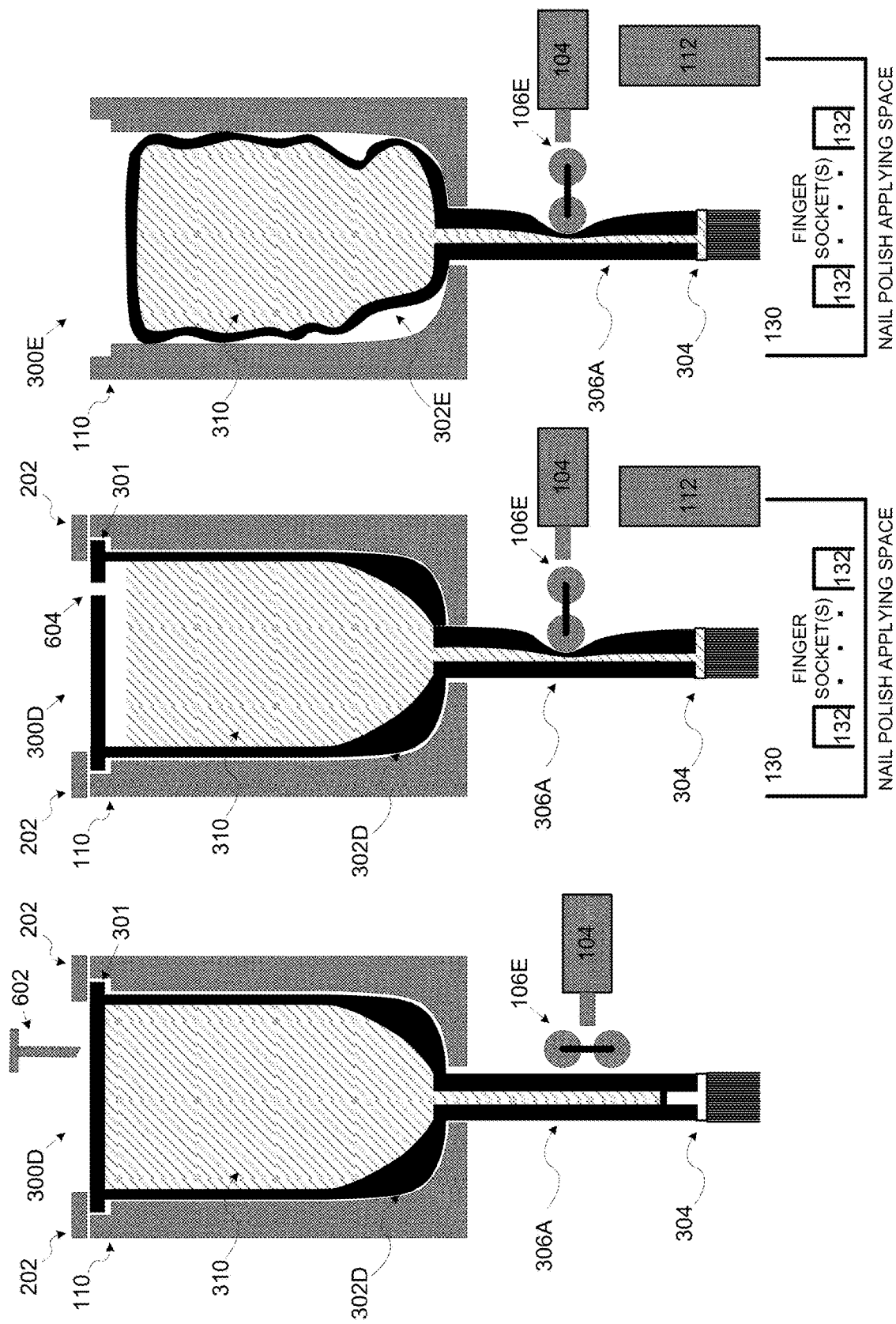

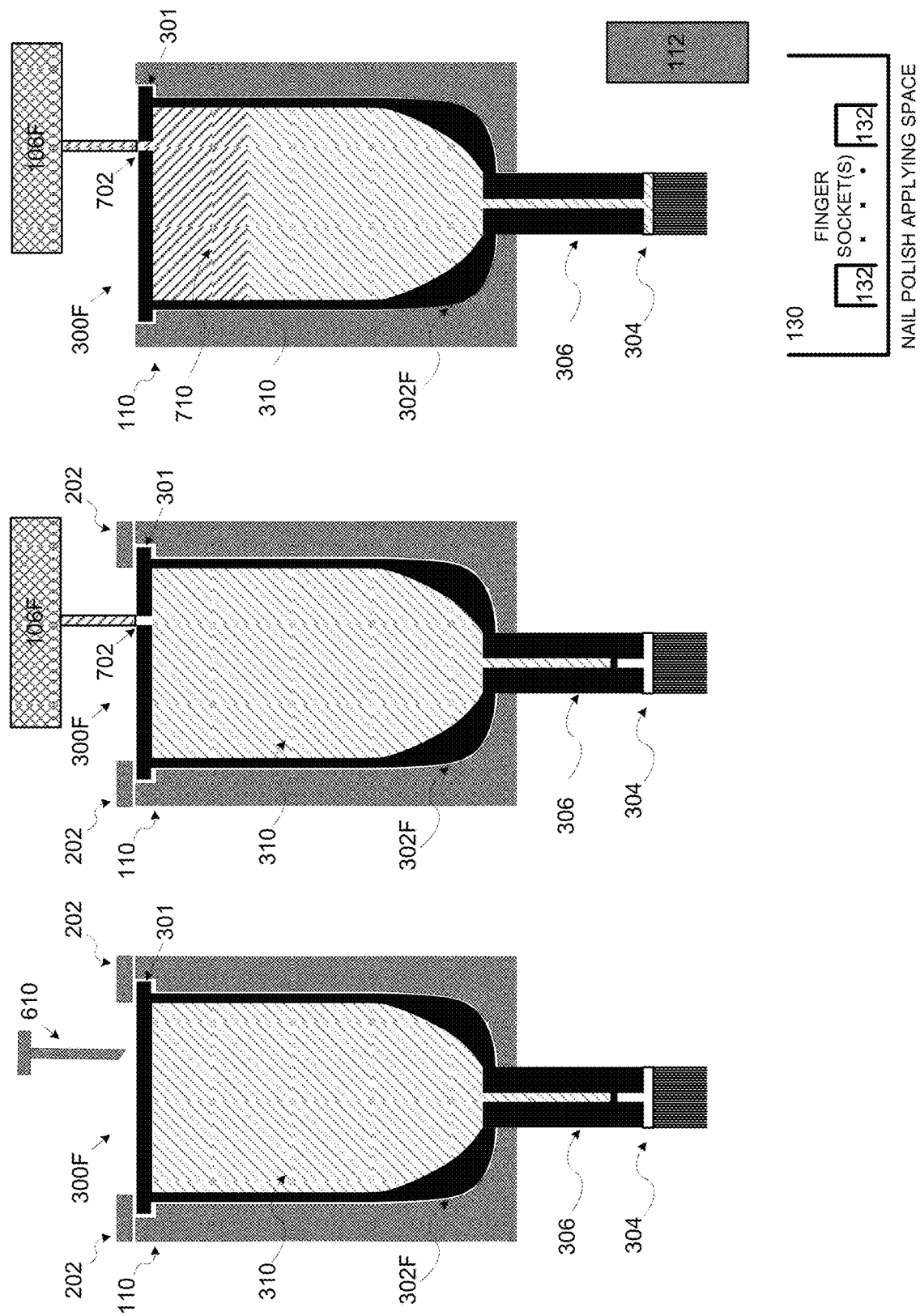

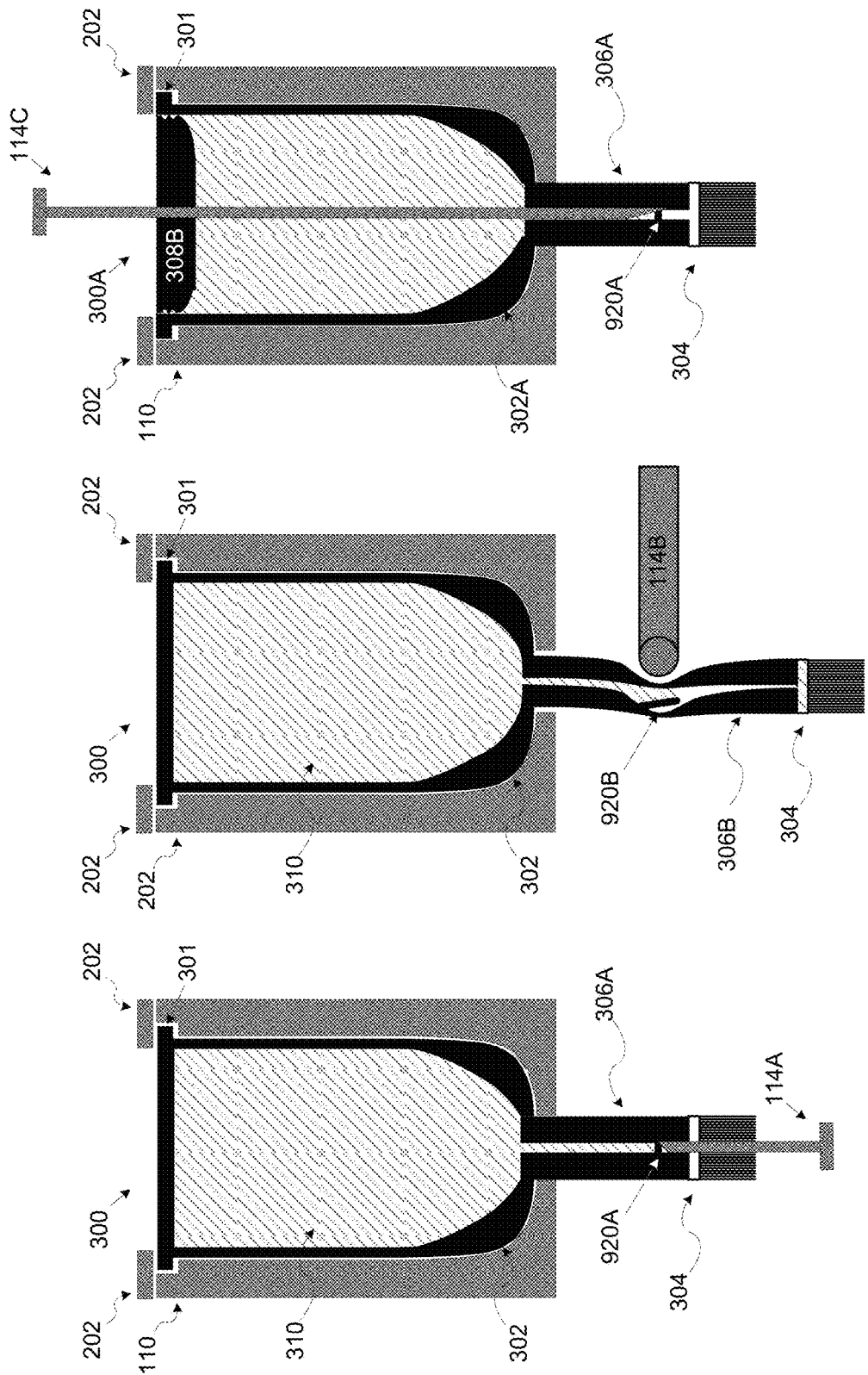

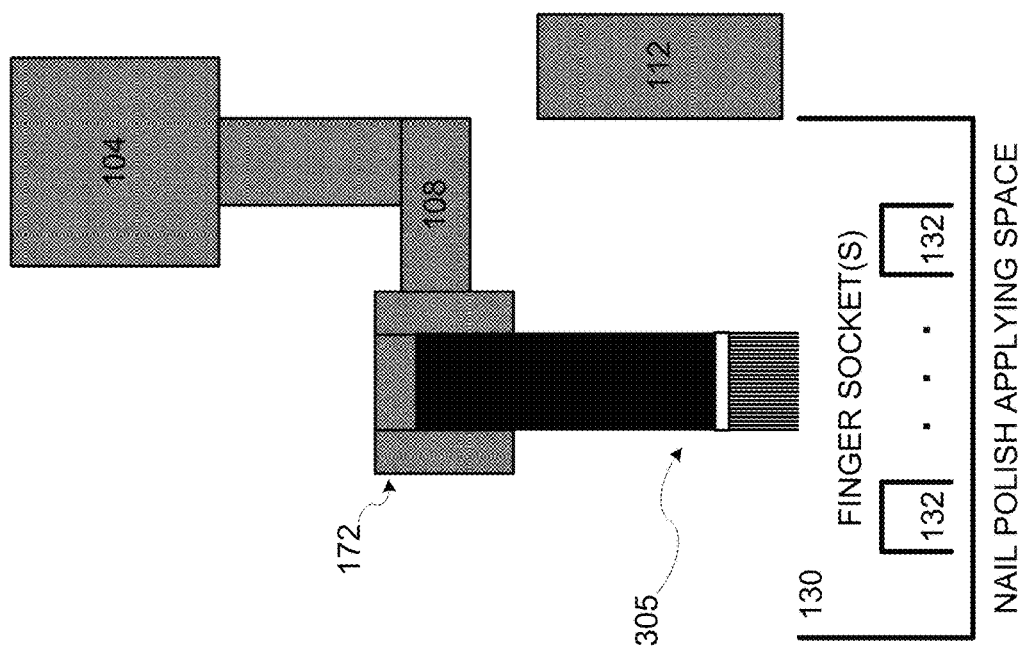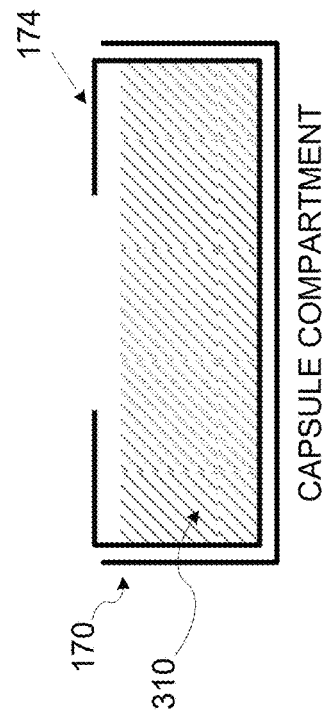
FIG. 17

AUTOMATED NAIL POLISH APPLICATION APPARATUS

RELATED APPLICATIONS

This application is continuation of U.S. patent application Ser. No. 16/481,856 filed on Jul. 30, 2019, which is a National Phase of PCT Patent Application No. PCT/IL2018/050111 having International Filing Date of Jan. 31, 2018, which claims the benefit of priority under 35 USC 119(e) of U.S. Provisional Patent Application Nos. 62/452,461 filed on Jan. 31, 2017, 62/533,720 filed on Jul. 18, 2017 and 62/574,241 filed on Oct. 19, 2017. The contents of the above applications are all incorporated by reference as if fully set forth herein in their entirety.

FIELD AND BACKGROUND OF THE INVENTION

The present invention, in some embodiments thereof, relates to a nail polish application apparatus and, more particularly, but not exclusively, to a nail polish application apparatus utilizing a disposable storage and dispensing nail polish fluid capsule with an integrated brush.

Applying nail polish to fingernails and/or toenails has been practiced since ancient times. Decorating the finger and/or toe nails is still fashionable in modern times as many people, in particular woman apply nail polish to decorate their fingernails and/or toenails.

The nail polish, for example, base coat, a top coat, a nail polish and/or the like is a fluid that once applied to the nail surface dries to form a solid layer over the nail surface.

Presently, manual nail polish application is the most common method. The manual nail polish application may require some expertise, skills and/or experience and may be time consuming. In addition manual application of the nail polish to one self's nails may be physically challenging due to the need to master the art in both hands and in case of the foot toenails reaching conveniently and efficiently the toes may also present difficulties. While many individuals have mastered the art of applying the nail polish manually for themselves, nail polish application may often be practiced by professional manicurists and/or pedicurists.

SUMMARY OF THE INVENTION

According to a first aspect of the present invention there is provided a nail polish application apparatus, comprising:
  A mounting element comprising a capsule compartment adapted to receive one or more capsules containing a nail polish fluid. The mounting element is moveable by one or more actuators in a longitudinal axis crossing a nail polish applying space and in a lateral axis perpendicular to the longitudinal axis and is rotatable by the actuator(s) around the longitudinal axis.
  A pressure applying element adapted to apply pressure on a body portion of the capsule(s) installed in the capsule compartment. The body portion defines a reservoir containing a nail polish fluid. The pressure builds an internal pressure in the reservoir forcing extrusion of the nail polish fluid to a nail polish applying element integrated with the capsule(s).
  One or more sensors adapted to generate sensory data depicting the nail polish applying space.
  A control unit adapted to operate the actuator(s) and the pressure according to an analysis of the sensory data.

According to a second aspect of the present invention there is provided a nail polish application apparatus, comprising:
  A capsule compartment adapted to receive one or more capsules having a body portion defining a reservoir containing a nail polish fluid.
  A mounting element adapted to receive a nail polish applying element connected via one or more conveying tubes to the body portion. The mounting element is moveable by one or more actuators in a longitudinal axis crossing a nail polish applying space and in a lateral axis perpendicular to the longitudinal axis and is rotatable by the by the actuator(s) around the longitudinal axis.
  A pressure applying element adapted to apply pressure on the body portion, the pressure builds a pressure in the reservoir forcing extrusion of the nail polish fluid to the nail polish applying element through the conveying tube(s).
  One or more sensors adapted to generate sensory data depicting the nail polish applying space.
  A control unit adapted to control movement of the actuator(s) and the pressure according to an analysis of the sensory data.

According to a third aspect of the present invention there is provided a nail polish application apparatus, comprising:
  A mounting element adapted to receive a nail polish applying element which is detachable from a two-part nail polish capsule comparing a container containing a nail polish fluid. The mounting element is moveable by one or more actuators in a longitudinal axis crossing a nail polish applying space and in a lateral axis perpendicular to the longitudinal axis and is rotatable by the actuator(s) around the longitudinal axis.
  One or more sensors adapted generate sensory data depicting the nail polish applying space.
  A control unit adapted to control movement of the actuator(s) according to an analysis of the sensory data.
  Wherein the control unit operates the actuator(s) to move the mounting element such that the nail polish applying element dips in the container.

According to a fourth aspect of the present invention there is provided a method of controlling a nail polish application apparatus, comprising using one or more processors of a control unit of a nail polish application apparatus, the processor(s) executing code for:
  Controlling one or more actuators adapted to move a mounting element in a longitudinal axis crossing a nail polish applying space and in a lateral axis perpendicular to the longitudinal axis and to rotate the mounting element around the longitudinal axis. The mounting element comprising a compartment adapted to receive one or more nail polish applying elements adapted to dispense a nail polish fluid.
  Adjusting a saturation level of the nail polish fluid in a dispensing head of the nail polish applying element(s).
  Analyzing sensory data received from one or more sensors depicting the nail polish applying space.
  Adjusting the movement by controlling the actuator(s) according to the analysis and adjusting the saturation level according to the analysis.

In an optional implementation form of the first, second, third and/or fourth aspects, the mounting element is moveable by the actuator(s) in an axis perpendicular to the nail surface.

In an optional implementation form of the first, second, third and/or fourth aspects, one or more finger sockets are available in the nail polish applying space. The finger socket(s) having a surface shaped to receive and accommodate one or more of a human finger and/or a human toe.

In an optional implementation form of the first, second, third and/or fourth aspects, the nail polish applying space is constructed to reduce external lighting coming in from outside the nail polish applying space.

In an optional implementation form of the first, second, third and/or fourth aspects, the nail polish application apparatus includes a hand holding element shaped to receive and accommodate one or more fingers of a human hand while exposing one or more nail surfaces of one or more of the hand fingers. The hand holding element is moveable by the actuator(s) to align with a plane perpendicular to the nail polish applying element.

In a further implementation form of the first, second and/or fourth aspects, the pressure applying element comprises a piston moveable by the actuator(s). The piston is adapted to press down a sliding gasket sealing a first face of the body portion defining the reservoir. A volume of the reservoir is reduced thus building the internal pressure when the sliding gasket slides down towards a second face of the body portion opposite the first face. Wherein the control unit is adapted to control the pressure by operating the actuator(s) to move the piston according to a displacement change of the piston calculated based on the analysis.

In a further implementation form of the first, second and/or fourth aspects, the piston is moveable by the actuator(s) through one or more of: a lead screw, a gear, a plunger and/or a rack coupled with a pinion.

In a further implementation form of the first, second and/or fourth aspects, the pressure applying element comprises a plunger moveable by the actuator(s). The plunger is adapted to deform one or more faces of the body portion having an elasticity coefficient higher than the elasticity coefficient of other faces of the body portion. A volume of the reservoir is reduced and an internal pressure is built in the reservoir when the face(s) is deformed. Wherein the control unit is adapted to control the pressure by operating the one or more actuators to apply force to the plunger according to a flow of the nail polish fluid calculated based on the analysis.

In a further implementation form of the first, second and/or fourth aspects, the pressure applying element comprises a peristaltic pump. The peristaltic pump is adapted to induce a displacement movement to reduce a volume of the reservoir by extruding the nail polish fluid. The peristaltic pump is adapted to induce the displacement movement by applying the pumping on one or more conveying tunnels connecting the body portion to the nail polish applying element. The conveying tunnel(s) having a high elasticity coefficient. Wherein the control unit is adapted to control the pressure by operating the peristaltic pump to operate according to a flow of the nail polish fluid through the nail applying element calculated based on the analysis.

In a further implementation form of the first, second and/or fourth aspects, the pressure applying element comprises a compressor. The compressor is adapted to inject a compression material at high pressure into the body portion thus building an internal pressure in the reservoir. Wherein the control unit is adapted to control the pressure by operating the compressor to operate according to a flow of the nail polish fluid through the nail applying element calculated based on the analysis.

In a further implementation form of the first, second and/or fourth aspects, the pressure applying element comprises one or more magnetic field generators adapted to induce a magnetic field to which one or more magnetic elements integrated within a sliding gasket of the capsule react. The reaction is a member of a group consisting of: attraction and/or repulsion. The sliding gasket seals a first face of the body portion defining the reservoir. A volume of the reservoir is reduced when a magnetic force built by the magnetic field presses down the sliding gasket slides down towards a second face of the body portion opposite the first face. Wherein the control unit is adapted to control the pressure by controlling a force and direction of the magnetic field according to a flow of the nail polish fluid through the nail applying element calculated based on the analysis.

In an optional implementation form of the first, second, third and/or fourth aspects, the control unit is adapted to conduct one or more preparation operations on the mounting element prior to applying the nail polish fluid, the preparation operation(s) is a member of a group comprising of: removing a cover from the capsule(s), shaking the capsule(s), calibrating a positioning of the nail polish applying element, cleaning the nail polish applying element, puncturing the capsule(s) in order to allow flow of the nail polish fluid from the body portion to the nail polish applying element, estimating a saturation level of the nail polish applying element and/or adjusting the saturation level.

In an optional implementation form of the first, second, third and/or fourth aspects, the nail polish application apparatus includes a preparation space constructed to accommodate the mounting element for the preparation operation(s).

In a further implementation form of the first, second, third and/or fourth aspects, the preparation space is utilized in the nail polish applying space.

In an optional implementation form of the first, second, third and/or fourth aspects, the nail polish application apparatus includes one or more puncturing elements for puncturing capsule(s) in order to allow flow of the nail polish fluid from the body portion to the nail polish applying element.

In an optional implementation form of the first, second, third and/or fourth aspects, the nail polish application apparatus includes one or more nail polish drying elements operated by the control unit to dry the nail polish fluid before, after and/or during applied to the nail surface.

In an optional implementation form of the first, second, third and/or fourth aspects, the nail polish drying element(s) is moveable by the actuator(s) operated by the control unit.

In an optional implementation form of the first, second, third and/or fourth aspects, the nail polish drying element(s) is located and adapted to dry the nail polish fluid in a drying space comprising one or more drying sockets shaped to receive and accommodate one or more of: a human finger and/or a human toe.

In a further implementation form of the first, second, third and/or fourth aspects, the drying space is utilized in the nail polish applying space.

In an optional implementation form of the first, second, third and/or fourth aspects, the nail polish application apparatus includes one or more nail polish removal elements for removing nail polish residue from the nail surface.

In an optional implementation form of the first, second, third and/or fourth aspects, the nail polish removal element(s) is located and adapted to remove the nail polish residue in a nail polish removal space comprising one or more nail polish removal sockets shaped to receive and accommodate one or more of: a human finger and/or a human toe.

In a further implementation form of the first, second, third and/or fourth aspects, the nail polish removal space is utilized in the nail polish applying space.

In an optional implementation form of the first, second, third and/or fourth aspects, the nail polish application apparatus includes a dynamically adjustable shutter to control a flow rate of the nail polish fluid to the nail polish applying element.

In a further implementation form of the first, second, third and/or fourth aspects, one or more of the sensor(s) is an imaging sensor operated by the control unit to capture one or more images depicting the nail polish applying space during a nail polish application session in which the nail polish applying element integrated with the capsule(s) applies the nail polish fluid to a nail surface of one or more fingers in the nail polish applying space, and wherein the sensory data used for the analysis comprises the image(s).

In a further implementation form of the first, second, third and/or fourth aspects, the analysis comprises image processing (or other sensor data) for identifying one or more of:
Detecting one or more curvatures in the nail surface.
Detecting one or more boundaries of the nail surface.
Detecting a three dimension (3D) surface of the nail surface.
Estimating a height of the nail polish applying element above the nail surface according to a detected width of a dispensing head of the nail polish applying element before and while touching the nail surface.
Detecting a movement of the finger(s) in the nail polish applying space.
Detecting a saturation level of the nail polish fluid in the nail polish applying element.
Detecting a time instance at which the nail polish fluid reaches a tip of the nail polish applying element.
Estimating a quality of the nail polish fluid application to the nail surface.
Detecting one or more flaws in the nail polish fluid application.
Estimating a drying state of the nail polish fluid applied on the nail surface.
Estimating a viscosity of the nail polish fluid by analyzing an expansion of a drop of the nail polish fluid in order to calibrate a flow of the nail polish fluid according to the viscosity.

In an optional implementation form of the first, second, third and/or fourth aspects, the control unit is adapted to estimate a quality compliance of the capsule(s) according to analysis of one or more images depicting the capsule(s).

In a further implementation form of the first, second, third and/or fourth aspects, the control unit is adapted to estimate a compliance of the nail surface for application of the nail polish fluid according to analysis of one or more images of the nail surface while finger(s) is in the nail polish applying space.

In a further implementation form of the first, second, third and/or fourth aspects, one or more of the sensor(s) is a proximity sensor operated by the control unit to generate proximity data depicting a proximity of the nail polish applying element to a nail surface of one or more fingers located in the nail polish applying space, and wherein the sensory data used for the analysis comprises the proximity data.

In an optional implementation form of the first, second, third and/or fourth aspects, the nail polish application apparatus includes one or more lighting source operated by the control unit to illuminate the nail surface. The lighting source(s) is a member of a group consisting of: a Light Emitting Diode (LED), a laser emitter device and/or an Infra-Red (IR) emitter.

In an optional implementation form of the first, second, third and/or fourth aspects, the nail polish application apparatus includes one or more nail shaping elements shaped and adapted to treat the nail surfaces. The treatment includes one or more of: shaping a boundary of the nail surface(s), filling the nail surface(s), shining the nail surface(s), smoothing the nail surface(s), removing a cuticle of the nail surface(s) and/or pushing the cuticle of the nail surface(s).

In an optional implementation form of the first, second, third and/or fourth aspects, the nail polish application apparatus includes a communication interface operated by the control unit to communicate with one or more networked devices through one or more networks. The networked device(s) includes one or more of: a client terminal of a user using the nail polish application apparatus and/or a remote networked node.

In an optional implementation form of the first, second, third and/or fourth aspects, the nail polish application apparatus includes a user interface operated by the control unit to allow interaction with one or more users, the user interface comprising one or more members of a group consisting of: an indication light, a display, a sound indication and/or a control switch.

In an optional implementation form of the first, second, third and/or fourth aspects, the nail polish application apparatus includes a hand resting ledge in front of the polish applying space, the hand resting ledge having a surface shaped to receive and accommodate a palm of a user.

In a further implementation form of the third and/or fourth aspects, the nail polish applying element is initially attached to the capsule(s), the nail polish applying element is detached from the at least capsule and placed in the mounting element by a user of the apparatus and/or automatically by the mounting element operated by the control unit.

In a further implementation form of the first, second, and/or fourth aspects, the saturation level is adjusted by controlling a pressure applying element adapted to apply pressure on a body portion of one or more capsules installed in the compartment(s). The body portion defines a reservoir containing a nail polish fluid. The pressure builds a pressure in the reservoir forcing extrusion of the nail polish fluid to the nail polish applying element integrated with the capsule(s).

In a further implementation form of the third and/or fourth aspects, the saturation level is adjusted by dipping the dispensing head of the nail polish applying element(s) in a container containing the nail polish fluid.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 2A, FIG. 2B and FIG. 2C are schematic illustrations of exemplary finger sockets of a nail polish application apparatus, according to some embodiments of the present invention;

FIG. 2D, FIG. 2E.

FIG. 2J and FIG. 2K are schematic illustrations of an exemplary dynamically movable hand holding element of a nail polish application apparatus, according to some embodiments of the present invention;

FIG. 7A, FIG. 7B, FIG. 7C and FIG. 7D are longitudinal cross section views of an exemplary plunger based pressure applying element of a nail polish application apparatus, according to some embodiments of the present invention;

FIG. 8A, FIG. 8B and FIG. 8C are longitudinal cross section views of an exemplary peristaltic pump based pressure applying element of a nail polish application apparatus, according to some embodiments of the present invention;

FIG. 9A, FIG. 9B and FIG. 9C are longitudinal cross section views of an exemplary compressor based pressure applying element of a nail polish application apparatus, according to some embodiments of the present invention;

FIG. 11A, FIG. 11B and FIG. 11C are longitudinal cross section views of exemplary puncturing elements of a nail polish application apparatus, according to some embodiments of the present invention;

FIG. 17 is a longitudinal cross section view of an exemplary mounting element of a nail polish application apparatus utilizing a two-part capsule with detachable nail polish applying element, according to some embodiments of the present invention;

DETAILED DESCRIPTION OF EMBODIMENTS OF THE INVENTION

Figure 1:
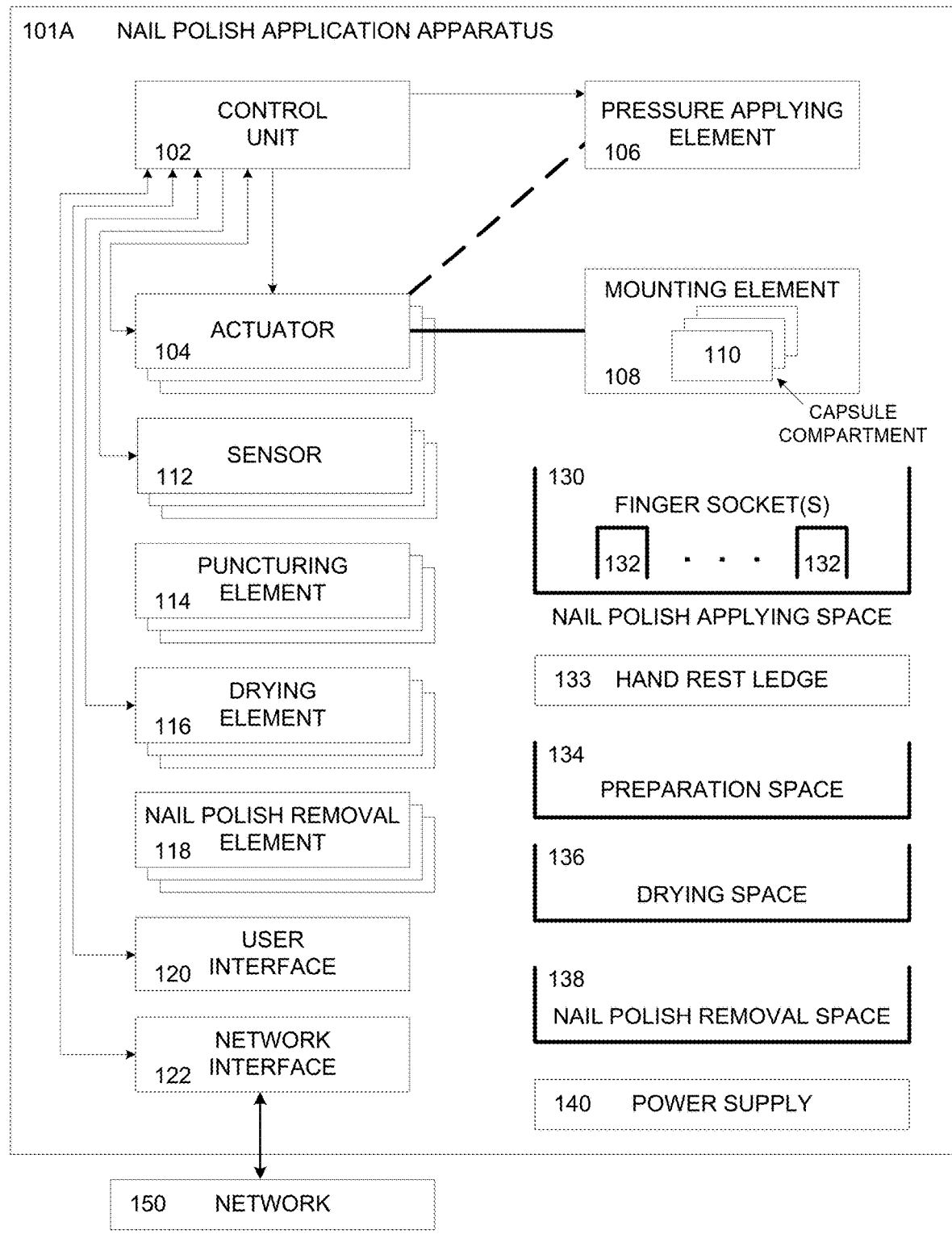
FIG. 1 is a schematic illustration of an exemplary nail polish application apparatus utilizing a capsule containing nail polish fluid for applying the nail polish fluid to nail surface(s), according to some embodiments of the present invention.

The present invention, in some embodiments thereof, relates to a nail polish application apparatus and, more particularly, but not exclusively, to a nail polish application apparatus utilizing a disposable storage and dispensing nail polish fluid capsule with an integrated brush.

According to some embodiments of the present invention there are provided a nail polish application apparatus and automatic nail polish application methods. The nail polish application apparatus may utilize a disposable dispensing and storage capsule containing nail polish fluid intended for a single application of the nail polish fluid over one or more nail surfaces of a user. In particular, the dispensing and storage capsule includes an integrated nail polish applying element, for example, a brush, an elastic tube, a wiper and/or the like. The nail polish fluid may include, for example, a polish fluid, a base coating fluid, a top coating fluid, a gel polish, a drying material, a polish removal fluid, a nail art polish fluid, a medical nail treatment fluid and/or the like.

The nail polish application apparatus comprises a control unit controlling one or more actuators which move a mounting element through a nail polish applying space of the nail polish application apparatus in which the user places his finger(s) and/or toe(s) with the nail surfaces exposed for applying the nail polish fluid. The mounting element may include one or more capsule compartments adapted to receive and accommodate the nail polish capsule. The control unit may operate the actuator(s) to move the mounting element in a longitudinal axis, a lateral axis and a rotation (tilt) axis around the longitudinal axis through the nail polish applying space to locate and/or position the nail polish applying element integrated with the capsule over the target nail surface(s). Optionally, the actuator(s) are capable of moving the mounting element in an axis substantially perpendicular to the nail surface(s).

The control unit may also control a pressure applying element which may press a body portion of the capsule to force extrusion of the nail polish fluid from body portion to the integrated nail polish applying element. The pressure applying element may employ one or more implementation which may be adapted to the capsule construction, for example, a piston, a lead screw driven piston, a gear, a plunger, a peristaltic pump, a compressor, a magnetic field based mechanism and/or the like.

The control unit may collect sensory data from one or more sensors, for example, an imaging sensor, a proximity sensor and/or the like deployed, positioned and/or located to depict the nail polish applying space. The control unit analyzes the collected sensory data, for example, image(s), proximity information and/or the like to detect a positioning of the nail polish applying element with respect to the target nail surface(s). Based on the analysis, the control unit may operate the actuators to move the mounting element along the target nail surface(s) to allow the nail polish applying element to properly dispense and apply the nail polish fluid to the nail surface(s).

The control unit may further analyze the sensory data to control a flow rate of the nail polish fluid, for example, maintain, increase or decrease by operating the pressure applying element accordingly. The control unit may estimate the flow rate using one or more techniques which may depend of the implementation of the pressure applying element. For example, for the piston based implementations, the control unit may detect displacement of the piston, the gear, the plunger and/or the lead screw and calculate according to predefined formulation the ratio between the displacement and the amount of nail polish fluid extruded from the body portion. In another example, the control unit may analyze the image(s) to estimate a saturation level of the nail polish fluid in the nail polish applying element. In another example, the control unit may analyze the image(s) captured after applying the nail polish fluid to evaluate the layer (width) of the nail polish on the nail surface(s). The control unit may then operate the pressure applying element to maintain, increase or decrease the pressure according to the estimated flow rate.

Optionally, prior to starting the automated nail polish application process, the control unit may initiate execution of one or more preparation operations, for example, removing a cover from the capsule(s), shaking the capsule(s) to achieve a homogenous composition of the nail polish fluid contained in the capsule, calibrating a positioning of the nail polish applying element with respect to one or more reference points, cleaning the nail polish applying element, puncturing the capsules' body portion, estimating a saturation level of the nail polish applying element with the nail polish fluid and/or the like. One or more of the preparation operations may be conducted in the nail polish applying space. Optionally, the nail polish application apparatus includes a preparation space in which one or more of the preparation operations may be conducted.

Optionally, the nail polish application apparatus includes one or more drying elements deployed, positioned and/or adapted to dry the nail surface(s) after applied with the nail polish fluid. The drying elements may be further deployed, positioned and/or adapted to cure the nail surface(s) after applied with the gel polish. The control unit may control the drying element(s) to dry and/or cure the nail surface(s) in the nail polish applying space. However, the nail polish application apparatus may include a separate drying space in which the drying and/or curing operation and/or part thereof may be conducted.

Optionally, the nail polish application apparatus includes one or more nail polish removal elements adapted to remove nail polish residue and/or other materials present on the nail surface(s) to clean the nail surface(s) prior to applying the new nail polish fluid. The nail polish application apparatus may further include a nail polish removal space in which the nail surface(s) may be cleaned.

Optionally, the nail polish application apparatus includes one or more user interface elements, for example, an indication light, a display, a control switch and/or the like for interacting with the user, for example, presenting status to the user and/or receiving instructions and/or settings from the user.

Optionally, the nail polish application apparatus includes a network interface supporting one or more communication protocols to communicate with one or more remote devices, for example, a mobile device of the user, a remote server and/or a cloud service.

In some embodiments of the present invention, the nail polish application apparatus is adapted to receive and use one or more two-part nail polish capsule, in particular disposable two-part capsule(s). The two-part capsule may include a body portion (container) containing the nail polish fluid, typically a flask shaped body portion covered with a detachable nail polish applying element serving as a cover for the flask. The detachable nail polish applying element includes a dispensing head, for example, a brush, an application head and/or the like which may be dipped in the body portion (flask) to saturate the nail polish fluid in the dispensing head. The capsule chambers of the nail polish application apparatus are shaped to receive and accommodate the flask shaped container of the capsule. The mounting element of the nail polish application apparatus further includes a fixture adapted to hold the detachable nail polish applying element. The control unit may operate the actuator(s) to maneuver the mounting element and hence the detachable nail polish applying element to move between the capsule compartment where the dispensing head of the detachable nail polish applying element may be dipped in the flask and the nail polish applying space where the nail polish fluid may be applied to the nail surface(s).

The automated nail polish application apparatus coupled with the storage and dispensing capsule having the integrated nail polish applying element may present significant benefits compared to existing devices, systems and/or methods for nail polish fluid application over nail surfaces. First, as opposed to traditional manual nail polish fluid application which may be the most common method, the nail polish application apparatus utilizing the storage and dispensing capsule facilitates an automated nail polish fluid application. While the manual nail polish fluid application may be very time consuming and may require skills, expertise and/or experience, the automated nail polish fluid application may allow any user having no relevant skills, knowledge, expertise and/or experience to easily apply the nail polish fluid. The automated nail polish fluid application may also significantly shorten the time of the application process and may even allow the user to engage in other activities while applying the nail polish fluid to his finger and/or toe nail surfaces.

While some devices and/or systems for automatically applying the nail polish fluid may exist, the nail polish application apparatus utilizing the storage and dispensing capsule provides a convenient user friendly solution. The user may be relieved of the need to handle the nail polish fluid, the brush and/or the like as may be needed by the existing devices. In addition, by isolating the nail polish fluid from the nail polish application apparatus, maintenance of the nail polish application apparatus may be significantly reduced. For example, avoiding and/or reducing the need to clean and/or replace parts of the nail polish application apparatus that may come in contact with the nail polish fluid, for example, storage compartment(s), conveying tube(s), dispensing tube(s), brush(s) and/or the like. Reducing and/or simplifying the handling and/or the maintenance of the nail polish application apparatus may allow novice users to effectively use the nail polish application apparatus with no and/or minimal knowledge, experience and/or training thus making the nail polish application apparatus highly suitable for home use. Furthermore, separating the nail polish fluid from the nail polish application apparatus may significantly reduce the complexity of design and/or operation of the nail polish application apparatus since none of the nail polish application apparatus's parts comes in contact with the nail polish fluid. This may result in reduced cost of the nail polish application apparatus making the nail polish application apparatus coupled with the disposable capsule highly affordable and accessible to ordinary un-professional users.

Moreover, the various mechanisms supported by the nail polish application apparatus for implementing the pressure applying element may allow easy adaptation of the apparatus to a plurality of capsule designs and constructions. In addition, the straight forward nature of the pressure application action may further simplify the design, operation and/or maintenance of the nail polish application apparatus further reducing the cost of the nail polish application apparatus.

Furthermore, utilizing the capsule may ensure that the nail polish fluid used for the current application is not mixed and/or degraded by nail polish fluid residues left from previous applications as may happen in the existing devices employing multi-application implementations. The disposable single application nail polish applying element as utilized by the capsule may prevent degradation in the application quality, efficiency and/or operation as opposed to the existing devices that may experience such degradation over time and/or over multiple applications of the nail polish.

Another major benefit relates to drying the nail polish fluid and/or to curing the gel polish after applied to the nail surface. The drying/curing period of the nail polish after applied using the existing methods and/or devices, may be significant due to one or more materials, for example, solvents added to the nail polish fluid to prevent premature drying when exposed to the air. Since the nail polish fluid is stored in a sealed nail polish capsule intended for a single application, the anti-drying materials added to nail polish fluid may be significantly reduced and/or completely removed. Therefore after applied to the nail polish, the nail polish fluid may dry significantly quicker than the nail polish fluid typically used by the existing devices and may therefore significantly shorten the overall nail polish application process.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Several embodiments of an apparatus used for nail polish application are described hereinafter. However the presented embodiments should not be construed as limiting. A person skilled in the art may implement, construct, arrange and/or produce the nail polish application apparatus and/or parts thereof through multiple other implementations, structures, shapes, production methods and the like which employ the same concepts described throughout the present invention. Moreover, while one or more of the apparatus's features may be described hereinafter for one or more of the embodiments, one or more of the features may be applicable for other embodiments as well even when not explicitly stated.

Moreover, the nail polish application apparatus may utilize one or more disposable capsules containing nail polish fluid. While the capsule is out of scope of the present invention, some elements, features and/or mechanisms of the apparatus nail polish application may be adapted, configured and/or adjusted according to the structure, implementation and/or features of the capsule hosted by the nail polish application apparatus. The capsule(s) may therefore be described only to the extent required to describe, explain and present the nail polish application apparatus.

Referring now to the drawings, FIG. 1 is a schematic illustration of an exemplary apparatus utilizing a nail polish fluid capsule for applying nail polish fluid to nail surface(s), according to some embodiments of the present invention. An exemplary nail polish application apparatus 101A may utilize one or more disposable capsules containing nail polish fluid, in particular capsule(s) having an integrated nail polish applying element, for applying the nail polish fluid to one or more nail surface(s) of a user, for example, hand finger nails and/or foot toe nails. The nail polish application apparatus 101A comprises a control unit 102 which controls one or more actuators 104 adapted to move a mounting element 108 through a nail polish applying space 130. The mounting element 108 may include one or more capsule compartments 110 adapted to receive and accommodate one or more capsules containing nail polish fluid.

The control unit 102 may include one or more processing devices, for example, a processor (homogenous or heterogeneous), a controller and/or the like. The control unit 102 may further include storage for storing code, data and/or the like. The storage may include one or more persistent and/or volatile devices, for example, a Read Only Memory (ROM) device, a Flash device, a hard drive, an attachable storage media, a random access memory (RAM) and/or the like. The processing device(s) may execute one or more software modules, for example, a process, an application, an agent, a utility, a service and/or the like wherein a software module refers to a plurality of program instructions executed by a processor such as the processing device(s) from a program store such as the storage.

The control unit 102 may operate the actuator(s) 104 to move the mounting element 108 to maneuver the nail polish applying element integrated with the capsule over the nail surface(s) in order to apply the nail polish fluid to the nail surface(s). The actuator(s) 104 may move the mounting element 108 in a longitudinal axis crossing the nail polish applying space 130 and in a lateral axis perpendicular to the longitudinal axis. In addition, the actuator(s) 130 may be adapted to rotate the mounting element 108 around the longitudinal axis. Optionally, the actuator(s) 130 are adapted to move the mounting in an axis substantially perpendicular to the nail polish surface(s) in order to control the height of the nail polish applying element above the nail surface(s). The control unit 102 may further operate the actuator(s) 104 to move the mounting element 108 to position the mounting element 108 such that the capsule compartment(s) 110 are positioned next to an opening in the nail polish application apparatus 101A allowing the user to insert capsule(s) into the capsule compartment(s) 110.

The mechanical structure of the actuator(s) 104 moving the mounting element 108 may include one or more implementations, mechanisms and/or concepts to allow the actuator(s) 104 operated by the control unit 102 to move the mounting element 108 and hence the nail polish applying element through one or more of operational spaces of the nail polish application apparatus 101A, for example, the nail polish applying space 130, the preparation space 134, the drying space 136 and/or the nail polish removal space 138. For example, the actuator(s) 104 may move a 3 and/or 4 axes moveable grid to which the mounting element 108 is fixed. In another exemplary embodiment the actuator(s) 104 may move one or more rotating shafts and/or telescopic rotating shafts to which the mounting element 108 is fixed.

The actuator(s) 104 may be operated to move the mounting element 108 according to one or more coordinate systems, for example, a Cartesian coordinates, cylindrical coordinates, spherical coordinates, Euler angles with respect to a fixed coordinate system and/or the like. Naturally, the mechanical element(s) operated by the actuator(s) 104 to move the mounting element 108 may be adapted for movement along axes of the selected coordinate system(s). For example, the actuator(s) 104 may operate a 3-axes liner mechanism which may move the mounting element 108 along X, Y and/or Z axes of the Cartesian coordinate system. In another example, the actuator(s) 104 may operate a moveable telescopic arm which may be moved along Theta and/or Phi axes of a spherical coordinate system. In another example, the actuator(s) 104 may operate a moveable telescopic arm which may be operated to tilt, pitch and/or roll with respect to the plane of the nail surface.

The capsule insertion, opening and/or the capsule compartment(s) 110 may typically include a cover that may be further used to lock the capsule in place in the capsule compartment(s) 110. The control unit 102 may apply one or more coordinate systems for controlling the movement of the mounting element 108 in the 3D space, for example, Cartesian coordinates, polar coordinates and/or the like.

Optionally, in particular in case more than one capsule is used during the nail polish application session, multiple capsules may be placed in a capsule storage space which may be fixed, i.e. not moveable. The storage space may include one or more chambers, slots, drawers and/or the like in which the user may insert the capsules used for the current nail polish application session. The control unit 102 may maneuver the mounting element 108 to dispose and/or load a capsule from the storage space into the capsule compartment 110. For example, for an exemplary nail polish application apparatus 101A used in an exemplary nail polish application session, three disposable capsules may be placed in the storage space, a first capsule containing base coating fluid, a second capsule containing a nail polish fluid and a third capsule containing top coating fluid. The control unit 102 may maneuver the mounting element 108 to load the first capsule from the storage space in order to apply the base coating fluid to the nail surface(s). After applying the base coating fluid to the nail surface(s), the control unit 102 may maneuver the mounting element 108 to dispose of the first capsule and load the second capsule from the storage space in order to apply the nail polish fluid to the nail surface(s). After applying the nail polish fluid to the nail surface(s), the control unit 102 may maneuver the mounting element 108 to dispose of the second capsule and load the third capsule from the storage space in order to apply the top coating fluid to the nail surface(s).

The nail polish application apparatus 101A further comprises a pressure applying element 106, for example, a piston, a lead screw driven piston, a gear, a plunger, a peristaltic pump, a compressor, a magnetic field based mechanism and/or the like adapted to apply pressure to a body portion of the capsule which contains the nail polish fluid in order to force extrusion of the nail polish fluid to the nail polish applying element of the capsule. The control unit 102 may operate the pressure applying element 106 to control the applied pressure in order to control the flow of the nail polish fluid to the nail polish applying element. Optionally, according to some embodiments, the control unit 102 may control the pressure applying element 106 through one or more of the actuator(s) 104.

The nail polish application apparatus 101A includes one or more sensors 112, for example, an imaging sensor, a proximity sensor and/or the like which depict the nail polish applying space. The control unit 102 may receive and/or collect sensory data, for example, images, proximity information and/or the like before, during and/or after the nail polish application process. The control unit may analyze the sensory data in real time to control the nail polish application process. For example, based on the analysis, the control unit 102 may control the movement of the mounting element 108 by operating the actuator(s) 104 accordingly. The control unit may also control the pressure applied by the pressure applying element 106 according to the analysis of the sensory data.

The nail polish applying space 130 may include one or more finger sockets 132 each adapted to receive and accommodate the finger and/or the toe of the user in order to reduce potential movement of the finger(s) and hence movement of the nail surface(s) during the nail polish application process. Optionally, the nail polish application apparatus 101A includes a hand rest ledge 133 which may be constructed to provide ergonomic support for the user's hand and/or foot during the nail polish application process. The finger sockets 132 may be constructed and shaped to receive and accommodate one or more of a plurality of utilizations, for example, fingers of a single hand, fingers of two hands, five fingers of a first hand and a thumb of a second hand, toes of a single foot, toes of two feet and/or the like.

Reference is now made to FIG. 2A, FIG. 2B and FIG. 2C, which are schematic illustrations of exemplary finger sockets of a nail polish application apparatus, according to some embodiments of the present invention. As shown in FIG. 2A, the finger sockets 132 may be static and structured in one or more of a plurality of structures and/or materials shaped to receive and accommodate the fingers. For example, the finger socket(s) 132 may be structured as a flat plate having thin slots 132A which may mark the positioning of the fingers to allow for easy and accurate nail polish application. In another example, the finger socket(s) 132 may be structured as finger grooves 132B shaped to accommodate the finger(s) and reduce movement of the fingers to improve the nail polish application. In another example, the finger socket(s) 132 may be structured as barriers 132C shaped isolate each of the finger(s) and restrict the movement of the finger(s) to improve the nail polish application. In another example, the finger socket(s) 132 may be structured of soft material such as a "memory foam" finger socket 132D which may dynamically adapt to the shape of the finger(s) and hence further reduce movement of the finger during the nail polish application to improve the nail polish application results.

As shown in FIG. 2B, the nail polish apparatus 101A may adapted to accommodate a single hand thus having the finger socket(s) 132 adapted and/or structured to receive and accommodate fingers of a single hand. Optionally, the finger socket(s) 132 are adapted and/or shaped to receive and accommodate four of the hand fingers, for example, index finger, middle finger, ring finger and/or pinky finger. The finger socket(s) 132 may be further adapted and/or shaped to receive and accommodate the thumb. In such configuration, the nail polish application process may be conducted in two phases, one phase for applying the nail polish fluid to one or more of the index finger, the middle finger, the ring finger and/or the pinky finger and another phase for applying the nail polish fluid to the thumb.

As shown in FIG. 2C, the nail polish apparatus 101A may adapted to accommodate both hands of a user thus having the finger socket(s) 132 adapted and/or structured to receive and accommodate fingers of two hands. Optionally, the finger socket(s) 132 are adapted and/or shaped to receive and accommodate four of the hand fingers, for example, index finger, middle finger, ring finger and/or pinky finger of both hands. The finger socket(s) 132 may be further adapted and/or shaped to receive and accommodate the thumb of both hands. Similarly to the single hand configuration, the nail polish application process may be conducted in two phases, one phase for applying the nail polish fluid to one or more of the index finger, the middle finger, the ring finger and/or the pinky finger of both hands and another phase for applying the nail polish fluid to the thumb of both hands.

According to some embodiments of the present invention, the apparatus 101A includes one or more hand and/or finger restriction elements which may be placed, manually and/or automatically, over one or more of the finger(s) and/or hand(s) of the user once the fingers(s) are placed in the finger socket(s) 132. The hand and/or finger(s) restriction elements may restrict the hand and/or finger(s) to significantly limit, reduce and/or prevent movements of the hand and/or the fingers in order to accurately apply the nail polish fluid 310 to the nail surface and hence improve the nail polish application results.

Figure 2E:
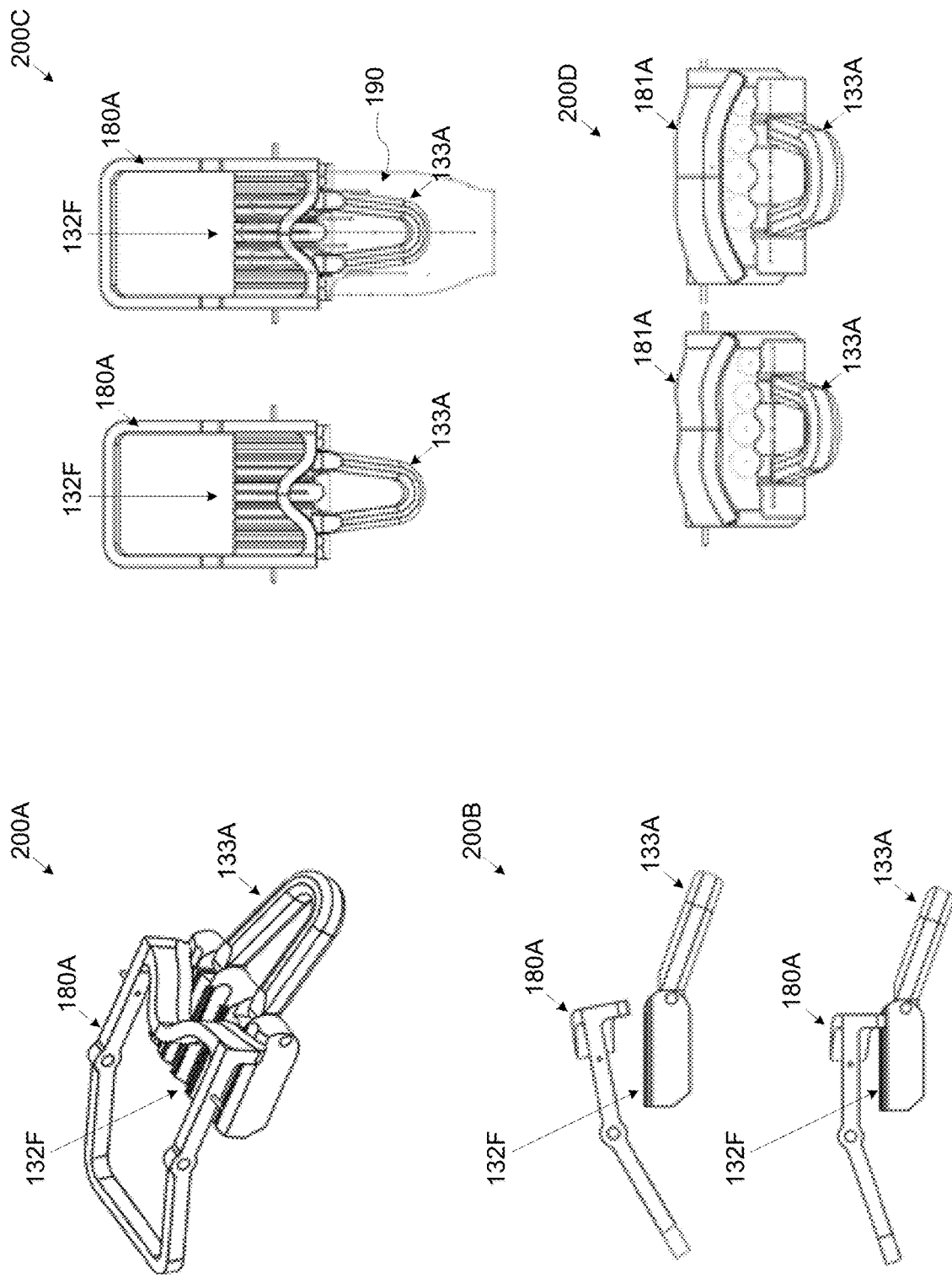
Figure 2F:
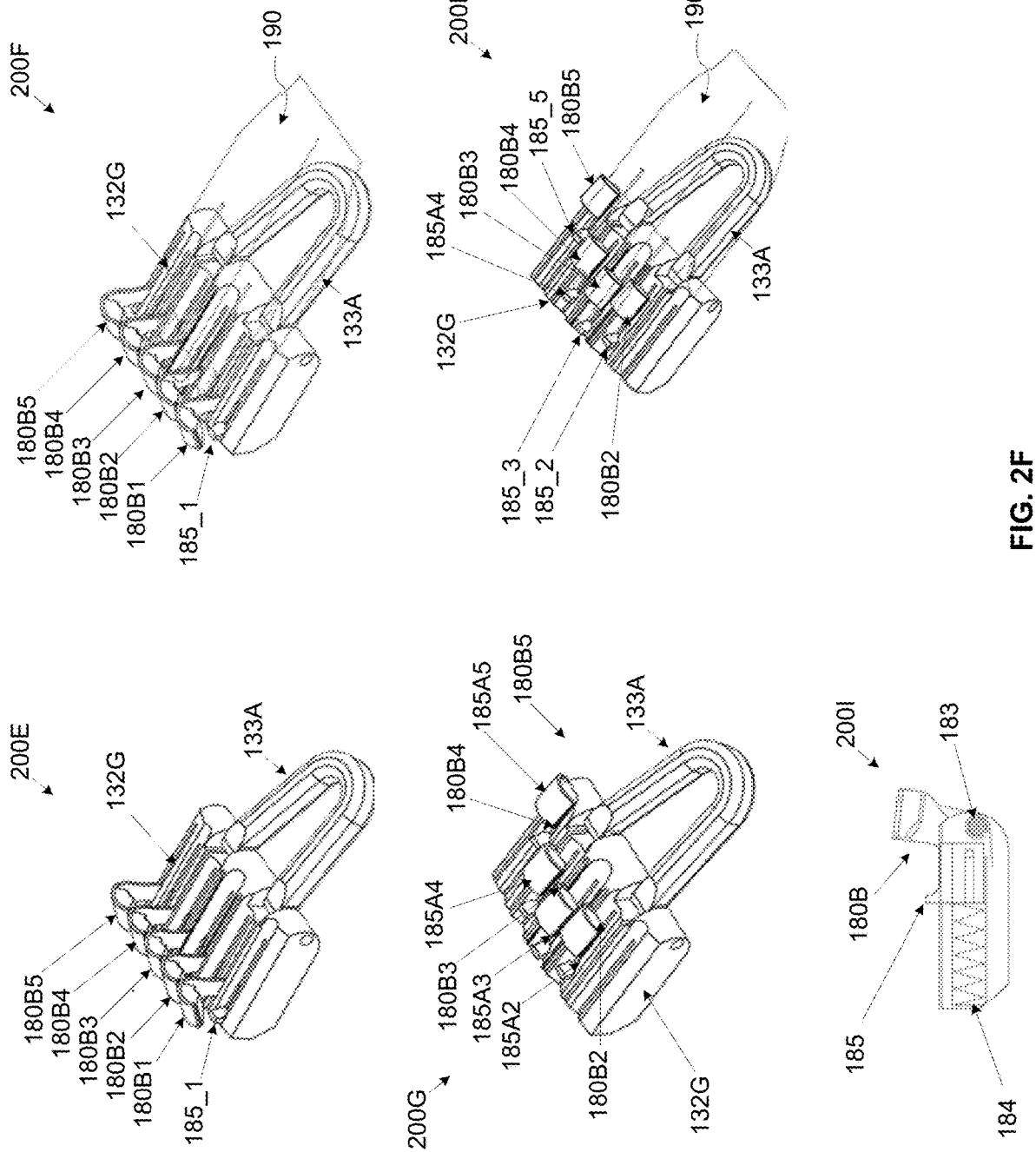
FIG. 2F and FIG. 2G are schematic illustrations of an exemplary finger restriction elements of a nail polish application apparatus, according to some embodiments of the present invention.
Figure 2G:
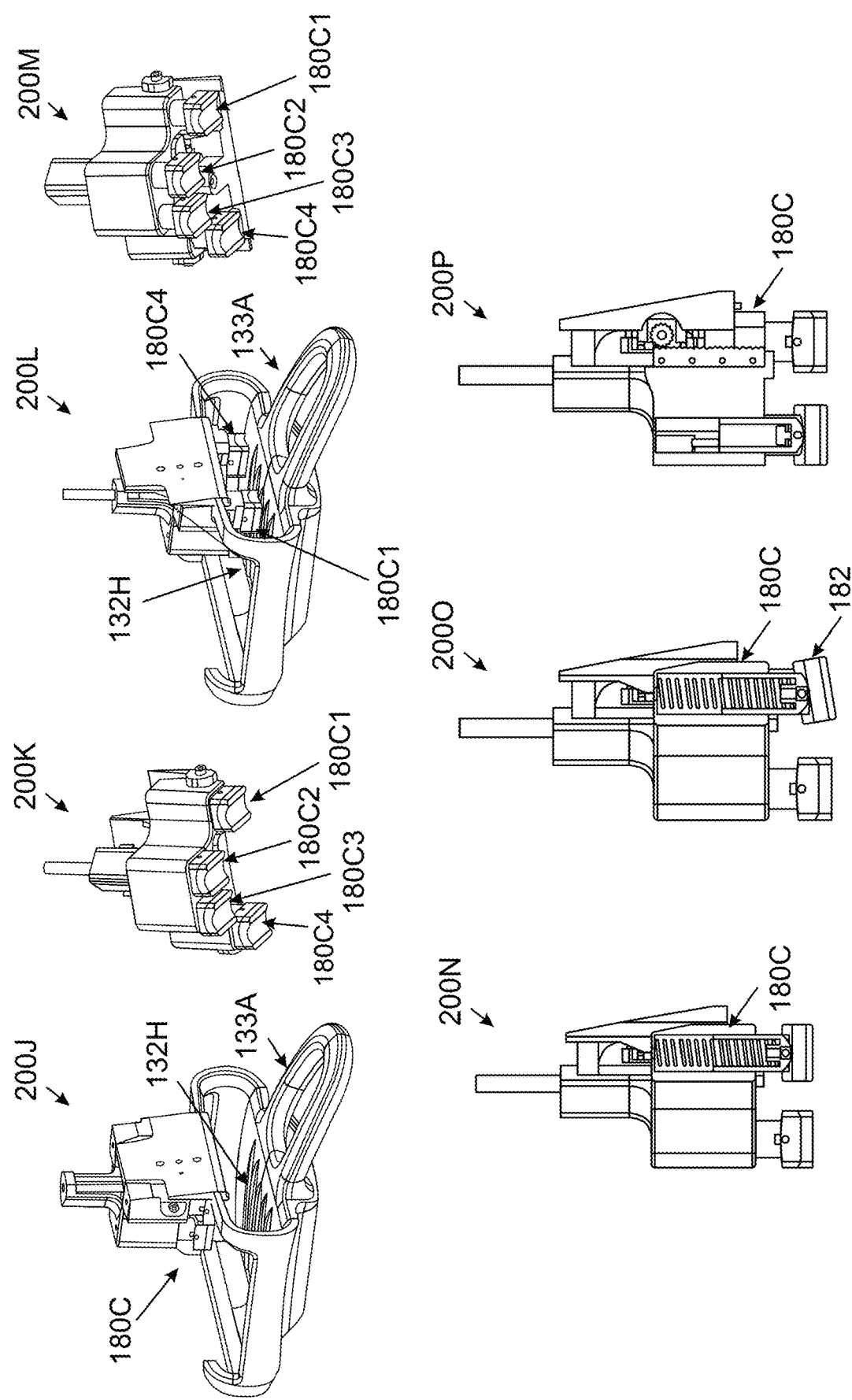

Reference is now made to FIG. 2D, FIG. 2E. FIG. 2F and FIG. 2G, which are schematic illustrations of an exemplary finger restriction elements of a nail polish application apparatus, according to some embodiments of the present invention.

As shown in FIG. 2D, the apparatus 101A includes one or more finger restriction elements 180 which may be placed, manually and/or automatically, over the fingers of the user once the fingers are placed in one or more finger socket(s) such as the finger socket(s) 132. The finger restriction element 180 may restrict the fingers to significantly reduce movement of the fingers in order to improve the nail polish application results. Additionally and/or alternatively, the apparatus 101A includes one or more hand restriction elements 181 which may be placed over one or more of the user hands once the finger(s) are placed in the finger socket(s) 132. Optionally, the finger(s) restriction element(s) 180 and/or the hand restriction element(s) 181 are static while the finger socket(s) 132 are moveable to force the finger(s) against the hand restriction element(s) 180 and/or 181 to restrict the movement of the finger(s) and/or the hand(s) respectively. The positioning (location) of the fingers restriction element 180 may be dynamically adjustable to press down on the fingers at a location which is significantly close to the nail surface thus improving the limitation, reduction and/or prevention of the finger(s) movements.

FIG. 2E presents a fingers restriction element 180A which is another exemplary embodiment of the fingers restriction element 180 that may be used in the apparatus 101A.

As shown in 200A, a fingers restriction element 180A may be shaped, for example, in at least partially curved shape and/or the like to make contact with each of the fingers of the user placed in finger sockets 132F such as the finger sockets 132. Optionally, a hand rest ledge 133A such as the hand rest ledge 133 which may be constructed to provide ergonomic support for the user's hand during the nail polish application session.

As shown at 200B, in its open state, the fingers restriction element 180A is lifted to allow the user to place his fingers in the finger sockets 132F. After the fingers are placed in their designated finger sockets 132F, the fingers restriction element 180A may be lowered, either manually by the user and/or automatically by the apparatus 101A, to a closed state in which it may press down on the fingers of the user against the finger sockets 132F. The fingers restriction element 180A may include an at least partially elastic material at its bottom face which is in contact with the fingers to adjust to the shape of each finger without inflicting pain and/or discomfort to the user. The finger socket(s) 132F may be covered with an at least partially elastic material at its top face to prevent discomfort to the user while pressure is applied on the finger(s) by the fingers restriction element 180A pressing them down towards the finger socket(s) 132F. The fingers restriction element 180A may be lifted and/or lowered to a plurality of positions to fit the pressure on the fingers against the finger sockets 132F. The upward/downward movement of the fingers restriction element 180A may be continuous and/or comprise a plurality of adjustment points. The fingers restriction element 180A may further include a locking mechanism for locking the fingers restriction element 180A in the closed state. The apparatus 101A may further include an emergency mechanism that unlocks automatically the fingers restriction element 180A, for example, in an event of "power off" of the apparatus 101A while the fingers restriction element 180A is in the closed state.

As shown at 200C, which is a top view of the finger sockets 132D and the fingers restriction element 180A, due to its partially curved shape, the fingers restriction element 180A in its closed state may come in contact with all fingers of a hand 190 of the user in order to press on them downwards towards the finger sockets 132F. The positioning (location) of the fingers restriction element 180A may be dynamically adjustable to press down on the fingers at a location which is significantly close to the nail surface thus improving the limitation, reduction and/or prevention of the finger(s) movements regardless of the size of the finger(s), the shape of the hand or the proportion of the finger(s) in a given hand As shown at 200D, which is a front view of the finger sockets 132F and the fingers restriction element 180A, the apparatus 101A may include a hand restriction element 181A. In its open state (left drawing), the hand restriction element 181A is lifted to allow the user to place his fingers in the finger sockets 132F. In its closed state (right drawing), the hand restriction element 181A is lowered to press down the hand of the user and significantly secure it in place. The hand restriction element 181A may include an at least partially elastic material at its bottom face which is in contact with the hand to adjust to the shape of the hand while avoiding inflicting pain and/or discomfort to the user.

FIG. 2F presents a fingers restriction element 180B of the apparatus 101A which comprises one or more individual restriction elements each adapted to restrict a respective finger.

As shown in 200E, the fingers restriction element 180B may be constructed with one or more individual restriction elements such as, for example, individual restriction elements 180B1, 180B2, 180B3, 180B4 and/or 180B5 each adapted to apply pressure to a respective finger of the user against a plurality of finger sockets 132G such as the finger sockets 132.

As shown at 200E and further at 200F which presents the same assembly as 200E with the hand of the user placed in the finger sockets 132G, in its open state, each of the individual restriction elements 180B1, 180B2, 180B3, 180B4 and/or 180B5 is lifted to allow the user to place his fingers in the finger sockets 132G.

As shown at 200G and further at 200H which presents the same assembly as 200G with the hand of the user placed in the finger sockets 132G, once the fingers of the user are placed in their designated finger sockets 132G, the individual restriction elements 180B1, 180B2, 180B3, 180B4 and/or 180B5 may be lowered, either manually by the user and/or automatically by the apparatus 101A, to a closed state. In the closed state, each of the individual restriction elements 180B1, 180B2, 180B3, 180B4 and/or 180B5 may press down the respective finger against the finger sockets 132G. One or more of the individual restriction elements 180B1, 180B2, 180B3, 180B4 and/or 180B5 may include an at least partially elastic material at its bottom face which is in contact with the respective finger to adjust to the shape of each finger without inflicting pain and/or discomfort to the user. The finger socket(s) 132G may be covered with an at least partially elastic material at its top face to prevent discomfort to the user while pressure is applied on the finger(s) by the fingers restriction element(s) 180B pressing them down towards the finger socket(s) 132G.

The individual restriction elements 180B1, 180B2, 180B3, 180B4 and/or 180B5 may further include a locking mechanism for locking each individual restriction element 180B1, 180B2, 180B3, 180B4 and/or 180B5 in its closed state. The apparatus 101A may further include an emergency mechanism that unlocks automatically the fingers restriction element(s) 180B, for example, in an event of "power off" of the apparatus 101A while the fingers restriction element(s) 180B is in the closed state.

As shown at 200G and 200H, one or more of the individual restriction elements 180B1, 180B2, 180B3, 180B4 and/or 180B5 may move along its respective finger socket 132G.

Positioning of each of the individual restriction elements 180B1, 180B2, 180B3, 180B4 and/or 180B5 with respect to the respective finger may therefore be adjusted according to a length of the respective finger. As such, the positioning (location) of 4 each of the individual restriction elements 180B1, 180B2, 180B3, 180B4 and/or 180B5 may be dynamically adjustable to press down on the respective finger at a location which is significantly close to the nail surface thus improving the limitation, reduction and/or prevention of the finger(s) movements regardless of the size of the finger(s), the shape of the hand or the proportion of the finger(s) in a given hand.

As shown at 200I, one or more of the finger sockets 132G may further include one or more tension elements 183 which may be adapted to apply pressure to a respective one of the individual restriction element 180B1, 180B2, 180B3, 180B4 and/or 180B5. The pressure applied by the tension element 183 may force the respective individual restriction element 180B to press down on the respective finger placed in the respective finger socket 132G thus limiting, reducing and/or preventing movement of the finger during the nail polish application process. Movement of each individual restriction element 180B1, 180B2, 180B3, 180B4 and/or 180B5 along the respective finger socket 132G may be facilitated by a finger limiting element 185 mechanically coupled to the respective individual restriction element 180B1, 180B2, 180B3, 180B4 and/or 180B5. The finger limiting element 185 may be shaped to come in contact with at least part of a tip of the respective finger placed in the respective finger socket 132G such that when the user placed his hand in the designated location for the nail polish application session. Each of the individual restriction element 180B1, 180B2, 180B3, 180B4 and/or 180B5 may further include a tension element 184, for example, a spring, an elastic band and/or the like which may move the respective individual restriction element 180B1, 180B2, 180B3, 180B4 and/or 180B5 towards the user. The user may push his fingers forward against the pressure applied by the tension elements 184 until his hand is properly in the designated place. As such, each individual restriction element 180B1, 180B2, 180B3, 180B4 and/or 180B5 may be properly placed at the desired location (significantly close to the nail surface) over their respective fingers. Optionally, the tension element is compressed and/or release automatically by one or more actuators operated automatically by the control unit 102.

FIG. 2G presents another exemplary implementation of a finger restriction element 180C of the apparatus 101A comprising one or more individual restriction elements each adapted to restrict a respective finger.

As shown at 200J, the fingers restriction element 180C placed above one or more finger sockets 132H such as the finger sockets 132. As shown at 200K which is a front perspective view of the fingers restriction element 180C, the fingers restriction element 180C may be constructed with one or more individual restriction elements such as, for example, individual restriction elements 180C1, 180C2, 180C3 and/or 180C4 each adapted to apply pressure to a respective finger of the user against the finger sockets 132H. In its open state, each of the individual restriction elements 180C1, 180C2, 180C3 and/or 180C4 is lifted to allow the user to place his fingers in the finger sockets 132H. As seen in 200J, the fingers restriction element 180C may be constructed to adapt to the anatomy of the human hand and fingers such that positioning of each of the individual restriction elements 180C1, 180C2, 180C3 and/or 180C4 with respect to the respective finger may be adjusted according to a length of the respective finger. As such, the positioning (location) of each of the individual restriction elements 180C1, 180C2, 180C3 and/or 180C4 may be dynamically adjustable to press down on the respective finger at a location which is significantly close to the nail surface thus improving the limitation, reduction and/or prevention of the finger(s) movements.

As shown at 200L and further at 200M which is a front perspective view of the fingers restriction element 180C, after the finger(s) are placed in their designated finger sockets 132H, one or more of the individual restriction elements 180C1, 180C2, 180C3 and/or 180C4 may be lowered down to the closed state to press down on their respective fingers against finger sockets 132H. One or more of the individual restriction elements 180C1, 180C2, 180C3 and/or 180C4 may include an at least partially elastic material at its bottom face which is in contact with the respective finger to adjust to the shape of each finger without inflicting pain and/or discomfort to the user. The finger socket(s) 132H may be covered with an at least partially elastic material at its top face to prevent discomfort to the user while pressure is applied on the finger(s) by the fingers restriction element(s) 180C pressing them down towards the finger socket(s) 132H. The individual restriction elements 180C1, 180C2, 180C3 and/or 180C4 may further include a locking mechanism for locking each individual restriction element 180C1, 180C2, 180C3 and/or 180C4 in its closed state. The apparatus 101A may further include an emergency mechanism that unlocks automatically the fingers restriction element(s) 180C, for example, in an event of "power off" of the apparatus 101A while the fingers restriction element(s) 180C is in the closed state. The positioning (location) of the fingers restriction element(s) 180C may be set such that each of the individual restriction elements 180C1, 180C2, 180C3 and/or 180C4 may press down on the respective finger at a location which is significantly close to the nail surface thus improving the limitation, reduction and/or prevention of the finger(s) movements regardless of the size of the finger(s), the shape of the hand or the proportion of the finger(s) in a given hand.

As shown at 200N one or more of the individual restriction elements 180C1, 180C2, 180C3 and/or 180C4 may include a tension element, for example, a spring, a coil, an elastic band, etc. for applying pressure to press down the respective finger against the finger socket 132H. Applying pressure to the tension element may be done manually by the user or automatically by the apparatus 101A. For example, a control unit such as the control unit 102 may operate one or more actuators to apply/release pressure to the tension element and move down/up one or more of the individual restriction elements.

As shown at 200O one or more of the individual restriction elements 180C1, 180C2, 180C3 and/or 180C4 may include an adjustable pressing surface 182 which is in contact with the respective finger placed in the respective finger socket 132H. The adjustable pressing surface may include a joint which may allow movement and/or rotation of the individual restriction elements 180C in one or more axes to adapt to a shape of the respective finger.

As shown at 200P one or more of the individual restriction elements 180C1, 180C2, 180C3 and/or 180C4 may include a restriction pressing element, for example, a rack and pinion, etc. for applying pressure to press down the respective finger against the finger socket 132H. The control unit 102 may operate one or more actuators to operate the restriction pressing element and move it down/up to control the respective individual restriction element 180C. Such a restriction pressing element may significantly improve accuracy of the pressure applied by each individual restriction element 180C to the respective finger placed in the respective finger socket 132H. In another example, the control unit 102 may operate one or more actuators to move down/up a restriction pressing element controlling a plurality of the individual restriction elements 180C1, 180C2, 180C3 and/or 180C4 together. In another example, the control unit 102 may operate one or more actuators to move down/up an entire housing and/or rack comprising the plurality of the individual restriction elements 180C1, 180C2, 180C3 and/or 180C4 thus moving the individual restriction elements 180C1, 180C2, 180C3 and/or 180C4 down/up together.

According to some embodiments of the present invention, the apparatus 101A includes one or more skin pushing elements for pushing backward skin under the nail surface of at least one of the fingers and/or for pushing sideways skin around the nail surface of at least one of the fingers to at least partially separate the skin from the nail surface. This may significantly improve application of the nail polish fluid 310 to the nail surface while avoiding application of the nail polish 310 to the skin thus significantly improving the nail polish application results. Pushing back the skin under the nail surface may be of particular benefit in case where the nail surface does not extend to the length of the fingertip and/or the nail surface ends at the fingertip. Pushing sideways the skin around the nail surface may significantly improve exposure of border lines of the nail surface(s) to avoid applying the nail polish fluid 310 to the skin around the nail surface.

Figure 2H:
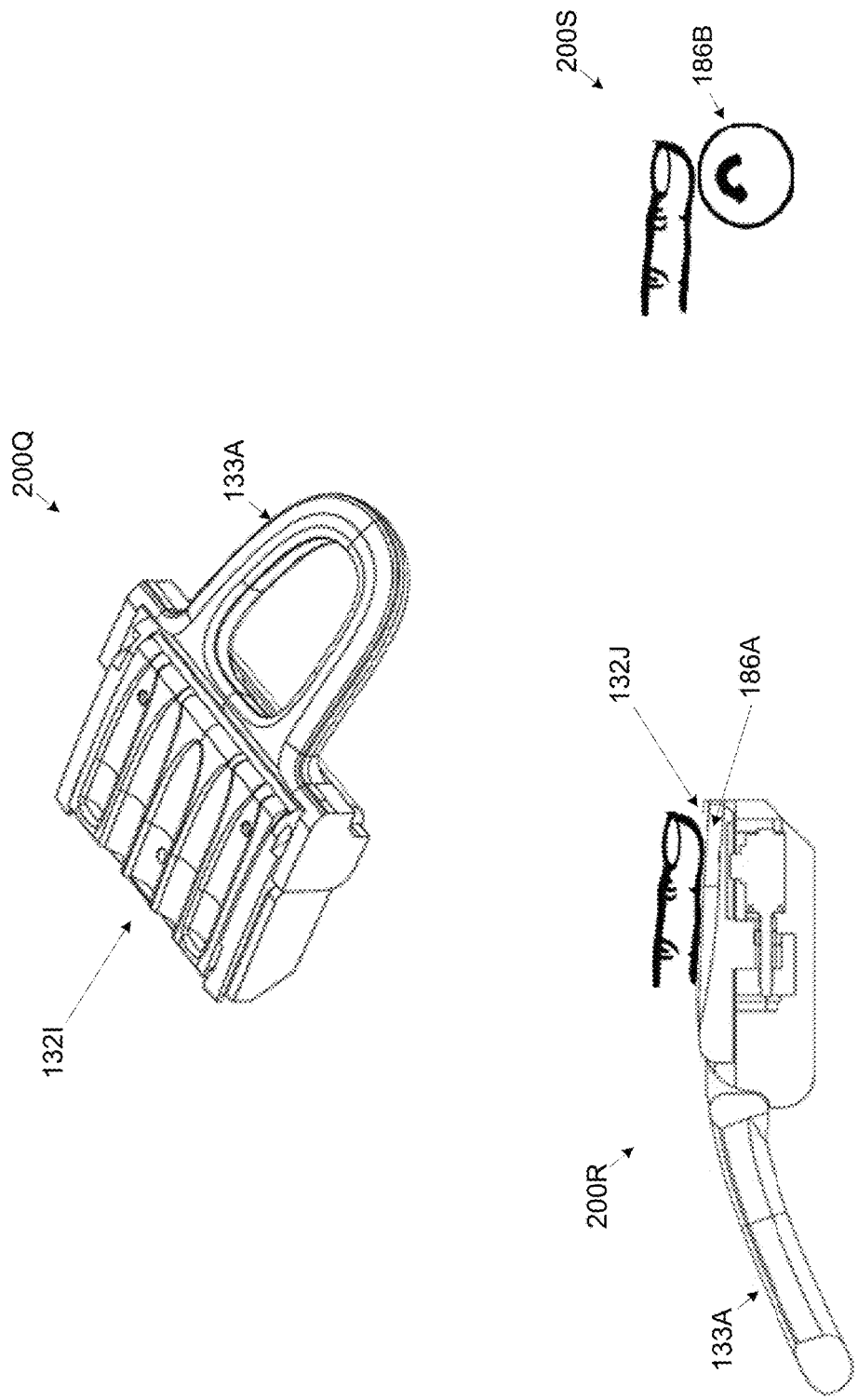
FIG. 2H and FIG. 2I present schematic illustrations of exemplary skin pushing elements of a nail polish application apparatus, according to some embodiments of the present invention.
Figure 2I:
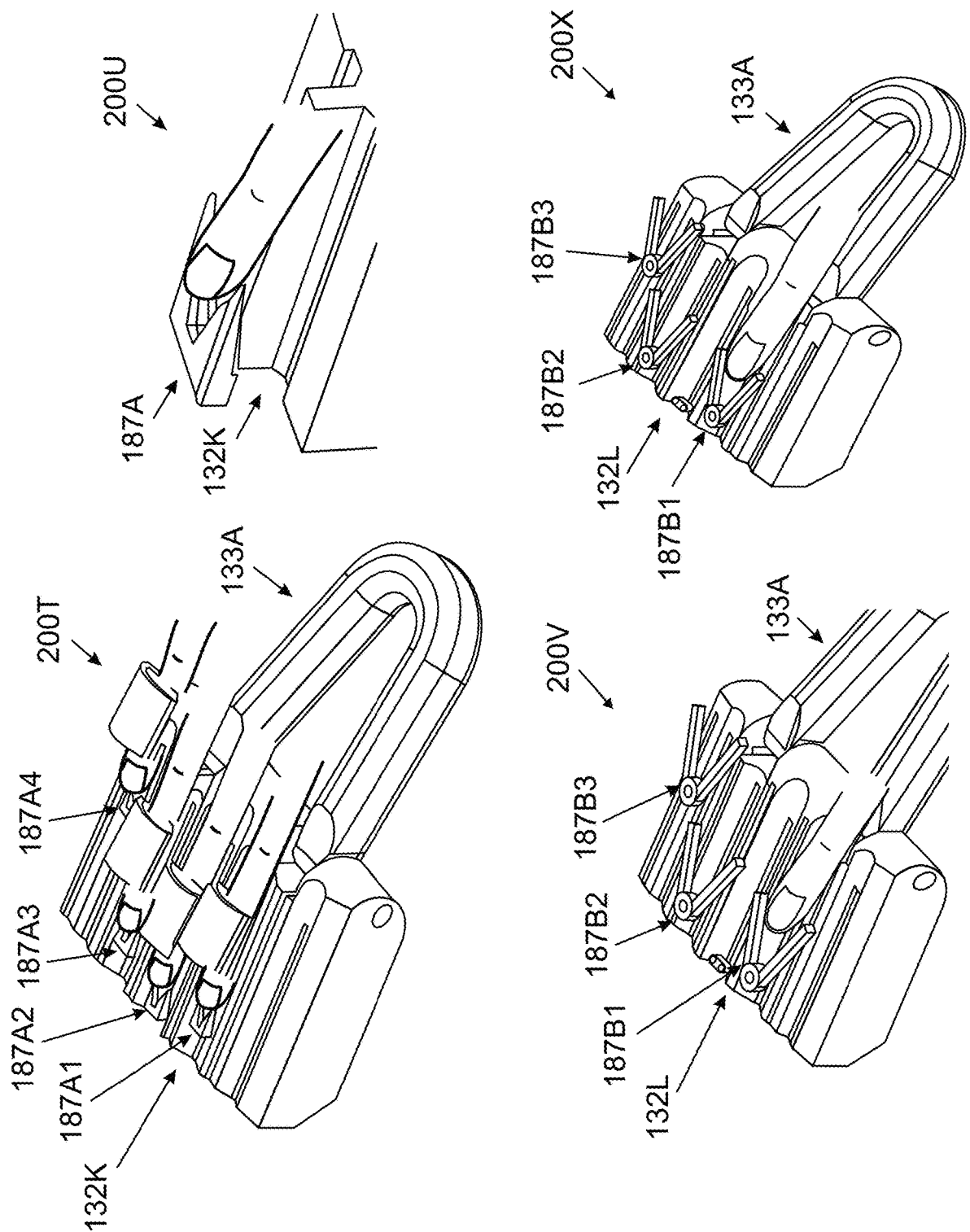

Reference is now made to FIG. 2H and FIG. 2I, which present schematic illustrations of exemplary skin pushing elements of a nail polish application apparatus, according to some embodiments of the present invention.

As shown in FIG. 2H, one or more finger sockets 132I and/or 132J such as the finger socket 132 of an apparatus such as the apparatus 101A may be constructed to include one or more skin pushing elements 186 for pushing backwards skin of at least one of the fingers of the user, specifically skin under the nail surface to at least partially separate the skin from the nail surface.

As shown at 200Q, the skin pushing elements 186 may be utilized, for example, by a significantly coarse surface covering at least part of the finger socket 132I specifically a section of the finger socket 132I which is in contact with the fingertip of the finger. For example, the finger socket 132I may be produced to have such a coarse surface finish. In another example, the coarse surface may be attached, applied and/or coupled to the finger socket 132I. When the user inserts his finger(s) to the respective finger socket 132I and pushes it forward the drag of the coarse surface may cause the skin under the nail surface to be significantly pulled back thus partially separating the skin under the nail surface and optionally skin at the sides of the fingertip from the nail surface.

As shown at 200R, in another example, the finger socket(s) 132J may include a moveable section 186A which is in contact with at least part of the finger of the user when placed in the finger socket 132I, specifically in contact with the fingertip of the finger. Similarly to the finger socket(s) 132I, the moveable section 186A may include the coarse surface covering at least the section in contact with the fingertip of the finger when the finger is placed in the finger socket 132J. After the finger is placed in the finger socket 132J, the moveable section 186A may be moved backwards (towards the user). The drag the coarse surface of the moveable section 186A may cause the skin under the nail surface to be pushed backwards thus at least partially separating the skin from the nail surface. The moveable section 186A may be moved forwards and backwards using one or more elements, for example, a rack and pinion, a spring and/or the like which may be moved by one or more actuators operated by a control unit such as the control unit 102.

As shown at 200S, in another example, the finger socket(s) 132J may include a rotatable section 186B which is in contact with at least part of the fingertip of the finger of the user when placed in the finger socket 132I. As described for the moveable section 186A, the rotatable section 186B may include the coarse surface covering at least a section typically a section in contact with the fingertip of the finger when the finger is placed in the finger socket 132J. After the finger is placed in the finger socket 132J, the rotatable section 186B may be rotated, for example, counterclockwise. The drag the coarse surface of the rotatable section 186B may cause the skin under the nail surface to be pushed backwards thus at least partially separating the skin from the nail surface. The moveable section 186B may be rotated using one or more elements, for example, a shaft, a rack and pinion, a spring and/or the like which may be moved by one or more actuators operated by a control unit such as the control unit 102.

As shown in FIG. 2I, one or more finger sockets 132K and/or 132L such as the finger socket 132 of the apparatus 101A may be constructed to include one or more skin pushing elements 187 for pushing sideways skin around at least one side of the nail surface of at least one of the fingers of the user to at least partially separate the skin from the nail surface and improve exposure of the borders of the nail surface.

As shown at 200T, one or more exemplary skin pushing elements 187A, for example, 187A1, 187A2, 187A3 and/or 187A4 may be constructed in a shape, for example, a U shape, a V shape and/or the like adapted to at least partially press down on the fingertip skin around the nail surface of a respective finger of the user while avoiding contact and/or pressure to the nail surface itself. The skin pushing elements 187A may be constructed such that when applied to the skin around the nail surface, the skin pushing elements 187A expose (not block) the nail surface to allow application of the nail polish fluid 310 to the nail surface.

As shown at 200U, the skin pushing element(s) 187A may comprise a positioning mechanism adapted to lift the skin pushing element(s) 187A to allow the user to place his finger(s) in the finger socket(s) 132K. Once the finger(s) is placed in its respective finger socket 132K, the positioning mechanism may be lowered, manually by the user and/or automatically by one or more actuators operated by a control unit such as the control unit 102 to press down on the skin around the nail surface and move it sideways to separate it, at least partially from the nail surface.

As shown at 200V and 200X, another exemplary skin pushing elements 187B, for example, 187B1, 187B2 and/or 187B3 may be constructed as moveable arms adapted to move sideways. As shown at 200V, in their open state, the exemplary skin pushing element(s) 187B have their arms open wide to allow the user to place his finger(s) in the finger socket(s) 132L. As shown at 200X, once the finger(s) is placed in its respective finger socket 132L, the moveable arms of the skin pushing element(s) 187B may be operated to move inwards towards the fingertip of the respective finger placed in the respective finger socket 132L. In particular, the skin pushing elements 187B may be constructed, positioned and/or operated to come in contact with the lower side of the fingertip thus when applying inward pressure to the skin of the fingertip, the skin around the nail surface is pushed sideways and possible downwards to expose the borders of the nail surface. The skin pushing element(s) 187B may be operated manually by the user and/or automatically by one or more actuators operated by a control unit such as the control unit 102.

The effect of the skin pushing done by the skin pushing elements, for example, the skin pushing elements 186 and/or 187 may be further improved by the press down of the finger restriction element, such as the finger restriction element 180B and/or 180C which may restrict, limit, reduce and/or prevent movement of the finger(s) while the moveable section 186A and/or the rotatable section 186B are operated to push the fingertip skin backwards to separate the skin from the nail surface.

Optionally, one or more of the skin pushing elements, for example, the skin pushing elements 186 and/or 187 may be combined with one or more of the finger restriction elements 180, for example, the finger restriction element 180B. For example, a finger limiting element such as the finger limiting element 185 of the finger restriction elements 180 may be shaped, constructed and/or adapted to come in contact with a lower segment of the fingertip. Therefore when the finger limiting element 185 is moved, manually and/or automatically to adjust to the finger length, the finger limiting element 185 may push back the skin under the finger nail thus at least partially separating the skin from the finger nail. In another example, the finger limiting element 185 may be shaped, constructed and/or adapted to include the skin pushing element 187 adapted to push sideways the skin around the nail surface, for example, the skin pushing elements 187A and/or 187B.

According to some embodiments of the present invention the finger socket(s) 132 is constructed as part of a dynamically moveable hand holding element shaped to receive and accommodate one or more fingers of a human hand while fully exposing one or more of the nail surfaces of the fingers of the user for application of the nail polish fluid.

Reference is now made to FIG. 2J and FIG. 2K, which are schematic illustrations of an exemplary dynamically movable hand holding element of a nail polish application apparatus, according to some embodiments of the present invention. A hand holding element 137 may be dynamically moveable, in particular rotatable and/or tilted by one or more actuators such as the actuator 104 operated by a control unit such as the control unit 102. As shown in FIG. 2J, an exemplary tilting hand holding element 137A such as the hand holding element 137 may be shaped as a substantially flat surface shaped to receive and accommodate the human hand. The tilting hand holding element 137A may include one or more finger sockets such as the finger socket(s) 132. The tilting hand holding element 137A may be tilted clockwise and/or counterclockwise to position and/or align the respective nail surface(s) with the nail polish applying element. As shown in FIG. 2K, an exemplary rotating hand holding element 137B such as the hand holding element 137 may be shaped rotating "gripping" surface which the user may grip with his hand similarly to a video game controller gripping surface. The tilting hand holding element 137A may include one or more finger sockets such as the finger socket(s) 132, in particular a curved finger socket 132E which is shaped as an ergonomically curved surface shaped to receive and accommodate the human hand. Optionally, the curved finger socket 132E is constructed of a high friction material, for example, silicon to increase traction between the finger(s) and the curved finger socket 132E. In some embodiments, the curved finger socket 132E is designed to include, for example, dent(s), depression(s), cavity(s), chambers and/or the like shaped to receive and accommodate the finger(s). The rotating hand holding element 137B may be rotated clockwise and/or counterclockwise to position and/or align the respective nail surface(s) with the nail polish applying element. Naturally, the hand holding element 137 may be flipped and/or reversed to receive each of the right and/or left human hands. Optionally, the hand holding element 137 includes a locking mechanism that enables locking the hand holding element 132E in the desired angle, position and/or location during the nail polish application sequence to the respective nail surface(s).

According to some embodiments of the present invention, the hand holding element 137 is shaped and/or adapted to receive and accommodate only some of the fingers rather than the entire hand, for example, the index finger, the middle finger, the ring finger, the pinky finger and/or the thumb The control unit 102 may operate the respective actuator 104 to move, rotate and/or tilt the hand holding element 137 in one or more axis such that one or more of the nail surfaces face, for example, are aligned with a plane perpendicular to a nail polish applying element adapted to apply nail polish fluid over the respective nail surface(s). For example, the control unit 102 may operate the respective actuator 104 to rotate and/or tilt the hand holding element 137 clockwise and/or counterclockwise to align the respective nail surface(s) with the nail polish applying element. The control unit 102 may operate the respective actuator 104 to move, rotate and/or tilt the hand holding element 137 during the application of the nail polish fluid to one of the finger surfaces, between applications of the nail polish fluid to two of the nail surfaces and/or between the application of the nail polish fluid to one or more of the index, middle, ring and/or pinky fingers and the application of the nail polish fluid to the thumb.

Optionally, the nail polish application apparatus 101A includes one or more puncturing elements 114 for puncturing one or more openings in the body portion of the capsule(s) and/or in a conveying tunnel connecting the body portion of the capsule(s) to the nail polish applying element to allow the nail polish to flow from the body portion to the nail polish applying element.

Optionally, the nail polish application apparatus 101A includes one or more drying elements 116, for example, an air blower, a heated air blower, a heating element, a light based heating element (e.g. a light emitting diode (LED), etc.), a drying material applicator and/or the like which may be operated by the control unit 102 to dry the nail polish fluid after applied to the nail surface(s). The drying element(s) 116 may be further adapted, distributed and/or positioned to cure a gel polish type of the nail polish fluid after applied to the nail surface(s). The drying element(s) 116 may be distributed in the nail polish application apparatus 101A to dry the nail polish fluid applied on the nail surface(s) in the nail polish applying space 130. Optionally, the nail polish application apparatus 101A comprises a separate drying space 136 in which one or more of the drying element(s) 116 may be distributed to dry the nail polish fluid applied on the nail surface(s) in the drying space 136. Drying the nail polish fluid applied on the nail surface(s) may therefore be done in the nail polish applying space 130 and/or in the drying space 136.

The control unit 102 may instruct execution of one or more preparation operations, for example, loading the capsule from the storage space into the capsule compartment 110, removing a cover from the capsule(s), shaking the capsule(s) to achieve a homogenous composition of the nail polish fluid contained in the capsule, calibrating a positioning of the nail polish applying element with respect to one or more reference points, cleaning the nail polish applying element, puncturing the capsules' body portion, puncturing the cover of the capsule, estimating a saturation level of the nail polish applying element with the nail polish fluid and/or the like. One or more of the preparation operations may be conducted in the nail polish applying space 130, i.e. after moving the mounting element 108 to the nail polish applying space 130. Optionally, the nail polish application apparatus 101A includes a preparation space 134 in which one or more of the preparation operations may be conducted.

Optionally, the nail polish application apparatus 101A includes one or more nail polish removal elements 118 for removing nail polish residue from the nail surface(s). One or more of the nail polish removal elements 118 may be configured, located and adapted to remove the nail polish residue (from a previous nail polish application session) in the nail polish applying space 130 after the user places the finger(s) and/or toe(s) in the nail polish applying space 130. Optionally, the nail polish application apparatus 101A includes a nail polish removal space 138. One or more of the nail polish removal elements 118 may be distributed, located, configured and/or adapted to remove the nail polish residue in the nail polish removal space 138 after the user places the finger(s) and/or toe(s) in the nail polish removal space 138.

Figure 3A:
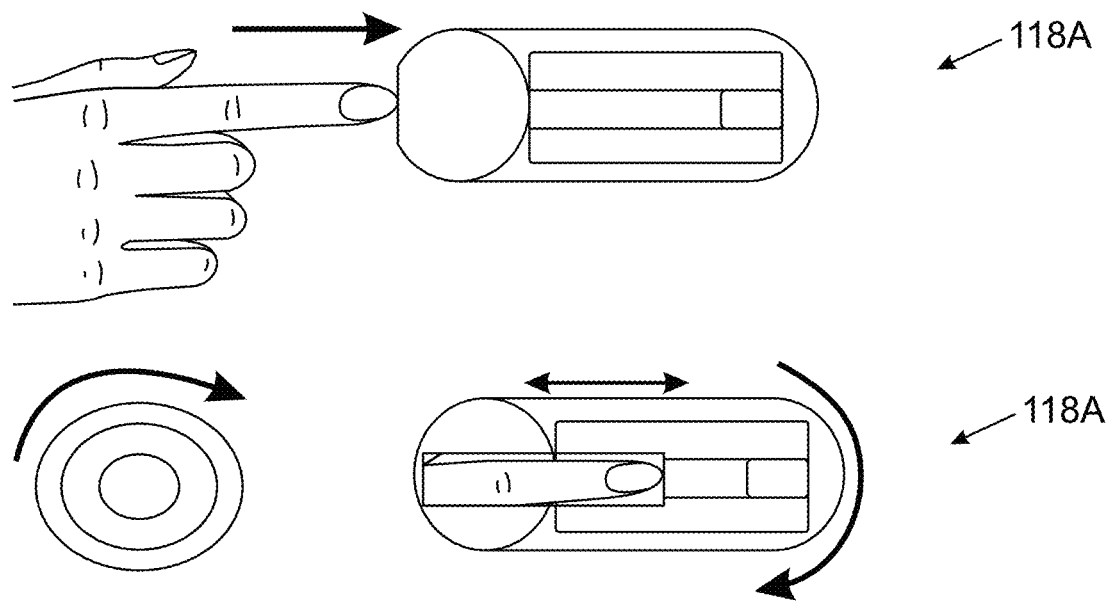
FIG. 3A and FIG. 3B are schematic illustration of exemplary nail polish removal elements of a nail polish application apparatus, according to some embodiments of the present invention.
Figure 3B:
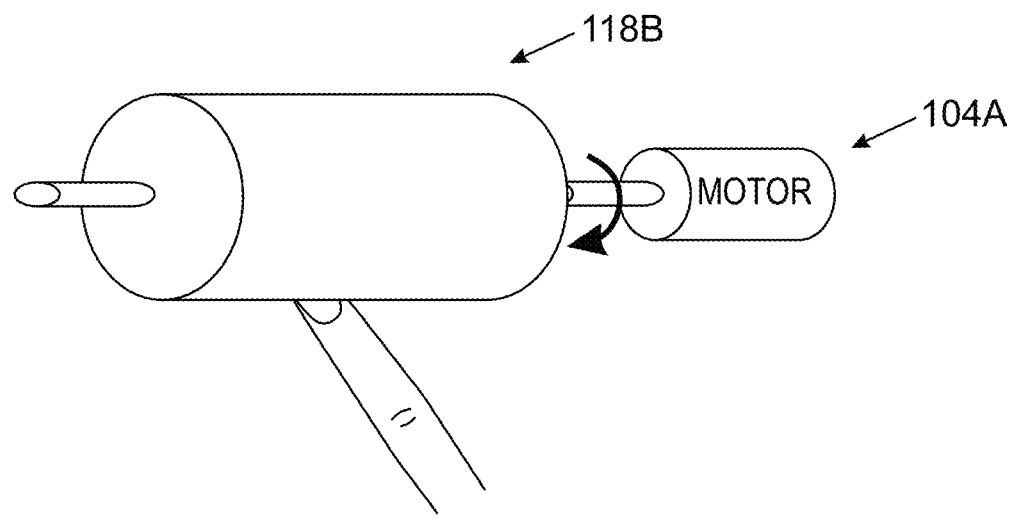

Reference is now made to FIG. 3A and FIG. 3B, which are schematic illustration of exemplary nail polish removal elements of a nail polish application apparatus, according to some embodiments of the present invention. A nail polish removal element such as the nail polish removal elements 118 may be produced using one or more materials, for example, a sponge material which may be infused with one or more nail polish removal solvents, for example, acetone and/or the like. The nail polish removal elements 118 may be constructed using one or more structures, mechanisms and/or implementations. As shown in FIG. 3A, the nail polish removal elements 118 may be constructed to include a housing shaped to host, for example, a hollow cylinder shaped sponge to receive and accommodate at least a tip of a finger of the user, in particular the finger section comprising the nail surface. The user may place one of his fingers, in particular his fingertip comprising the nail surface into the hollow cylinder shaped sponge which may be infused with the nail polish removal solvent(s). Optionally, a control unit such as the control unit 102 may operate one or more actuators such as the actuator 104 to spin the nail polish removal elements 118 such that the cylinder shaped sponge spins around the fingertip and cleans the nail surface and/or removes nail polish fluid residues from the nail surface.

As shown in FIG. 3B, the nail polish removal elements 118 may be constructed to include a spinning element on which the cylinder shaped sponge, for example, may be placed. The control unit 102 may operate the actuator(s) 104 to spin the spinning element of the nail polish removal elements 118 such that the cylinder shaped sponge spins around the axis of the spinning element. The user may place his fingertip, in particular the nail surface against the spinning cylinder shaped sponge which may clean and/or remove nail polish fluid residues from the nail surface. Optionally, the hollow cylinder sponge is disposable and may be replaced after one or more nail polish removal sessions. The disposable hollow cylinder sponge may be removed from the housing of the nail polish removal elements 118 and replaced with a new disposable hollow cylinder sponge.

Optionally, the nail polish application apparatus 101A includes a user interface 120 operated by the control unit 102 for interacting with one or more users using the nail polish application apparatus 101A. The user interface 120 may include indications which may present states, status and/or indications relating to the nail polish application apparatus 101 and/or the nail polish application session process. The status indications may include, for example, ON/OFF indication, a malfunction indication, a capsule proper/improper positioning indication, type of the nail polish fluid (e.g. base, top, polish, etc.), color of the nail polish fluid, a progress status of the nail polish application session and/or the like. The user interface 120 may include one or more indication lights, for example, an ON/OFF indication light, a malfunction indication light, a status indication light and/or the like. The user interface 120 may also include one or more control switches, for example, a button, a switch, a lever and/or the like, for example, an ON/OFF button, a reset button, a mode selection dial and/or the like. The user interface 120 may further include a display, for example, a Liquid Crystal Display (LCD) and/or the like allowing the control unit 102 to present information to the user, for example, status information, progress of the nail polish application session and/or the like. The screen may further be a touch screen to allow the user to interact with the control unit 102. The user interface 120 may also include a sound interface, for example, a speaker, a buzzer, a piezoelectric device and/or the like for generating one or more sound indications, for example, a ready sound indication, a failure sound indication and/or the like.

Optionally, the nail polish application apparatus 101A includes a network interface 122 operated by the control unit 102 for communicating with one or more remote devices over on more networks 150. The network interface 122 may support one or more communication protocols, standards, implementations and/or deployments. The network interface 122 may support, for example, Wireless Local Area Network (WLAN), Bluetooth, Near Field communication (NFC), cellular communication and/or the like. The network interface 122 may support infrastructure connection(s), for example, WLAN (e.g. Wi-Fi) through one or more infrastructure devices, for example, an access point, a router, a switch and/or the like. The network interface 122 may further support ad-hoc and/or point-to-point connections, for example, WLAN (e.g. ad-hoc Wi-Fi), Bluetooth and/or the like. Through the network interface 122, the control unit 102 may communicate with the remote device(s), for example, a mobile device of the user, a local network node and/or the like. In such implementation, the control unit 102 may communicate with the mobile device of the user to present information to the user through a display of the mobile device, for example, the status information, the progress of the nail polish application session and/or the like. In case the network interface 122 is connected to an infrastructure network providing access to the internet, the control unit 102 may further communicate with one or more remote servers, cloud services and/or the like.

The nail polish application apparatus 101A includes a power supply 140 for powering one or more of the operational units of the nail polish application apparatus 101A, for example, the control unit 102, the actuator(s) 140, the pressure applying element 106 and/or the like. The power supply 140 may include a power circuit adapted to receive power from a power grid, for example, 110 Vac/60 Hz, 220 Vac/50 Hz and/or the like. The nail polish application apparatus 101A may include a power cord connecting the power supply 140 to a power outlet. In another example, the power supply 140 may be adapted to receive its power from a DC power source providing, for example, 3 Vdc, 5 Vdc, 12 Vdc, 24 Vdc and/or the like. Optionally, the power supply 140 includes a power circuit is adapted to utilize one or more batteries to generate the power for the operational units of the nail polish application apparatus 101A. The power supply 140 may further include a charging circuit for recharging the batteries from the power grid. In case the power supply 140 is capable of utilizing the battery(s), the nail polish application apparatus 101A may include a battery(s) compartment adapted to receive and accommodate one or more batteries. The battery(s) compartment may be fitted with contacts to connect the battery(s)' poles to the power circuit of the power supply 140.

Figure 4A:
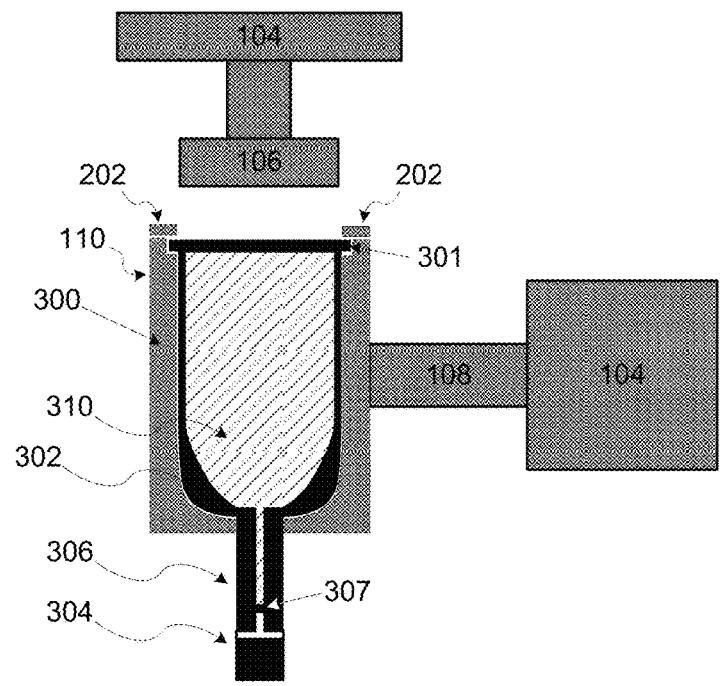
FIG. 4A and FIG. 4B are longitudinal cross section views of exemplary capsule compartments of a nail polish application apparatus, according to some embodiments of the present invention.
Figure 4B:
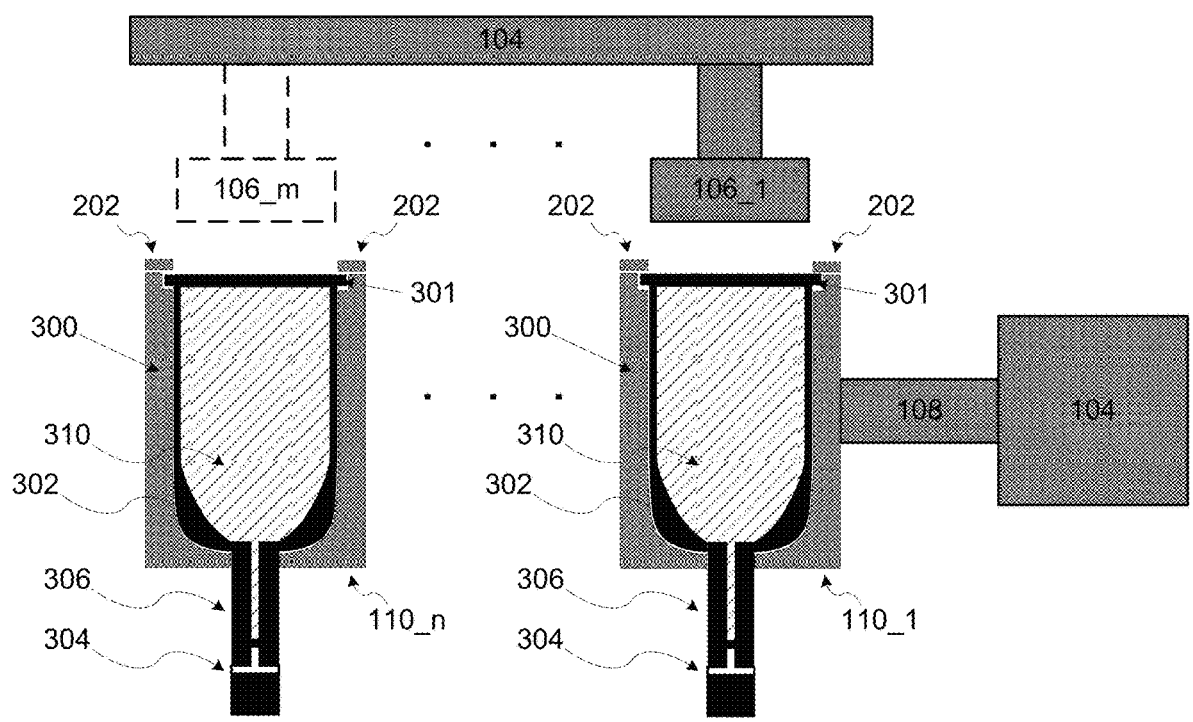

Reference is now made to FIG. 4A and FIG. 4B, which are longitudinal cross section views of exemplary capsule compartments of a nail polish application apparatus, according to some embodiments of the present invention. As shown in FIG. 4A, an exemplary capsule compartment such as the capsule compartment 110 of a nail polish application apparatus such as the nail polish application apparatus 101A may be adapted to receive and accommodate a nail polish capsule 300, in particular a nail polish capsule having an integrated nail polish applying element. The capsule compartment 110 may typically be part of a mounting element such as the mounting element 108 moved by one or more actuators such as the actuator 104.

The capsule 300 may be disposable and intended for a single application of nail polish fluid 310 on the nail surface(s) of the user's hands fingers and/o feet toes. The capsule 300 may typically be constructed of a body portion 302, an integrated nail polish applying element 304 and a discharge nozzle 306 connecting the body portion 302 to the nail polish applying element 304. The body portion 302 defines a reservoir adapted to contain the nail polish fluid 310, for example, polish fluid, a base coating fluid, a top coating fluid, a gel polish, a drying material, a polish removal fluid, a nail art polish fluid, a medical nail treatment fluid and/or the like. The discharge nozzle 306 may include one or more conveying tunnels to convey the nail fluid 310 from the body portion 302 to the nail polish applying element 304. The body portion 302 may be constructed in one of a plurality of shapes, for example, a cylinder, a cone, a pyramid, a box and/or the like. The body portion 302 may be further shaped to funnel the nail polish fluid 310 towards the discharge nozzle 306, for example, as an inverted cup-shaped body, as a conic like shaped body and/or the like. The amount of the nail polish fluid 302 contained in the body portion 103 may pre-defined to suffice for a single application of the nail polish fluid 310 on one or more nail surface(s), for example, a single nail surface, the nail surfaces of a single hand, the nail surfaces of two hands, the nail surfaces of two feet and/or the like. The shape of the capsule compartment 110 may therefore be mechanically constructed to adapt to the shape of the capsule 300.

The nail polish applying element 304 integrated with the capsule 300 may include a dispensing head comprising hair strands such that the nail polish fluid 310 flows over the hair strands dispensing the nail polish fluid 310 over the nail surface. Additionally, and/or alternatively, the nail polish applying element 304 dispensing head may include one or more elastic tubes and/or solid pipes (e.g. a syringe needle, etc.) to dispense the nail polish fluid 310 over the nail surface. The nail polish applying element 110 dispensing head may also comprise a sponge, a wiper and/or the like to apply the nail polish fluid 310 over the nail surface. The nail polish applying element 110 may further include a combination of two or more of the hair strands, the elastic tube(s), the solid pipe(s), the sponge and/or the wiper. The nail polish applying element 304 may be mounted and/or connected to the discharge nozzle 306 such that the nail polish applying element 304 is in line with the discharge nozzle 306 or tilted with respect to the discharge nozzle 306.

For example, the dispensing head of the nail polish applying element 304 may include a single solid pipe constructed as a syringe needle having an internal hollow tunnel (void) for conveying the nail polish fluid 310 from the discharge nozzle 306 to a nail polish applying tip of the needle. The mounting element 108 may maneuver the capsule 300 such that the nail polish applying tip of the needle may touch the nail surface and/or hover above the nail surface for applying the nail polish fluid 310 to the nail surface. A diameter of the internal tunnel of the needle may be adapted according to one or more nail polish application parameters, for example, an external diameter of the needle, a viscosity of the nail polish fluid 310, a gap between the nail polish applying tip and the nail surface, a linear velocity of mounting element 108, a pressure applied by the pressure applying element 106 and/or the like.

In some embodiment, the capsule 300 include one or more sealed openings 307 located in the body portion 302 and/or the discharge nozzle 306. The opening(s) 307 may be closed when set in a first operational state which is the default to prevent flow of the nail polish fluid 310 from the body portion 302 to the nail polish applying element 304. In a second operational state, the opening(s) 307 may be opened thus releasing the nail polish fluid 310 from the body portion 302. The opening(s) 307 may automatically transition from the first state to the second state when internal pressure is built in the reservoir defined by the body portion 302 as result of the pressure applied by the pressure applying element 106. Optionally, the opening(s) 307 is unidirectional allowing the nail polish fluid 310 to flow out of the body portion 302 while preventing the nail polish fluid 310 from re-entering the body portion 302. The opening(s) 307 may utilize one or more implementations, for example, a weakened surface area forming a sealed face and/or barrier which may break automatically under the internal pressure built in the reservoir defined by the body portion 302. In another exemplary implementation, the opening(s) 307 may be utilized through a mechanical valve having the two operational states such that by default, under no pressure, the mechanical valve is closed. However, when the internal pressure is built the mechanical valve may automatically transition to the second state in which the nail polish fluid 301 may be released. The capsule 300 may further include one or more additional mechanisms for releasing the nail polish fluid 310 to flow from the body portion 302 when the internal pressure is built, for example, an internal puncturing mechanism to puncture the opening(s) 307 and/or the like.

According to some embodiments, the capsule 300 may include a flange-like rim 301 defining a perimeter of the top end of the body portion 302. The flange-like rim 114 301 assist in guiding, positioning and/or locking the capsule 300 in the capsule compartment 110. The nail polish application apparatus 101A may apply a locking mechanism 202 that may press the flange-like rim 301 against the capsule compartment 110 after the capsule 300 is placed in the capsule compartment 110 in order to secure the body portion of capsule in the capsule compartment 110. The locking mechanism 202, for example, a perimeter ring may be fixed over the flange-like rim 301 after the capsule 300 is placed in the capsule compartment 110. The locking mechanism 202 may be utilized, for example, through a cover of the capsule compartment 110 that is closed the capsule 300 is inserted into the capsule compartment 110.

A pressure applying element such as the pressure applying element 106 may apply pressure to the body portion 302 in order to build an internal pressure in the reservoir defined by the body portion 302 to force extrusion of the nail polish fluid from the body portion 302 to the nail polish applying element 304. In some embodiments as described herein after, the pressure applying element 106 may be controlled by one or more actuators such as the actuators 104.

As shown in FIG. 4B, the nail polish application apparatus 101A may be adapted to support simultaneous hosting of multiple capsules 300. The mounting element 108 may be adapted to include and/or to attach to a plurality of capsule compartments 110_1 through 100_n such as the capsule compartment 110 each adapted to receive and accommodate a capsule such as the capsule 300. The mounting element 108 may be constructed to include the plurality of capsule compartments 110 which may be adjacent to each other, spaced apart from each other and/or the like. Each of the capsule compartments 110 may be associated with an independent pressure applying element 106_1 through 106_m such as the pressure applying element 106. Additionally and/or alternatively, a single pressure applying element 106A may be used for the capsules 300 located in several and/or all of the capsule compartments 110_1 through 110_n.

Figure 5B:
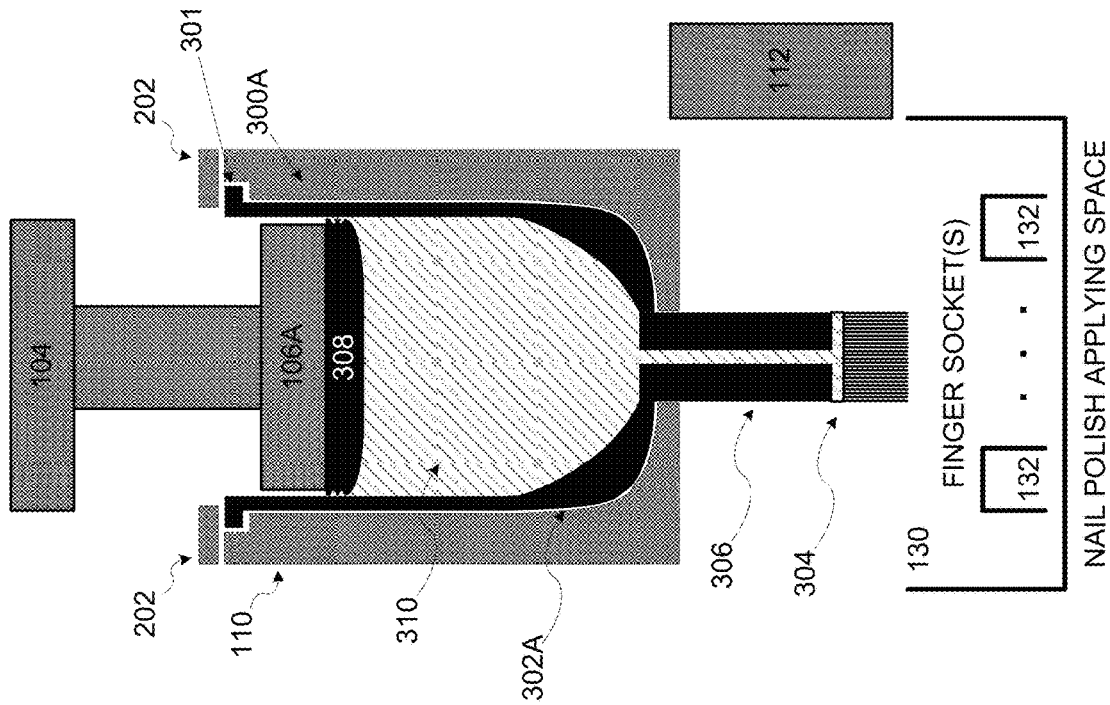
FIG. 5A and FIG. 5B are longitudinal cross section views of an exemplary piston based pressure applying element of a nail polish application apparatus, according to some embodiments of the present invention.
Figure 5A:
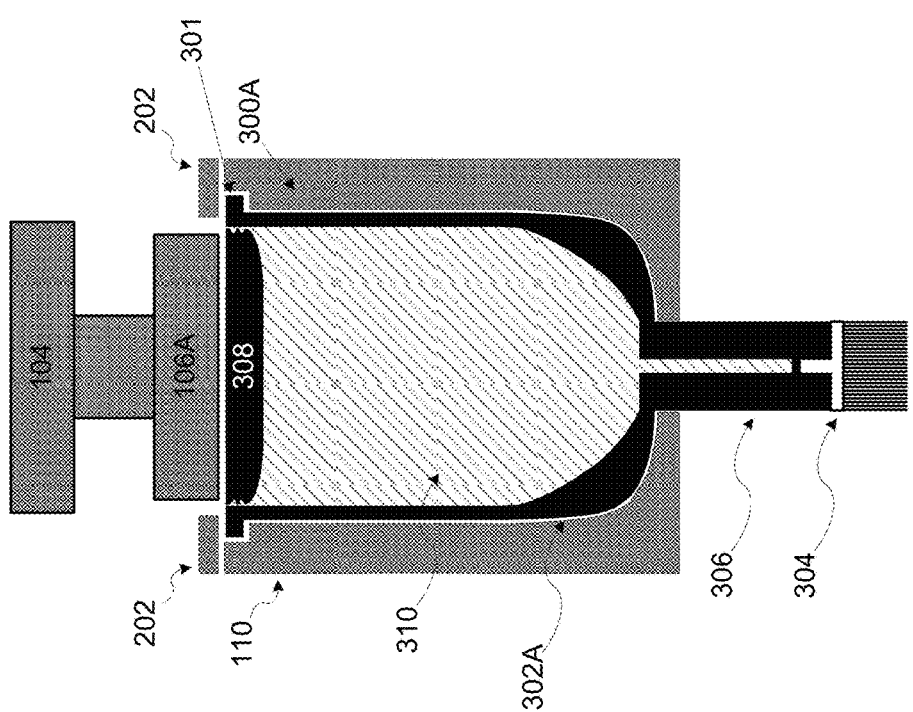

Reference is now made to FIG. 5A and FIG. 5B, which are longitudinal cross section views of an exemplary piston based pressure applying element of a nail polish application apparatus, according to some embodiments of the present invention. As shown in FIG. 5A, an exemplary capsule embodiment 300A of a capsule such as the capsule 300 having a body portion 302A exemplary embodiment of the body portion 302, a discharge nozzle such as the discharge nozzle 306 and a nail polish applying element such as the nail polish applying element 304 may be located in a capsule compartment such as the capsule compartment 110 of a nail polish application apparatus such as the nail polish application apparatus 101A. The capsule 300A employs a syringe like construction in which an upper face of the body portion 302A defining the reservoir containing nail polish fluid such as the nail polish fluid 310 is sealed with a sliding gasket 308. The body portion 302A may include a flange-like rim such as the flange-like rim 301 adapted to support locking by a locking mechanism such as the locking mechanism 202 of the capsule compartment 110. A pressure applying element 106A exemplary embodiment of the pressure applying element 106 may include a piston which may be controlled by one or more actuators such as the actuator 104 operated by a control unit such as the control unit 102.

As shown in FIG. 5B, the piston of the pressure applying element 106A is adapted to press down the sliding gasket 308 which slides down towards the bottom side of the body portion 302A. As result of the sliding gasket 308 moving toward the bottom side of the body portion 302A, a volume of the reservoir defined by the body portion 302 is reduced thus building an internal pressure in the reservoir. In case the capsule 300A include the sealed opening(s), the sealed opening(s) may fracture under the internal pressure and transition from their first state to the second state thus allow the nail polish fluid 310 to flow to the nail polish applying element 304. The internal pressure forces the nail polish fluid 310 to flow from the body portion 302A through the discharge nozzle 306 to the nail polish applying element 304.

The control unit 102 may control movement of the pressure applying element 106A piston during the nail polish application process, in particular when the nail polish fluid 310 is applied to the nail surface(s) in a nail polish applying space such as the nail polish applying space 130. The control unit 102 may control the movement of the piston by operating the actuator(s) 104 controlling the piston.

According to some embodiments, the capsule 300A may be constructed with an internal container which defines the reservoir containing the nail polish fluid 310. The internal container may be located in the body portion 302A where the body portion 302 serves as container housing. An upper face of the container may have an opening sealed with a sliding gasket similar to the sliding gasket 308. The piston of the pressure applying element 106A may press down the sliding gasket 308 which slides down towards the bottom side of the internal container. As result of the sliding gasket 308 moving toward the bottom side of the internal container, the volume of the reservoir defined by the internal container is reduced thus building an internal pressure in the reservoir. The internal pressure may force the nail polish fluid 310 to flow from the internal container to the body portion 302A and through the discharge nozzle 306 to the nail polish applying element 304. In such case, the piston of the pressure applying element 106A may be adapted to first press down the entire internal container until the internal container is secured in place within the body portion 302 and after that pressing down the sliding gasket 308 of the internal container. This may be accomplished, for example, by adapting the piston to have two external diameters, a first diameter and a second diameter smaller than the first diameter. The piston adjusted to the first dimeter matching the diameter of the internal container may be used to press down the entire internal container to lock in place within the body portion 302A. The piston adjusted to the second dimeter which is smaller the diameter of the internal container may then be used to press down the sliding gasket 308. This may be accomplished by using a plurality of pressure applying elements such as the pressure applying element 106A each having a piston of a different diameter. This may be also accomplished with a pressure applying element such as the pressure applying element 106A having two separate piston. In another construction, the piston of the pressure applying element 106A may be dynamically adjusted to support the first and/or second diameters, for example, using an internal piston and an external piston section wrapping the internal piston.

The control unit 102 may operate the actuator(s) 104 moving the mounting element 108 and/or the pressure applying element 106A based on analysis of sensory data received from one or more sensors such as the sensor 112 deployed in the nail polish application apparatus 101 to depict the nail polish applying space 130.

The control unit 102 may control the movement of a mounting element such as the mounting element 108 comprising the capsule compartment(s) 110 based on analysis of the sensory data in order to move the nail polish applying element 304 over the nail surface(s) of the user located in the nail polish applying space 130. The control unit 102 may operate the actuator(s) 104 controlling the movement of the mounting element 108 to move the mounting element 108 in longitudinal and lateral directions through the nail polish applying space 130. The control unit 102 may further operate the actuator(s) 104 to tilt the mounting element 108 and/or to move the mounting element 108 in a direction perpendicular to the nail surface(s) in order to accurately position the nail polish applying element 304 in a substantially perpendicular position to the nail surface. Since the human nail surface may include curvatures, positing the nail polish applying element 304 in perpendicularly to the nail surface may significantly improve the quality of the nail polish application to the nail surface(s).

As described herein above, according to some embodiments of the present invention, the dispensing head of the nail polish applying element 304 may comprise the single solid pipe constructed as the syringe needle having the hollow internal tunnel (void) for conveying the nail polish fluid 310 from the discharge nozzle 306 to a nail polish applying tip of the needle.

The control unit 102 may operate the actuator(s) 104 to move the mounting element 108 in one or more axes to accurately maneuver and position the nail polish applying element 304, specifically the nail polish applying tip of the needle at an optimal position over the nail surface of one or more fingers of the user when the finger(s) is placed in finger socket(s) such as the finger socket 132. For improved nail polish application results, the nail polish applying tip may be positioned at a certain height (gap) above the nail surface, for example, in a range of 0 mm to 2.5 mm with an optimal gap in the range of 0 mm to 0.7 mm. Adjusting the gap may directly affect the nail polish application to the nail surface. For example, increasing the gap by 0.2 mm by lifting the nail polish applying tip in a perpendicular axis (Z axis) from a height 0.2 mm above the nail surface to a height of 0.4 mm above the nail surface may decrease a width of a line applied by the nail polish applying tip by approximately 0.5 mm. The accuracy of the gap required between the nail polish applying tip and the nail surface may depend on one or more nail polish application parameters, for example, an attribute of the nail polish applying element 304 such as, for example, a diameter of the internal tunnel of the needle, a viscosity of the nail polish fluid 310, a gap between the nail polish applying tip and the nail surface, a linear velocity of the mounting element 108, a pressure applied by the pressure applying element 106 and/or the like. For example, the accuracy for maintaining the gap between the nail polish applying tip and the nail surface may be less significant for a small diameter of the internal tunnel of the needle and vice versa, the accuracy of the gap must be significantly high for larger diameters of the internal tunnel of the needle.

The control unit 102 may further operate the actuator(s) 104 to move the mounting element 108 in one or more axes to accurately maneuver and position the nail polish applying element 304, specifically the nail polish applying tip of the needle at an optimal angle with respect to the nail surface of one or more fingers of the user when the finger(s) is placed in the finger socket(s) 132.

Figure 5C:
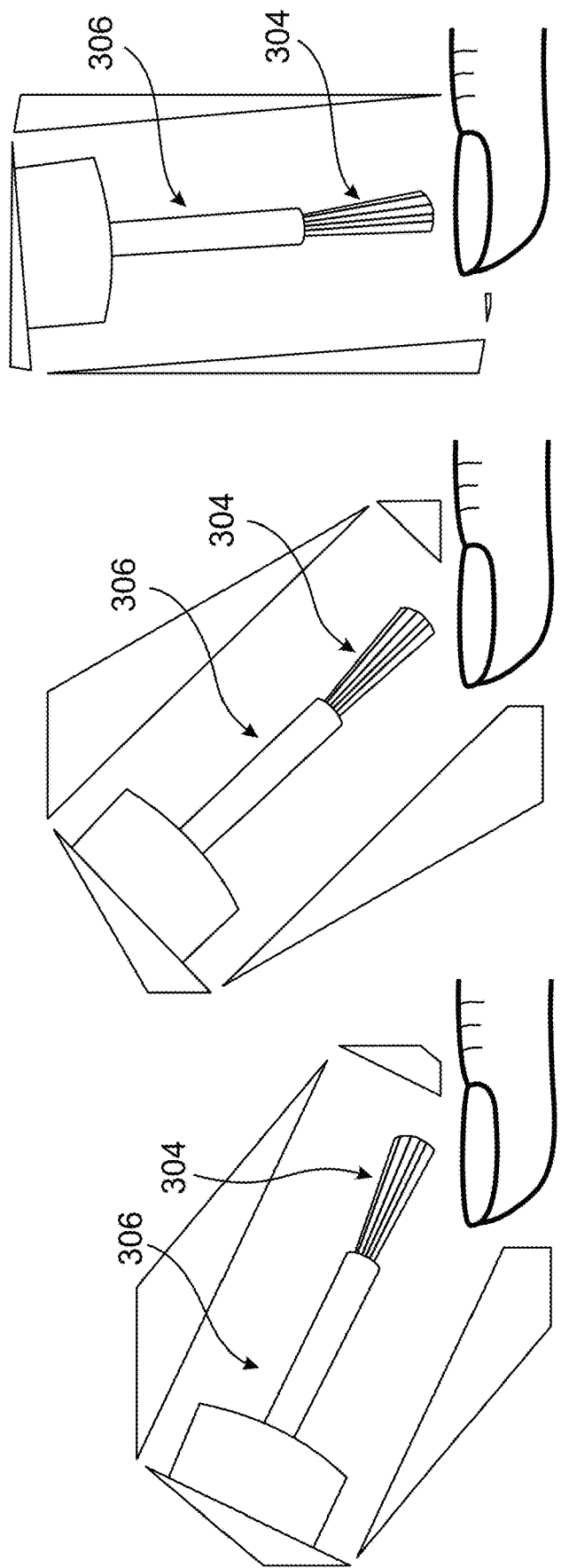
FIG. 5C is a schematic illustration of exemplary positioning angles of an exemplary nail polish applying element of a nail polish capsule used by a nail polish application apparatus, according to some embodiments of the present invention.

Reference is now made to FIG. 5C, which is a schematic illustration of exemplary positioning angles of an exemplary nail polish applying element of a nail polish capsule used by a nail polish application apparatus, according to some embodiments of the present invention. As shown in FIG. 5C, a nail polish applying element such as the nail polish applying element 304 may include a dispensing head, such as, for example, the single solid pipe constructed as the syringe needle having the hollow internal tunnel. A control unit such as the control unit 102 may operate one or more actuators such as the actuator(s) 104 to move a mounting element such as the mounting element 108 to maneuver and position the nail polish applying element 304, specifically the nail polish applying tip of the needle at an optimal angle with respect to the nail surface of one or more fingers of the user when the finger(s) is placed in the finger socket(s) 132. For improved nail polish application results, the nail polish applying tip may be positioned at a certain angle, for example, in a range of 20 degrees to 160 degrees in a perpendicular axis with respect to the nail surface. Optimal nail polish application results may be achieved for an angle in the range of 20 degrees to 90 degrees in a perpendicular axis with respect to the nail surface with best results observed for 90 degrees, i.e. fully perpendicular to the nail surface. The control unit 102 may operate the actuator(s) 104 to maneuver the mounting element 108 to dynamically adjust the angle of the nail polish applying element 304 with respect to the nail surface according to a curvature of the nail surface area to which the nail polish fluid 310 is applied in order to improve application of the nail polish fluid 310.

The control unit 102 may control the internal pressure in the body portion 302A by operating the actuator(s) 104 controlling the pressure applying element 106A to maintain, increase and/or decrease the pressure applied to the sliding gasket 308. The control unit 102 may analyze the sensory data to detect a displacement of the piston of the pressure applying element 106A and/or a displacement of the sliding gasket 308. The control unit 102 may apply predefined displacement-flow relation(s) to adjust the flow of the nail polish fluid 310 by controlling the piston according to the detected displacement. Additionally and/or alternatively, the control unit 102 may also determine the flow rate of the nail polish fluid 310 according to speed of the actuator 104 in X-Y direction. Optionally, the control unit 102 may analyze the sensory data to detect the flow of the nail polish fluid 310 through the nail polish applying element 304 and/or according to analysis of the nail polish fluid 310 while and/or after applied to nail surface(s). For example, based on the analysis, the control unit 102 may detect the saturation level of the nail polish fluid 310 in the dispensing head of the nail polish applying element 304 and determine the flow rate accordingly. In another example, based on the analysis, the control unit 102 may detect the width of the layer of the nail polish 310 on the nail surface(s) and determine the flow rate accordingly. Based on the detected flow rate, the control unit 102 may adjust the flow of the nail polish fluid 310 by controlling the piston according to the detected flow rate.

The control unit may further adjust the flow of the nail polish fluid 310 by control the pressure, for example, by operating the piston according to one or more of the nail polish application parameters, for example, an attribute of the nail polish applying element 304 such as, for example, the diameter of the internal tunnel of the needle type dispensing head of the nail polish applying element 304, a viscosity of the nail polish fluid 310, the gap between the nail polish applying tip of the needle and the nail surface, a linear velocity of the mounting element 108 and/or the like.

One or more of the sensor(s) 112 may be an imaging sensor, for example, a camera, a video camera, a depth camera and/or the like operated by the control unit 102 to capture one or more images depicting the nail polish applying space 130 before, during and/or after a nail polish application session.

The control unit 102 may analyze the captured images to identify the nail surface(s) which are the target for the nail polish application during the nail polish application session. Based on the analysis, the control unit 102 may identify, for example, one or more curvatures in the nail surface(s), one or more boundaries of the nail surface(s), height of the nail polish applying element above the nail surface(s) and/or the like. The control unit 102 may further construct a 3D surface of the nail surface(s) based on the images received from the imaging sensor(s). Analyzing the image(s), the control unit 102 may identify the location and/or positioning of the nail polish applying element 304. Based on the analysis, the control unit 102 may determine the positioning of the nail polish applying element 304 with respect to the nail surface(s). The control unit 102 may operate the actuator(s) 104 to move the mounting element 108 in one or more axes to accurately position the nail polish applying element 304 at an optimal position for achieving best nail polish application results.

Based on the analysis of the captured image(s), the control unit 102 may further estimate the height of the nail polish applying element 304 above the nail surface (gap). The control unit 102 may analyze the image(s) to detect the width of the dispensing head width nail polish applying element 304. For example, in case the dispensing head of the nail polish applying element 304 include one or more elastic parts, for example, the hair strands, the elastic tube(s), the wiper and/or the like, the lower the nail polish applying element 304, the more pressure is applied to the dispensing head thus expanding the dispensing head. In another example, in case the dispensing head of the nail polish applying element 304 include one or more solid parts, for example, the solid pipe(s), specifically the syringe needle, the tip of the needle may hover above the nail surface(s) at a certain gap (height) for optimal results. The control unit 102 may therefore determine accurately the height of the nail polish applying element 304 above the nail surface(s) even when the nail polish applying element 304 touches (contacts) and/or hover above (with no direct contact) the nail surface(s). The control unit 102 may adjust the positioning of the mounting element 108 (through the actuator(s) 104) with respect to the nail surface(s).

The control unit 102 may further detect movement of the finger(s) in the nail polish applying space 130 based on the analysis of the image(s). The control unit 102 may then correct, fix and/or adjust the positioning of the mounting element 108 (through the actuator(s) 104) with respect to the nail surface(s) according to the detected location of the finger(s).

Based on the analysis of the image(s), the control unit 102 may determine a saturation level of the nail polish fluid in the dispensing head of the nail polish applying element 304. The control unit 102 may control the pressure applying element 106A to adjust the pressure applied to the body portion 302A according to the detected saturation level. For example, assuming the control unit 102 determines that the saturation level is lower than a desired optimal saturation, the control unit 102 may adjust the pressure applying element 106A to apply more pressure to the body portion 302A thus forcing more nail polish fluid 310 to flow to the nail polish applying element 304. In another example, assuming the control unit 102 determines that the saturation level is higher than the optimal saturation level, the control unit 102 may adjust the pressure applying element 106A to apply less pressure to the body portion 302A thus forcing less nail polish fluid 310 to flow to the nail polish applying element 304.

The control unit 102 may also analyze one or more images captured by the imaging sensor(s) prior to starting the nail polish application to the nail surface(s). Based on the image(s) analysis, the control unit 102 may, for example, determine the saturation level of the dispensing head of the nail polish applying element 304, for example, by detecting a time instance at which the nail polish fluid 310 reaches a tip of the nail polish applying element 304 dispensing head. The control unit 102 may initiate the nail polish application process after determining that the nail polish applying element 304 is properly saturated. The control unit 102 may further estimate a viscosity of the nail polish fluid 310 by analyzing an expansion of a drop of the nail polish fluid 310 as depicted in the captures image(s). Based on the estimated viscosity, the control unit 102 may calibrate settings for controlling the pressure applying element 106A to maintain a steady flow of the nail polish fluid 310 to the nail polish applying element 304. Measuring the viscosity and calibrating accordingly may be done as part of the preparation operations the control unit 102 conducts prior to initiating the nail polish application process. Optionally, the control unit forwards at least some of the sensory data to an external device, for example, a mobile device (e.g. a Smartphone), a remote processing platform (e.g. a remote server, a cloud service, etc.). The external device may perform at least part of the analysis and instruct the control unit to take one or more operations, for example, determine the saturation level, estimate the viscosity and/or the like according to the analysis.

The control unit 102 may further instruct the imaging sensor(s) to capture one or more images of the capsule 300A prior to the nail polish application process. Optionally, in case the nail polish application apparatus 101A includes a preparation space such as the preparation space 134 in which one or more of the preparation operations are conducted, one or more of the imaging sensor(s) may be distributed to depict at least part of the preparation space 134. Based on the captured image(s), the control unit 102 may estimate compliance of the capsule with one or more quality measures. For example, assuming the body portion 302A is transparent, the control unit 102 may determine the type, color, shade and/or hue of the nail polish fluid 310 contained in the body portion 302A. The control unit 102 may further estimate mechanical compliance of the capsule 300A, for example, detect dent(s) and/or fracture(s) in the body portion, detect defect(s) in the nail polish applying element 304 and/or the like. In another example, assuming the capsule is labeled with a code, for example, a barcode, a QR code and/or the like, the control unit 102 may analyze the image(s) to identify the code and verify the code is correct for the designated use during the current nail polish application session. In another example, assuming the nail polish application apparatus 101A includes a plurality of capsule compartments 110 and/or a plurality of chambers in the storage space in which multiple capsules 300 may be loaded. The control unit 102 may analyze the image(s) to verify each of the capsules 300 is located in its proper designated capsule compartment 110 and/or chamber. Based on the estimated compliance, the control unit 102 may proceed and/or abort the nail polish application process. Optionally, the control unit 102 indicates the detected compliance to the user through a user interface such as the user interface 120, for example, an indication light, an LCD and/or the like. Additionally and/or alternatively, the control unit may send a message describing the detected compliance to one or more remote location through a network interface such as the network interface 122.

In addition, the control unit 102 may instruct the imaging sensor(s) to capture one or more images of the nail surface(s) prior to the nail polish application process. Based on the captured image(s), the control unit 102 may detect a state of the nail surface(s) in order to estimate compliance of the nail surface(s) for nail polish application. For example, the control unit 102 may detect that the nail surface(s) are coated with previously applied nail polish that may need to be removed before applying the new nail polish fluid 310. In another example, the control unit 102 may detect that one or more of the nail surface(s) is broken and may need some treatment prior to applying the nail polish fluid 310. In another example, the control unit may detect some disease in the bail surface(s) which may forbid application of the nail polish fluid 310 to the infected nail surface(s). Based on the detected state of the nail surface(s), the control unit 102 may proceed and/or abort the nail polish application process. Optionally, the control unit 102 indicates the detected compliance to the user through a user interface such as the user interface 120, for example, an indication light, an LCD and/or the like. Additionally and/or alternatively, the control unit 102 may send a message describing the detected compliance to one or more remote location through a network interface such as the network interface 122.

The control unit 102 may further analyze one or more images captured by the imaging sensor(s) after completing application of the nail polish fluid 310 to the nail surface(s). Based on the image(s) analysis, the control unit 102 may determine the result of the nail polish application process for one or more of the nail surfaces. For example, the control unit 102 may determine proper and/or correct nail polish application by estimating a consistency and/or uniformity of the nail polish fluid 310 applied to the nail surface(s). The control unit 102 may also detect one or more flaws in the nail polish application on the nail surface(s), for example, one or more areas of the nail surface(s) in which no nail polish fluid 310 was applied, one or more areas of the nail surface(s) in which an inconsistent nail polish fluid 310 was applied compared to other areas of the nail surface(s) and/or the like. The control unit 102 may further estimate a drying state of the nail polish fluid 310 applied on the nail surface(s).

Optionally, the nail polish application apparatus 101A includes one or more lighting sources operated by the control unit 102 to illuminate the nail surface(s). Illuminating the nail surface(s) may significantly improve the quality of the images captured by the imaging sensor(s). The lighting source(s) may be selected, configured and/or operated according to one or more operational parameters of the imaging sensor(s) and/or the lighting source(s), for example, a field of view (FOV), a distance from the nail surface(s), a spectral range and/or the like. The lighting source(s) may include, for example, a Light Emitting Diode (LED), a laser emitter device, an Infra-Red (IR) emitter and/or the like. The laser emitter device(s) may be further used by the control unit 102 to calibrate the motion system (i.e. the control unit 102 control of the actuator(s) 104), analyze the nail surface, obtain and/or create a 3D model of the nail surface(s), detect the nail surface(s)' boundary and/or the like. The nail polish application apparatus 101A may further include one or more target indications, for example, a marking, a mechanical marking (e.g. a bulge, a depression, a carved pattern, etc.) and/or the like which may be used by the control unit 102 in conjunction with the laser emitting device(s) to calibrate one or more elements the nail polish application apparatus 101A. For example, one or more of the target indications may be placed on the mounting element 108 and using the laser emitter device(s), the control unit 102 may identify the exact location of the target indications and calibrate the motion system of nail polish application apparatus 101A, in particular, the actuator(s) 104, the mounting element 108 and/or the imaging sensor(s) 112.

Moreover, one or more spaces of the nail polish application apparatus 101A, for example, the nail polish applying space 130, the preparation space 134 and/or the like are mechanically adapted to limit and/or control the level of illumination (light) coming in from the (external) environment. This may be done by constructing the space(s) to have enclosing walls and/or faces which may substantially block the external light coming in from outside the space(s). Limiting and/or controlling the external illumination may allow adjusting the illumination in the spaces using the lighting source(s) to improve the lighting conditions in the spaces and hence improve the quality and/or usability of the image(s) captured by the imaging sensor(s). The control unit 102 may efficiently analyze the image(s) captured in the controlled lighting space(s) and may require reduced computation resources, for example, computing power, memory resources, computing time and/or the like.

One or more of the sensor(s) 112 may be a proximity sensor operated by the control unit 102 to collect proximity information that may describe positioning of the nail polish applying element 304, the nail surface(s) and/or the like in the nail polish applying space 130 before, during and/or after a nail polish application session. The control unit 102 may analyze the sensory data received from the proximity sensor(s) to estimate, for example, a relative location and/or positioning of the nail polish applying element 304, for example, in X, Y and/or Z axis of space with respect to the target nail surface(s). Based on the estimated relative location and/or positioning, the control unit 102 may operate the actuator(s) 104 to move the mounting element 108 accordingly in order to accurately position the nail polish applying element 304 over the target nail surface(s) thus improving nail polish application results.

Optionally, analyzing the sensory data obtained from the proximity sensor(s), the control unit 102 may accurately estimate the height of the nail polish applying element 304 above the nail surface, i.e. the gap between the nail polish applying element 304 and the nail surface. Based on the estimated height, the control unit 102 may operate the actuator(s) 104 to move the mounting element 108 and hence the nail polish applying element 304 to an optimal location and/or height above the nail surface to achieve improved nail polish application results. In addition, based on the analysis of the sensory data obtained from the proximity sensor(s), the control unit may estimate the location and/or positioning of the nail polish applying head 304 with respect to the nail surface.

For example, assuming the nail polish applying element 304 comprises the syringe needle like dispensing head which needs to be maintained at a certain height (e.g. 0-2.5 mm) above the nail surface to which the nail polish fluid 310 is applied. In such case the control unit 102 may operate the actuator(s) 104 to move the mounting element 108 such that the needle like dispensing head is positioned above the nail surface at the required height. Since the nail surface may be curved, based on the analysis of the proximity sensory data, the control unit 102 may adjust the operation of the actuator(s) 104 to maintain the positioning of the needle like dispensing head of the nail polish applying element 304 with respect to the curved nail surface at the required height. In another example, assuming the nail polish applying element 304 comprises a needle like dispensing head which needs to be maintained at a certain angle (e.g. 90 degrees, 45 degrees, 30 degrees, etc.) in the perpendicular axis with respect to the nail surface to which the nail polish fluid 310 is applied and at a certain height (e.g. 0-2.5 mm) above the nail surface. Similarly to the previous example, the control unit 102 may operate the actuator(s) 104 to move the mounting element 108 such that the needle like dispensing head is in the required angle and height with respect to the nail surface based on the analysis of the proximity sensory data.

Optionally, similarly to the implementation of the imaging sensor(s), the laser emitter device(s) may be used by the control unit 102 coupled with the proximity sensors to calibrate the motion system, analyze the nail surface(s), obtain and/or create the 3D model of the nail surface(s), detecting the nail surface(s)' boundary and/or the like.

Figure 6B:
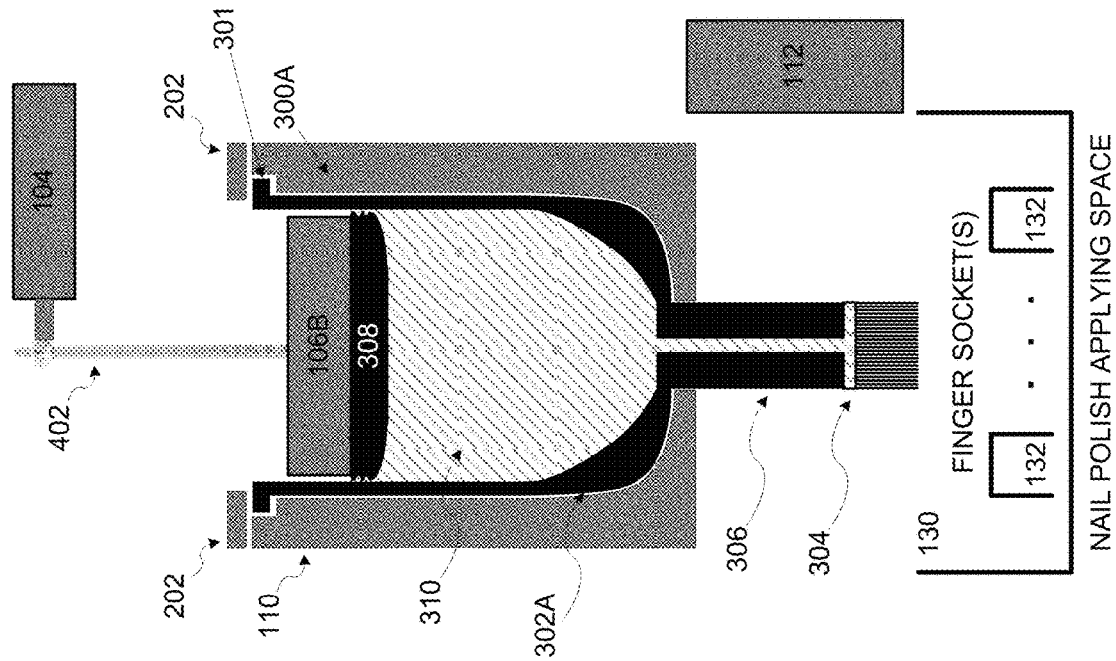
FIG. 6A and FIG. 6B are longitudinal cross section views of an exemplary lead screw piston based displacement applying element of a nail polish application apparatus, according to some embodiments of the present invention.
Figure 6A:
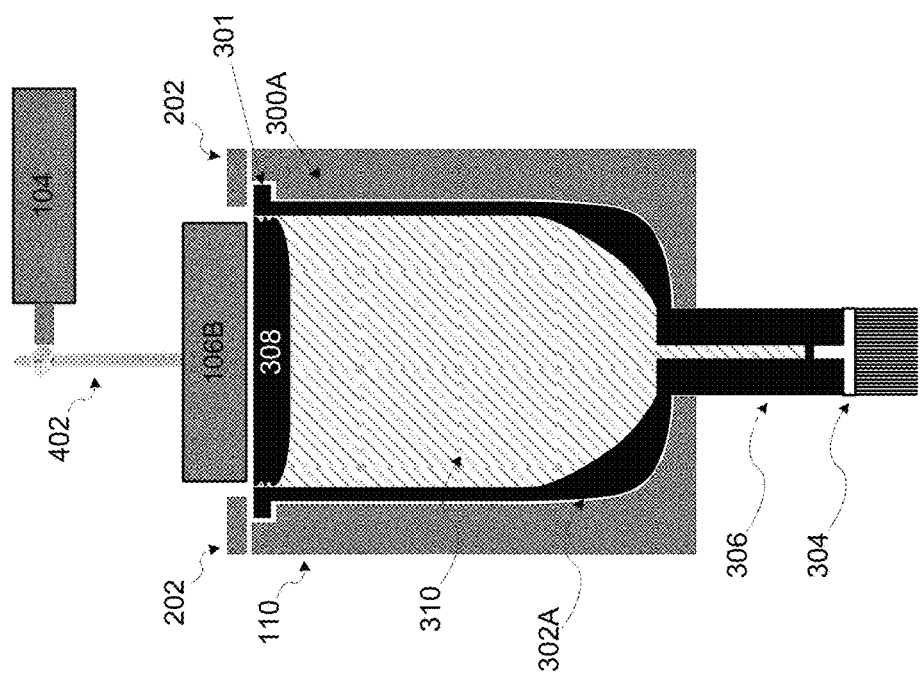

Reference is now made to FIG. 6A and FIG. 6B, which are longitudinal cross section views of an exemplary lead screw piston based pressure applying element of a nail polish application apparatus, according to some embodiments of the present invention. As shown in FIG. 6A, an exemplary capsule embodiment such as the capsule 300A may be located in a capsule compartment such as the capsule compartment 110 of a nail polish application apparatus such as the nail polish application apparatus 101A. A pressure applying element 106B similar to the pressure applying element 106A may include a piston adapted to press down the sliding gasket 308 which slides down towards the bottom side of the body portion 302A. Movement of the piston of the pressure applying element 106B may be controlled through a lead screw 402. For example, the piston of the pressure applying element 106B may be fitted with a nut placed on a lead screw having a plurality of threads. The control unit 102 may control the actuator(s) 104 to turn the lead screw clockwise and/or counterclockwise to move the piston upwards and/or downwards in and/or out of the body portion 302A. Optionally, the pressure applying element 106 may include rack and pinion. For example, the piston of the pressure applying element 106B may be fitted with a rack and/or a rail having multiple cogs and/or teeth. The control unit 102 may control the actuator(s) 104 to rotate a pinion having cogs and/or teeth interlaced with the cogs and/or teeth of the rack and/or rail to move the piston upwards and/or downwards in and/or out of the body portion 302A. Using the lead screw and/or the rack and pinion implementations may significantly increase the accuracy of the piston movement and hence the flow of the nail polish fluid 310 towards the nail polish applying element 304. Moreover, the use of the lead screw and/or the rack and pinion implementations may allow using lower power actuator(s) 104 while providing high pressure force.

As shown in FIG. 6B, the control unit 102 may operate the actuator(s) 104 to turn the lead screw clockwise and/or counter clock wise in a varying pace in order to control the displacement of the piston of the pressure applying element 106B and thus control the flow rate of a nail polish fluid such as the nail polish fluid 310 contained in a body portion such as the body portion 302A of the capsule 300A. Using the lead screw to control the piston displacement may significantly increase precision of the movement of the piston of the pressure applying element 106B. Moreover, using the lead screw may also significantly increase reliability of the displacement estimation conducted by the control unit 102 based on analysis of the sensory data received from one or more sensors such as the sensor 112.

Figure 7D:
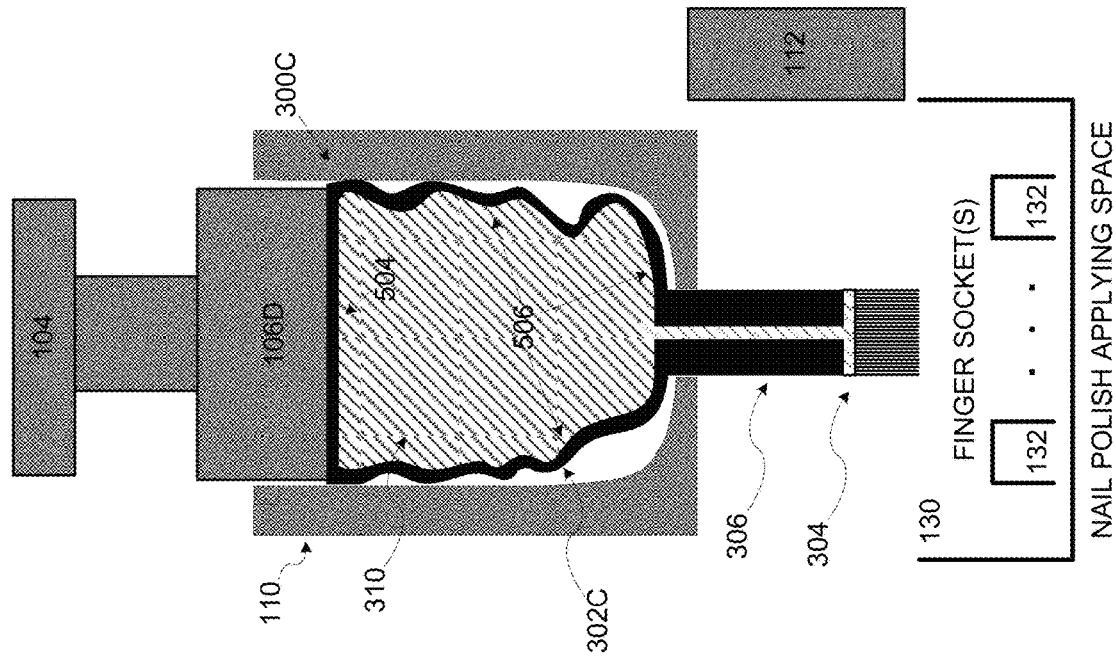

FIG. 7A, FIG. 7B, FIG. 7C and FIG. 7D are longitudinal cross section views of an exemplary plunger based pressure applying element of a nail polish application apparatus, according to some embodiments of the present invention. As shown in FIG. 7A, an exemplary capsule embodiment 300B of a capsule such as the capsule 300 having a body portion 302B exemplary embodiment of the body portion 302, a discharge nozzle such as the discharge nozzle 306 and a nail polish applying element such as the nail polish applying element 304 may be located in a capsule compartment such as the capsule compartment 110. The body portion 302B defines a reservoir adapted to contain nail polish fluid such as the nail polish fluid 310. The body portion 302B may be constructed as a tubular body having a circumferential lateral wall constructed with one or more annular corrugations 502 disposed about a center axis of the body portion 302B. The body portion 302B may include a flange-like rim such as the flange-like rim 301 adapted to support locking by a locking mechanism such as the locking mechanism 202 of the capsule compartment 110.

A pressure applying element 106C exemplary embodiment of the pressure applying element 106 may include a plunger which may be controlled by one or more actuators such as the actuator 104 operated by a control unit such as the control unit 102.

As shown in FIG. 7B, the control unit 102 may operate the actuator(s) 104 to move the plunger of the pressure applying element 106B which may press one or more of the faces of the body portion 302, for example, a top face. As the plunger press down the top face of the body portion 302B, the annular corrugation(s) 502 may fold (collapse) thus reducing the volume of the reservoir defined by the body portion 302B. The reduced volume may build the internal pressure in the reservoir which may force the nail polish fluid 310 to flow through the discharge nozzle 306 to the nail polish applying element 304.

The control unit 102 may control movement of the pressure applying element 106A piston during the nail polish application process to control the flow of the nail polish fluid 310 to the nail polish applying element 304. In particular, the control unit 102 may control the plunger movement while the nail polish fluid 310 is applied to the nail surface(s) in a nail polish applying space such as the nail polish applying space 130. The control unit 102 may control the plunger movement by operating the actuator(s) 104 controlling the piston according to the flow rate of the nail polish fluid 310 determined based on the analysis of the sensory data collected from one or more sensors such as the sensor 112.

Figure 7C:
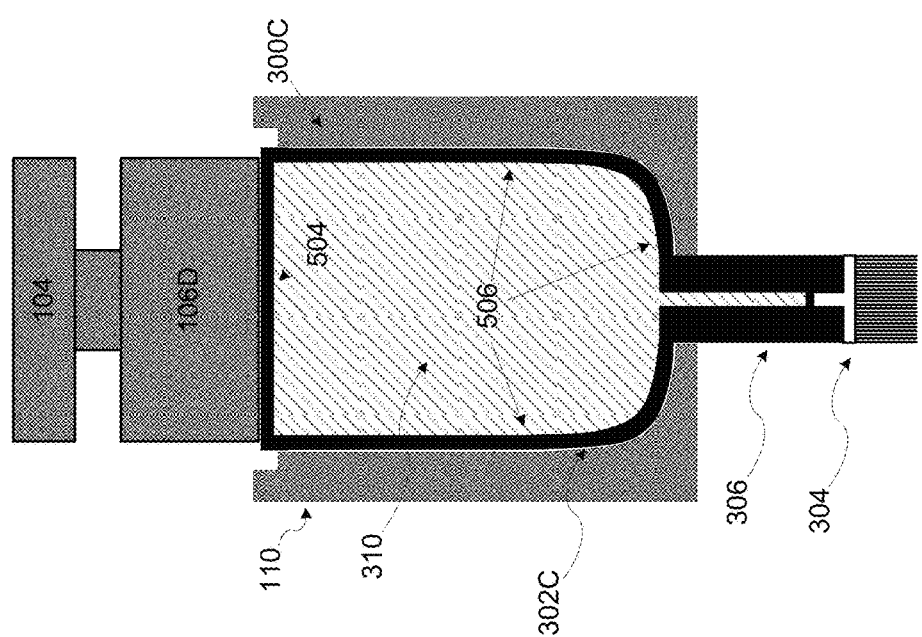

As shown in FIG. 7C, an exemplary capsule embodiment 300C of a capsule such as the capsule 300 having a body portion 302C exemplary embodiment of the body portion 302, a discharge nozzle such as the discharge nozzle 306 and a nail polish applying element such as the nail polish applying element 304 may be located in a capsule compartment such as the capsule compartment 110 of the nail polish application apparatus 101A. The body portion 302C defines a reservoir adapted to contain nail polish fluid such as the nail polish fluid 310. The body portion 302C may be constructed such that one or more high elasticity faces 506 of the body portion 302C have an elasticity coefficient that is higher than the elasticity coefficient of other faces 504 of the body portion 302C.

A pressure applying element 106D exemplary embodiment of the pressure applying element 106 may include a plunger which may be controlled by the actuator(s) 104 operated by the control unit 102.

As shown in FIG. 7D, the control unit 102 may operate the actuator(s) 104 to move the plunger of the pressure applying element 106B which may press one or more of the faces of the body portion 302, for example, the lower elasticity face 504. The pressure applied by the plunger of the pressure applying element 106D may cause the high elasticity faces 506 to fold thus deforming the body portion 302C and reducing the volume of the reservoir defined by the body portion 302C. The reduced volume may build the internal pressure in the reservoir which may force the nail polish fluid 310 to flow through the discharge nozzle 306 to the nail polish applying element 304.

The control unit 102 may control movement of the pressure applying element 106A plunger during the nail polish application process to control the flow of the nail polish fluid 310 to the nail polish applying element 304. In particular, the control unit 102 may control the plunger movement while the nail polish fluid 310 is applied to the nail surface(s) in the nail polish applying space 130. The control unit 102 may control the plunger movement by operating the actuator(s) 104 controlling the piston according to the flow rate of the nail polish fluid 310 determined based on the analysis of the sensory data collected from one or more sensors such as the sensor 112.

Reference is now made to FIG. 8A, FIG. 8B and FIG. 8C, which are longitudinal cross section views of an exemplary peristaltic pump based pressure applying element of a nail polish application apparatus, according to some embodiments of the present invention. As shown in FIG. 8A, an exemplary capsule embodiment 300D of a capsule such as the capsule 300 having a body portion 302D exemplary embodiment of the body portion 302, a discharge nozzle 306A such as the discharge nozzle 306 and a nail polish applying element such as the nail polish applying element 304 may be located in a capsule compartment such as the capsule compartment 110 of a nail polish application apparatus such as the nail polish application apparatus 101A. The body portion 302D defines a reservoir adapted to contain nail polish fluid such as the nail polish fluid 310. One or more longitude faces of the discharge nozzle 306A and/or part thereof may be constructed from one or more materials having a high elasticity coefficient, for example, a polymer and/or the like. The high elasticity longitude face(s) of the discharge nozzle 306A may be bent and/or crumpled when pressure is applied to it. The body portion 302D may include a flange-like rim such as the flange-like rim 301 adapted to support locking by a locking mechanism such as the locking mechanism 202 of the capsule compartment 110.

A pressure applying element 106E exemplary embodiment of the pressure applying element 106 may include a peristaltic pump which may be controlled by one or more actuators such as the actuator 104 operated by a control unit such as the control unit 102.

Optionally, the nail polish application apparatus 101A includes a puncturing element 602 to puncture one or more air openings 604 in the body portion 302D in one or more locations, for example, in a top face of the body portion 302D. Applying the puncturing element 602 to puncture the body portion 302D may be done prior to starting the nail polish application process, for example, as part of the preparation operations. As such, puncturing the body portion 302D may be done in a nail polish applying space such as the nail polish applying space 130 and/or in a preparation space such as the preparation space 134.

As shown in FIG. 7B, the control unit 102 may operate the actuator(s) 104 to apply the peristaltic pump of the pressure applying element 106E to the high elasticity longitude face(s) of the discharge nozzle 306A. The peristaltic pump may induce a displacement movement in the discharge nozzle 306A which may draw (suck) the nail polish fluid 310 from the body portion 302D towards the nail polish applying element 304. The air opening(s) 604 may allow air to come into the body portion 302D to replace the drawn nail polish fluid 310 thus preventing a vacuum in the body portion 302D and allowing the displacement movement to draw the nail polish fluid 310 out of the body portion 302D. Optionally, the air opening(s) 604 is a weakened surface forming a sealed face of the body portion 302D which may automatically fracture under the internal pressure built in the body portion 302D by the displacement movement induced by the peristaltic pump.

Optionally, as shown in FIG. 8C, one or more faces of a body portion 302E of an exemplary capsule 300E such as the capsule 300 are high elasticity faces constructed from one or more materials having a high elasticity coefficient. For example, the upper parts of the body portion 302E, e.g. the top face (or part thereof) and/or the upper sections of the lateral faces of the body portion 103J1 are constructed of, for example, nylon and/or the like. The high elasticity faces may crumple when low pressure exists in the reservoir defined by the body portion 302E. The peristaltic pump inducing the displacement movement in the conveying tunnel discharge nozzle 306A may draw the nail polish fluid 310 from the body portion 302E. As the nail polish fluid 310 is drawn out of the body portion 302E, the internal pressure in the body portion 302E is reduced and the high elasticity faces of the body portion 302E may crumple thus preventing a vacuum in the body portion 302E and allowing the displacement movement to draw the nail polish fluid 310. The body portion 302E may include a flange-like rim such as the flange-like rim 301 adapted to support locking by a locking mechanism such as the locking mechanism 202 of the capsule compartment 110.

The control unit 102 may control movement of the peristaltic pump of the pressure applying element 106E during the nail polish application process to control the flow of the nail polish fluid 310 to the nail polish applying element 304. In particular, the control unit 102 may control the peristaltic pump movement while the nail polish fluid 310 is applied to the nail surface(s) in a nail polish applying space such as the nail polish applying space 130. The control unit 102 may control the peristaltic pump displacement movement by operating the actuator(s) 104 controlling the peristaltic pump according to the flow rate of the nail polish fluid 310 determined based on the analysis of the sensory data collected from one or more sensors such as the sensor 112.

FIG. 9A, FIG. 9B and FIG. 9C are longitudinal cross section views of an exemplary compressor based pressure applying element of a nail polish application apparatus, according to some embodiments of the present invention. As shown in FIG. 9A, an exemplary capsule embodiment 300F of a capsule such as the capsule 300 having a body portion 302F exemplary embodiment of the body portion 302, a discharge nozzle such as the discharge nozzle 306 and a nail polish applying element such as the nail polish applying element 304 may be located in a capsule compartment such as the capsule compartment 110 of a nail polish application apparatus such as the nail polish application apparatus 101A. The body portion 302F defines a reservoir adapted to contain nail polish fluid such as the nail polish fluid 310. The body portion 302F may include a flange-like rim such as the flange-like rim 301 adapted to support locking by a locking mechanism such as the locking mechanism 202 of the capsule compartment 110.

Optionally, the nail polish application apparatus 101A includes a puncturing element such as the puncturing element 602 to puncture one or more injection openings 702 in the body portion 302F in one or more locations, typically in a top face of the body portion 302F. Applying the puncturing element 602 to puncture the body portion 302F may be done prior to starting the nail polish application process, for example, as part of the preparation operations. As such, puncturing the body portion 302F may be done in a nail polish applying space such as the nail polish applying space 130 and/or in a preparation space such as the preparation space 134. Optionally, the reservoir defined by the body portion 302F contains some gas, for example, air and/or the like such that when the body portion 302F is punctured, the injection opening(s) 702 is above a surface level of the nail polish fluid 310 contained in the body portion 302F.

As shown in FIG. 9B, a pressure applying element 106F exemplary embodiment of the pressure applying element 106 may include a compressor operated by a control unit such as the control unit 102. The injection outlet of the compressor may be connected to the injection opening(s) 702 punctured in the body portion 302F. Similarly to the puncturing operation, connecting the injection outlet of the compressor to the injection opening(s) 702 may be part of the preparation operations and as such may be performed in the nail polish applying space 130 and/or in the preparation space 134.

As shown in FIG. 9C, the compressor of the pressure applying element 106F may inject one or more compression materials 710, for example a gas (e.g. air and/or the like), a liquid (e.g. water, oil and/or the like) and/or the like at high pressure into the body portion 302F through the injection opening(s) 702. The injected compression material 710 may build an internal pressure in the reservoir defined by the body portion 302 which in turn may force the nail polish fluid 310 to flow through the discharge nozzle 306 to the nail polish applying element 304.

The control unit 102 may control the compression level of the compressor, i.e. the rate at which the compression material 710 is injected into the body portion 302F during the nail polish application process to control the flow of the nail polish fluid 310 to the nail polish applying element 304. In particular, the control unit 102 may control the compressor compression level while the nail polish fluid 310 is applied to the nail surface(s) in a nail polish applying space such as the nail polish applying space 130. The control unit 102 may control the compressor compression level according to the flow rate of the nail polish fluid 310 determined based on the analysis of the sensory data collected from one or more sensors such as the sensor 112.

Figures 10A, 10B:
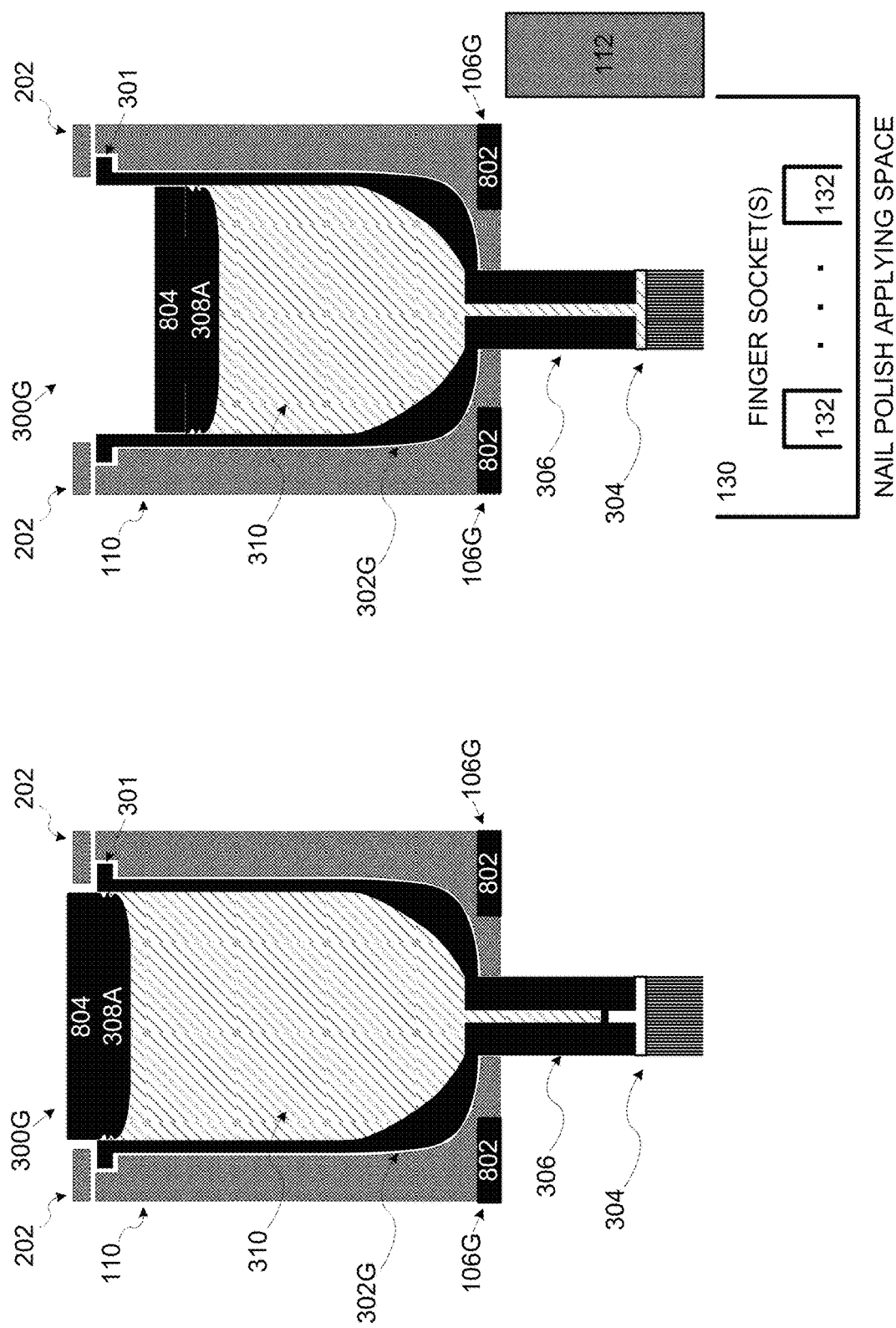
FIG. 10A and FIG. 10B are longitudinal cross section views of an exemplary magnetic field based pressure applying element of a nail polish application apparatus, according to some embodiments of the present invention.

Reference is now made to FIG. 10A and FIG. 10B, which are longitudinal cross section views of an exemplary magnetic field based pressure applying element of a nail polish application apparatus, according to some embodiments of the present invention. As shown in FIG. 10A, an exemplary capsule embodiment 300G of a capsule such as the capsule 300 having a body portion 302G exemplary embodiment of the body portion 302, a discharge nozzle such as the discharge nozzle 306 and a nail polish applying element such as the nail polish applying element 304 may be located in a capsule compartment such as the capsule compartment 110 of a nail polish application apparatus such as the nail polish application apparatus 101A. An opening in a top face of the body portion 302G is sealed by a sliding gasket 308A exemplary embodiment of the sliding gasket 308. The body portion 302G defines a reservoir adapted to contain nail polish fluid such as the nail polish fluid 310. The body portion 302G may include a flange-like rim such as the flange-like rim 301 adapted to support locking by a locking mechanism such as the locking mechanism 202 of the capsule compartment 110. The capsule 300G may further include one or more magnetic elements 804 on top and/or inside the sliding gasket 308A. The magnetic element(s) 804 may be attracted and/or repelled according to a magnetic field applied to it. Optionally, the magnetic element 804 is part of the nail polish application apparatus 101A such that after inserting the capsule 300G into the capsule compartment 110, the magnetic element(s) 804 is placed, for example, over a top face of the body portion 302G, in particular on top the sliding gasket 308A.

The nail polish application apparatus 101A may utilize a pressure applying element 106G such as the pressure applying element 106 through one or more magnetic field generators 802, for example, a solenoid and/or the like which may be integrated, for example, in the capsule compartment 110.

As shown in FIG. 10B, a control unit such as the control unit 102 may control the magnetic field generator(s) 802 of the pressure applying element 106G, for example, by adjusting a current driven through the magnetic field generator(s) 802 to generate a magnetic field. The control unit 102 may adjust the driven current to control the magnetic field generated by the magnetic field generator(s) 802, for example, a direction, a magnitude and/or other magnetic field parameters. The control unit 102 may instruct generation of the current to the magnetic field generator(s) 802 which may induce the magnetic field to attract and/or repel the magnetic element(s) 804 to press down the sliding gasket 308A. The magnetic field generator(s) 802 may be located at lower section(s) of capsule compartment 110 and accordingly, the control unit 102 may adjust the current to the magnetic field generator(s) 802 to generate a magnetic field attracting the magnetic element(s) 804. Additionally and/or alternatively, the magnetic field generator(s) 802 may be located above the capsule 300G and accordingly, the control unit 102 may adjust the current to the magnetic field generator(s) 802 to generate a magnetic field repelling the magnetic element(s) 804. The sliding gasket 105K moving toward the bottom side of the body portion 302G may build an internal pressure in the body portion 302G which may force extrusion of the nail polish fluid 310 from the body portion 302G to the nail polish applying element 304 through the discharge nozzle 306.

According to some embodiments of the present invention, the nail polish apparatus 101A includes one or more puncturing elements such as the puncturing element 114 to puncture on or more openings in the body portion 302. The opening(s) may be punctured in order to release the nail polish fluid 310 from the body portion 300 to the discharge nozzle 306 and through it to the nail polish applying element 304. The puncturing element(s) 114 may include, for example, a sharp middle, a piercing pole and/or the like. Puncturing the opening(s) in the body portion 302 using the puncturing element(s) 114 may be done additionally and/or alternatively to automatically opening sealed opening(s) such as the sealed opening 307 that may be employed by the capsule 300 as described herein before.

Reference is now made to FIG. 11A, FIG. 11B and FIG. 11C, which are longitudinal cross section views of exemplary puncturing elements of a nail polish application apparatus, according to some embodiments of the present invention. A nail polish application apparatus such as the nail polish application apparatus 101A may include one or more puncturing elements such as the puncturing element 114 to puncture a body portion such as the body portion 302 of a capsule such as the capsule 300. Puncturing the body portion 302 is done in order to release nail polish fluid such as the nail polish fluid 310 contained in the body portion 302 to a discharge nozzle such as the discharge nozzle 306 and through it to a nail polish applying element such as the nail polish applying element 304. Puncturing the body portion 302 may be done, for example, as part of the preparation operations a control unit such as the control unit 102 conducts prior to initiating a nail polish application process. As such, puncturing the body portion 302 may be done in a nail polish applying space such as the nail polish applying space 130 and/or in a preparation space such as the preparation space 134.

As shown in FIG. 11A, the nail polish application apparatus 101A may include one or more puncturing elements 114A such as the puncturing element 114. The puncturing element 114A may be deployed and/or located in the nail polish application apparatus 101A to puncture (pierce) a bottom face of the body portion 302. In particular, the capsule 300 may include one or more sealing surfaces 920A, typically located in the discharge nozzle 306 and/or in the body portion 302 in proximity to the location of the proximal end of the discharge nozzle 306. The puncturing element(s) may thus be configured, adapted, located and/or deployed to fracture the sealed opening(s) 920A. The puncturing element(s) 114A may be moveable by one or more actuators such as the actuator 104 such that the control unit 102 may operate the actuator(s) 104 to move the puncturing element(s) 114A to a location, typically beneath the nail polish applying element 304. The control unit 102 may further control movement of the puncturing element(s) 114A to move through the nail polish applying element 304 and into the discharge nozzle 306 to fracture the sealing surface 920A. Additionally and/or alternatively, the puncturing element(s) 114A may be static and the capsule 300 located in a capsule compartment such as the capsule compartment 110 integrated with a mounting element such as the mounting element 108 is moved to the puncturing element(s) 114A. The control unit 102 may operate the actuator(s) 104 controlling movement of a mounting element 108 to move and/or position the capsule 300 inserted in the capsule compartment 110 such that the puncturing element 114A is properly aligned with the sealing surface 920A. Once properly positioned, the control unit 102 may operate the actuator(s) 104 to move the mounting element 108 such that the nail polish applying element 304 is moved over the puncturing element 114A until the sealing surface 920A heats the puncturing element 114A and is pierced to release the nail polish fluid 310.

In another embodiment, the user may insert the capsule 300 into a puncturing space in the nail polish application apparatus 101A where the puncturing element 114, for example, the puncturing element 114A is located. The user may apply force on the capsule 300 by, for example, pressing the capsule 300 into a designated slot, inserting the capsule 300 into a chamber and closing a cover on the chamber and/or the like. The applied pressure may cause the puncturing element 114A to pierce a sealing surface such, for example, the sealing surfaces 920A. Optionally, the puncturing space may be utilized in one or more of the operational spaces of the nail polish application apparatus 101A, for example, the storage space, the preparation space 134 and/or the like.

As shown in FIG. 11B, the nail polish application apparatus 101A may include one or more puncturing elements 114B such as the puncturing element 114. The puncturing element 114B may be deployed and/or located in the nail polish application apparatus 101A to break a sealing surface 920B, for example, a weakened surface disposed within the capsule 300, for example, in a discharge nozzle 306B such as the discharge nozzle 306. The discharge nozzle 306B may further include one or more longitude faces having a high elasticity coefficient allowing at least partial deformation of the discharge nozzle 306B. The control unit 102 may control movement of the puncturing element 114B and/or of the mounting element 108 to apply pressure to one or more of the longitude faces of the discharge nozzle 306B. The pressure applied by the puncturing element 114B may deform the discharge nozzle 306B, for example, bend, crumple and/or the like thus breaking the sealing surface 920B. In some embodiments, the user may deform manually the conveying tunnel 112N to break the sealed opening(s) 1402. The user may deform the discharge nozzle 306B before inserting the capsule 300 into the capsule compartment 110 and/or while the capsule 300 is located in the capsule compartment 110. Optionally, as shown in FIG. 11C, in case the capsule 300 inserted in the capsule compartment 110 is a capsule such as the capsule 300A having a sliding gasket 308A such as the sliding gasket 308, one or more of the puncturing elements 114C such as the puncturing element 114 may fracture the sealed surface(s) 920A from above. This may be implemented assuming the sliding gasket 308A is made of a material that is characterized by high elasticity allowing the puncturing element(s) 114C to move in and out of the sliding gasket 308A without compromising the sealing of a body portion such as the body portion 302A. The control unit 102 may operate the actuator(s) 104 controlling movement of a mounting element 108 to move and/or position the capsule 300A inserted in the capsule compartment 110 such that the puncturing element 114C is properly aligned with the sealing surface 920A. Once properly positioned, the control unit 102 may operate the actuator(s) 104 to move the mounting element 108 and/or the puncturing element 114C such that the puncturing element 114C goes through the sliding gasket 308A, through the body portion 302A and fractures the sealing surface 920A. The puncturing element 114C may then be removed from the capsule 300A while the sliding gasket 308A may expand to seal the opening caused by the insertion of the puncturing element 114C.

According to some embodiments of the present invention, the nail polish apparatus 101A includes one or more drying elements such as the drying element 116 which may be operated by the control unit 102 to dry the nail polish fluid after applied to the nail surface(s). The drying element 116 may be further deployed, positioned and/or adapted to cure the gel polish after applied to the nail surface(s).

The drying element(s) 116, for example, an air blower, a heated air blower, a heating element, a light based heating element, a drying material applicator and/or the like may be deployed in the nail polish applying space 130 and/or the drying space 136 (if available) for local and/or global drying of the nail polish fluid 310.

Global drying relates to one or more drying elements 116 which may be disposed in a nail polish applying space such as the nail polish applying space 130 and/or in a drying space such as the drying space 136 to dry and/or cure the one or more nail surfaces located in the respective space(s). In such configuration, the drying element(s) 116 may typically be set in a static positioning. For example, one or more heated air blowing drying elements 116 operated by the control unit 102 may be distributed, located, positioned and/or the like to expedite a drying process of the nail surfaces to which the nail polish fluid 310 was applied during the nail polish application process. The heated air blowing drying element(s) 116 may be positioned such that the heated air is directed to the target nail surface(s). Moreover, one or more funneling elements, for example, a pipe (e.g. a syringe needle, etc.), a tube and/or the like may be coupled to the air blowing drying element(s) 116 to direct the heated air to the respective nail surface(s) in order to dry the nail polish fluid 310 after applied to the respective nail surface(s). In such configuration, the control unit 102 may operate the drying element(s) 116 to dry the nail surfaces of one hand of the user which completed the nail polish application while the other hand is being applied with the nail polish fluid 310.

Local drying relates to locally drying a specific nail surface while not affecting other nail surface(s) by positioning the drying element(s) 116 in close proximity to the target nail surface. This means that the target nail surface may be dried while applying the nail polish fluid 310 to other nail surface(s).

Optionally, one or more of the capsules 300 inserted in the capsule compartment(s) 110 contains drying material that may be used to dry the nail polish fluid 310 after applied to the nail surface(s).

Figure 12:
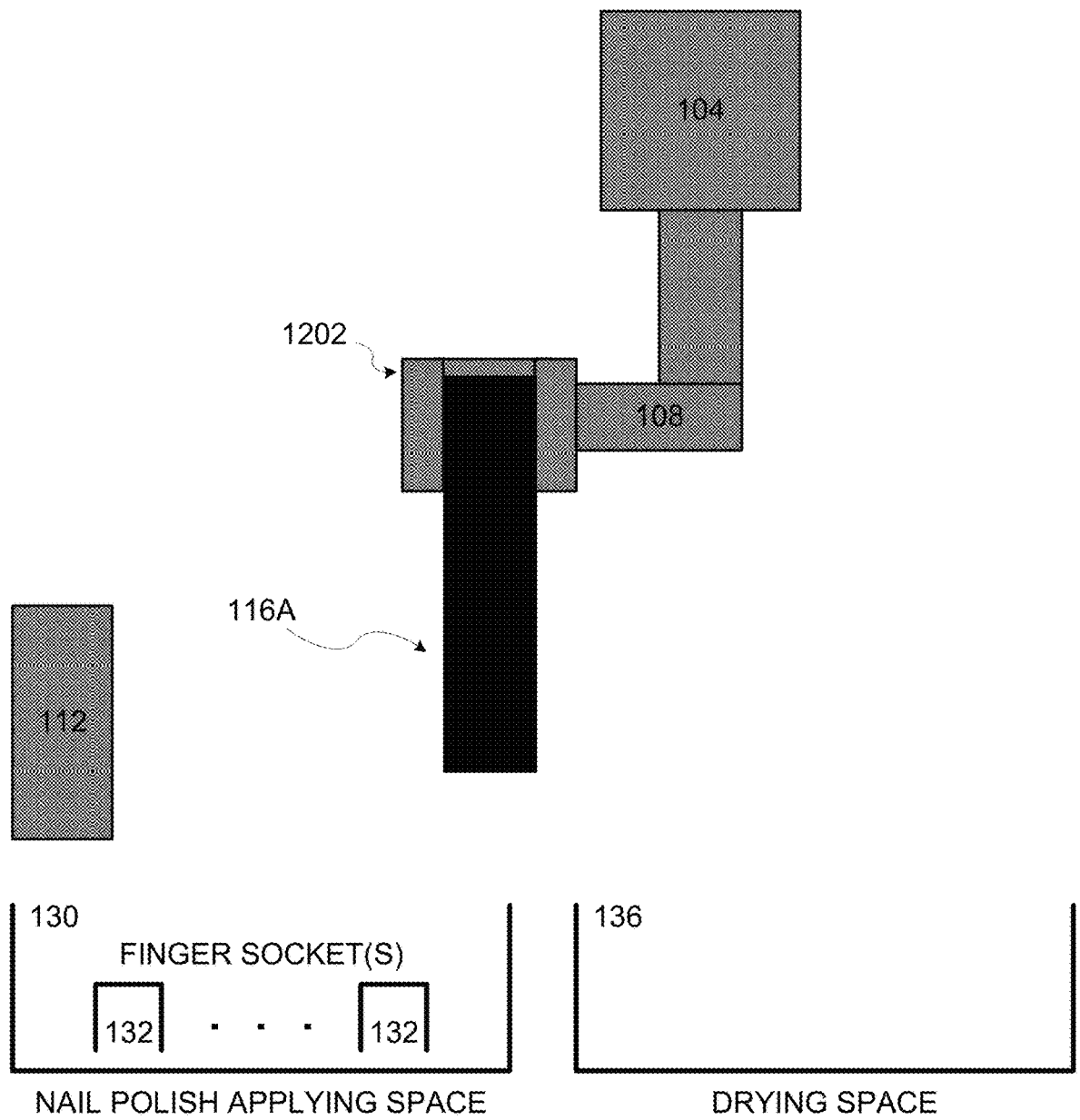
FIG. 12 is a longitudinal cross section view of an exemplary drying element of a nail polish application apparatus, according to some embodiments of the present invention.

Reference is now made to FIG. 12, which is a longitudinal cross section view of an exemplary drying element of a nail polish application apparatus, according to some embodiments of the present invention. A nail polish application apparatus such as the nail polish application apparatus 101A may include one or more local drying elements 116A such as the local drying element 116. In order to localize the drying process to one or more target nail surface without affecting other nail surface(s), the local drying element(s) 116A may be positioned in close proximity to the target nail surface(s). The close proximity may allow improved and/or expedited drying as the drying energy may be concentrated to a small area in which the nail surface thus avoiding wasting energy for drying a large area as may be done in the global drying. This may significantly reduce energy consumption of the local drying element(s) 116A. Moreover, the close proximity may allow significantly enhanced control over the drying process of nail polish fluid such as the nail polish fluid 310 applied to the target nail surface(s). The drying process may be conducted in a nail polish applying space such as the nail polish applying space 130 and/or in a dedicated drying space such as the drying space 136. In an exemplary embodiment, one or more local drying element(s) 116A may be attached to a mounting element such as the mounting element 108. The mounting element 108 may include one or more fixtures 1202 adapted to receive and accommodate the local drying element(s) 116A. During the nail polish application process, after completing applying the nail polish fluid 310 to a certain nail surface, a control unit such as the control unit 102 may operate one or more actuator(s) such as the actuator 104 to move the mounting element 108 to position the local drying element(s) 116A, for example, the heated air blower, the light based heating element, the drying material applicator and/or the like above the certain nail surface. After properly positioned, the control unit 102 may further operate the local drying element(s) 116A to dry the certain nail surface. In another example, one or more of the local drying element(s) 116A are mounted on separate mounting elements such as the mounting element 108 which are moveable by one or more of the actuators 104 operated by the control unit 102. The control unit 102 may control the actuator(s) 104 to maneuver the mounting element 108 carrying the drying element(s) 116 through the nail polish applying space 130 and/or the drying space 136 if available by the nail polish application apparatus 101A. In some embodiments, the control unit 102 may operate one or more of the local drying element(s) 116A to dry a first nail surface on which the nail polish fluid 310 was applied while instructing application of the nail polish fluid 310 to a second nail surface. Such operation may typically be conducted in the nail polish applying space 130. This may further expedite the nail application process as the nail polish application and drying processes may be done substantially in parallel.

Optionally, drying element(s) 116 may be fixed in a static location while one or more dynamic funneling elements, for example, a pipe (e.g. a syringe needle, etc.), a tube and/or the like which are attached to the drying element(s) 116 are movable. For example, the dynamic funneling element(s) may be connected to the mounting element 108. In such implementation the control unit 102 may control the actuator(s) 104 to maneuver the mounting element 108 carrying the dynamic funneling element(s) through the nail polish applying space 130 and/or the drying space 136 to position the end of the dynamic funneling element(s) over the nail surface(s) to which the nail polish fluid 310 was applied.

Figure 13:
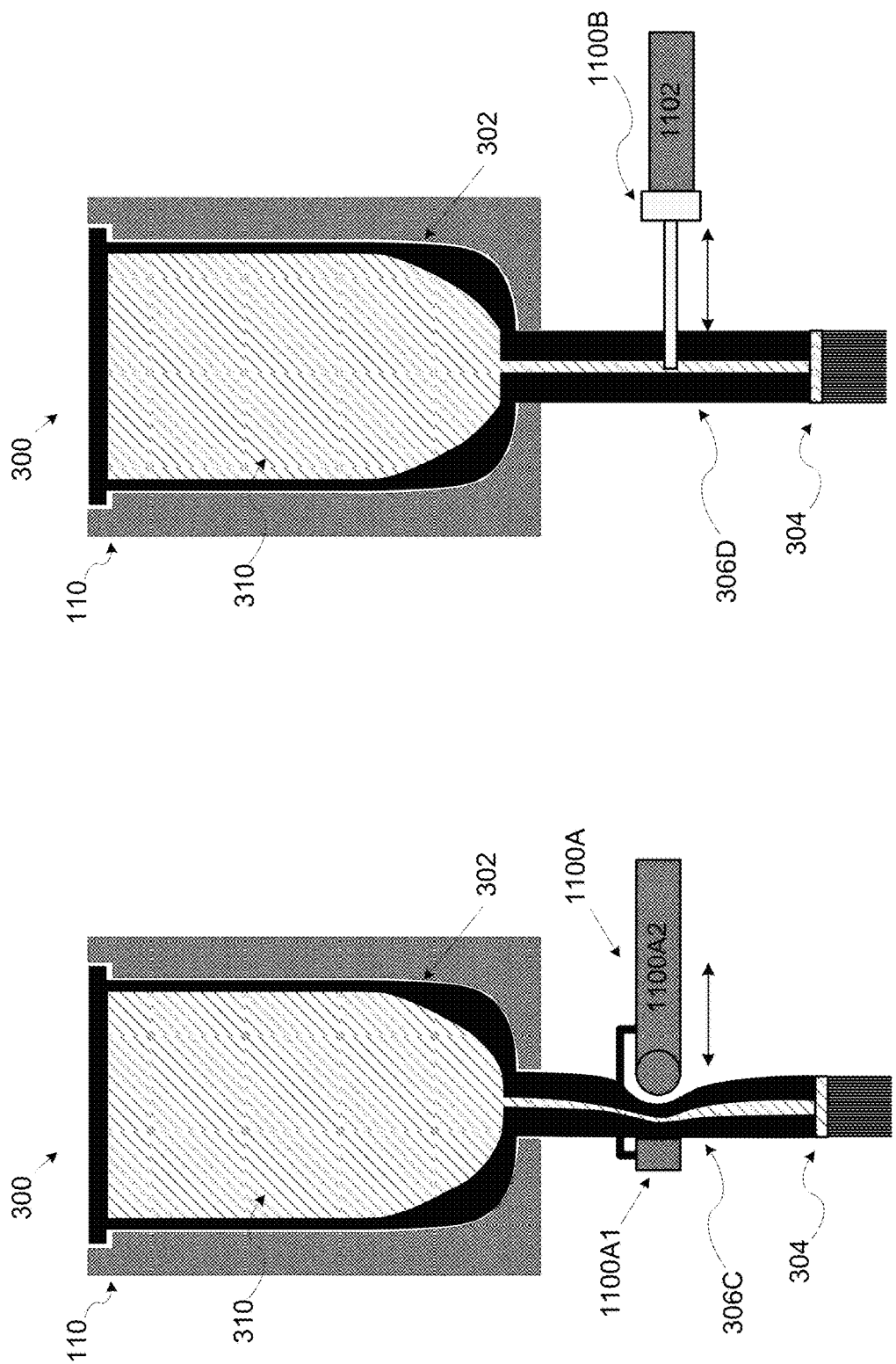
FIG. 13A and FIG. 13B are longitudinal cross section views of exemplary adjustable shutters of a nail polish application apparatus, according to some embodiments of the present invention.

Reference is now made to FIG. 13A and FIG. 13B, which are longitudinal cross section view of exemplary adjustable shutters of a nail polish application apparatus, according to some embodiments of the present invention. An exemplary nail polish application apparatus such as the nail polish application apparatus 101A may include an adjustable shutter 1100 operated by a control unit such as the control unit 102 to control a flow rate of a nail polish fluid such as the nail polish fluid 310 contained in a capsule such as the capsule 300. The control unit 102 may dynamically adjust the shutter 1100 in order to adjust the flow rate of the nail polish fluid 310 from a body portion such as the body portion 302 of the capsule 300 to a nail polish applying element such as the nail polish applying element 304.

As shown in FIG. 13A, the exemplary capsule 300 includes a discharge nozzle 306C constructed with one or more longitude faces having a high elasticity coefficient allowing at least partial deformation of the discharge nozzle 306C. The control unit 102 may control movement of an adjustable shutter 1100A which may configured to deform at least one of the longitude faces of the discharge nozzle 306C to maintain, decrease and/or increase the flow rate of the nail polish fluid 310 through the discharge nozzle 306C and thus the flow of the nail polish fluid 310 to the nail polish applying element 304. For example, the adjustable shutter 1100A may include a fixed part 1100A1 that secures in pace a first side of the longitude faces of the discharge nozzle 306C and a second part 1100A2 that is moveable with respect to the first part 1100A1 by one or more of the actuators 104. The control unit 102 may operate the actuator(s) 104 to push the second part 1100A2 closer or away from the first part 1100A1 thus controlling the width of a conveying tunnel in the discharge nozzle 306C to control the flow rate of the nail polish fluid 310 through the discharge nozzle 306C. The adjustable shutter 100A may further be configured in a shape to fit the external shape of the longitude faces of the discharge nozzle 306C, for example, a cylindrical shape and/or the like. In another example, the adjustable shutter 1100A is utilized by a peristaltic pump. The control unit 102 may control the displacement movement of the peristaltic pump to control the flow of the nail polish fluid 310 through the discharge nozzle 306C.

As shown in FIG. 13B, the capsule 300 may include an integrated dynamically adjustable shutter 1100B installed on a discharge nozzle 306D such as the discharge nozzle 306. The shutter 1100B may be used to control a flow rate of the nail polish fluid 310 through the discharge nozzle 306D to the nail polish applying element 304. The shutter 1100B may include a blocking element, for example, a screw, a mechanical valve, an electromagnetic valve, a press lever and/or the like that may be set to two or more operational states. In a first state, the shutter 1100B may block the flow of the nail polish fluid 310 through the discharge nozzle 306D. In one or more other states, the shutter 1100B may be dynamically adjusted to allow at least partial flow of the nail polish fluid 310 through the discharge nozzle 306D. The shutter 1100, in particular when utilized as the screw, the press lever and/or the like may be operated by a user of the nail polish application apparatus. Additionally and/or alternatively, the shutter 1100B, for example, when utilized as the screw, the press lever, the mechanical valve, the electromagnetic valve and/or the like may be operated by the control unit 102. The nail polish application apparatus 101A may include a shutter control element 1102 that may interact with the shutter 1100B operated by the control unit 102. For example, the shutter control element 1102 may include one or more magnetic field generator operated by the control unit 102 to apply a magnetic field through an electromagnetic valve shutter 1100B to transition between the operational states with respect to the magnitude of the magnetic field. In another example, the shutter control element 1102 may include a mechanical element that may press a lever shutter 1100B. The control unit may operate one or more actuators such as the actuator 104 to maneuver, for example, shift, move and/or rotate the mechanical element of the shutter control element 1102 to open and/or close press lever shutter 1100B to move between the operational states with respect to the displacement of the press lever shutter 1100B.

In some embodiments of the present invention, the nail polish application apparatus 101 may be constructed such that the capsule compartment 110 may not be part of the mounting element 108. Rather, the mounting element may be adapted to receive the nail polish applying element 304 that may be connected through one or more conveying tubes to the capsule 300 inserted in the capsule compartment 110 that may be separated and optionally static in the nail polish application apparatus 101.

Figure 14:
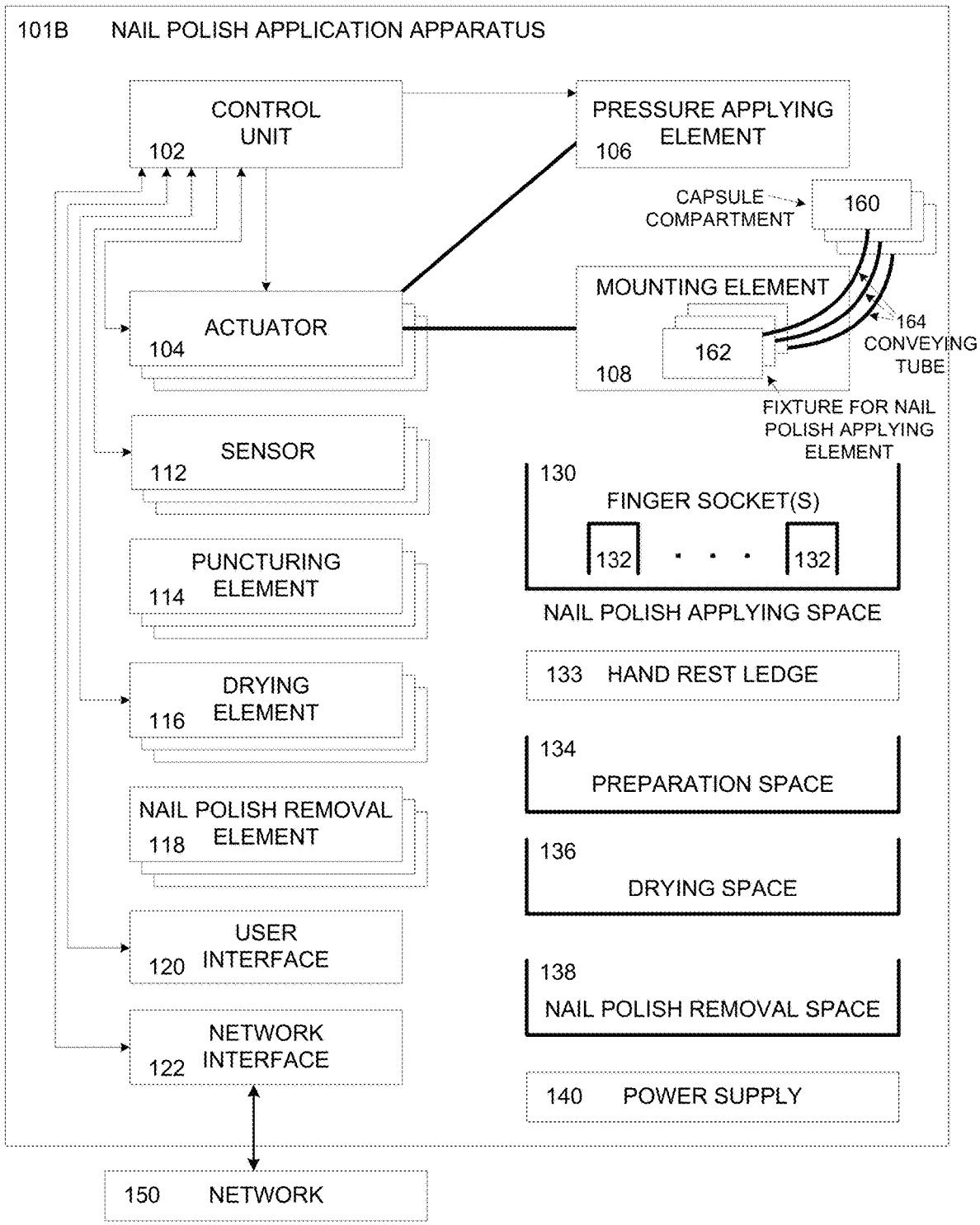
FIG. 14 is a schematic illustration of an exemplary nail polish application apparatus utilizing a two-part capsule containing nail polish fluid for applying the nail polish fluid to nail surface(s), according to some embodiments of the present invention.

Reference is now made to FIG. 14, which is a schematic illustration of an exemplary nail polish application apparatus utilizing a two-part capsule containing nail polish fluid for applying the nail polish fluid to nail surface(s), according to some embodiments of the present invention. An exemplary nail polish application apparatus 101B is similar in most aspects, features, implementations and capabilities to the nail polish application apparatus 101A. Accordingly, the nail polish application apparatus 101B includes a control unit such as the control unit 102, one or more actuators such as the actuator 104, a pressure applying element such as the pressure applying element 106, a mounting element such as the mounting element 108, one or more sensors such as the sensor 112, a nail polish applying space such as the nail polish applying space 130 (optionally having one or more finger sockets such as the finger sockets 132) and a power supply such as the power supply 140. Optionally, the nail polish application apparatus 101B includes one or more puncturing elements such as the puncturing element 114, one or more drying elements such as the drying element 116, one or more nail polish removal elements such as the nail polish removal elements 118, a user interface such as the user interface 120, a network interface such as the network interface 122, a hand rest ledge such as the hand rest ledge 133, a preparation space such as the preparation space 134, a drying space such as the drying space 136 and/or a nail polish removal space such as the nail polish removal space 138.

The nail polish application apparatus 101B however is adapted to receive and accommodate one or more two-part capsules which constructed as a variant of the capsule 300 in which a body portion such as the body portion 302 is connected to a discharge nozzle variant of the discharge nozzle 306 through a conveying tube 164. The nail polish application apparatus 101B includes one or more fixtures 162 adapted to receive and accommodate a nail polish applying element such as the nail polish applying element 304 typically inserted with a discharge nozzle variant of the discharge nozzle 306. The discharge nozzle 306 is connected through the conveying tube 164 to a capsule compartment 160 adapted to receive and accommodate the two-part capsule variant of the capsule 300 containing nail polish fluid such as the nail polish fluid 310.

Figure 15:
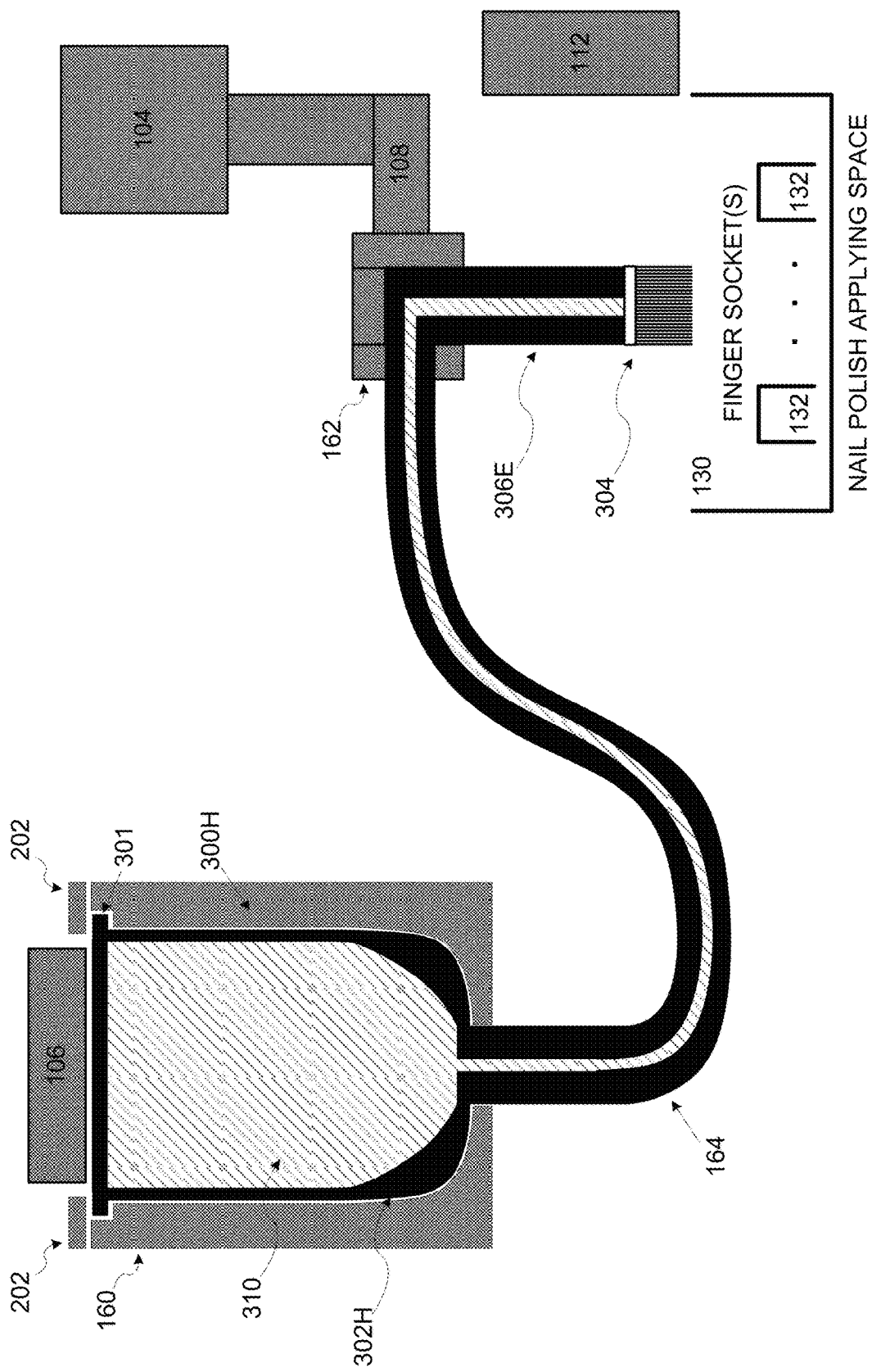
FIG. 15 is a longitudinal cross section view of an exemplary mounting element and capsule compartments of a nail polish application apparatus utilizing a two-part capsule, according to some embodiments of the present invention.

Reference is now made to FIG. 15, which is a longitudinal cross section view of an exemplary mounting element and capsule compartments of a nail polish application apparatus utilizing a two-part capsule, according to some embodiments of the present invention. An exemplary capsule compartment 160 such as the capsule compartment 110 of a nail polish application apparatus such as the nail polish application apparatus 101B may be adapted to receive and accommodate a body portion 302H variant of the body portion 302 of an exemplary two-part capsule 300H which is a variant of the capsule 300. The two-part capsule 300H further includes a discharge nozzle 306E variant of the discharge nozzle 306, a nail polish applying element such as the nail polish applying element 304 and a conveying tube such as the conveying tube 164 connecting the body portion 302H to the discharge nozzle 306E. A mounting element of the nail polish application apparatus 101B such as the mounting element 108 includes a fixture 162 adapted to receive and accommodate the discharge nozzle 306E and the nail polish applying element 304. As described before the mounting element 108 is moveable by one or more actuators such as the actuator 104 operated by a control unit such as the control unit 102. The conveying tube 164 may be significantly flexible constructed of highly elastic material such that while the nail polish applying element 304 is moveable at least through a nail polish applying space such as the nail polish applying space 130, the capsule compartment 160 may be static. The conveying tube 164 therefore accommodates the mechanical connection between the typically static body portion 302H and the moveable discharge nozzle 306E connected to the nail polish applying element 304. The nail polish fluid 310 may be forced to flow out of the body portion 302H by one or more pressure applying elements such as the pressure applying element 106 as described for the nail polish application apparatus 101A.

Optionally, the nail polish applying element 304 is initially part of the capsule 300H, for example, attached to the body portion 302H. Before initiating the polish application process, the nail polish applying element 304 may be detached from the body portion 302H and installed in the such that the fixture 162. In some embodiments, the nail polish applying element 304 may be manually detached by the user before and/or after placing the body portion 302H in the capsule compartment 160. The user may further manually install the nail polish applying element 304 in the fixture 162. Optionally, the nail polish applying element 304 is automatically detached from the capsule 300H and/or installed in the fixture 160. This may be done by the control unit 102 operating the mounting actuator(s) 104 to maneuver the mounting element 108 towards the capsule 300H, in particular towards the location of the nail polish applying element 304 (attached to the body portion 302H) and lock the nail polish applying element 304 in the fixture 162.

Figure 16:
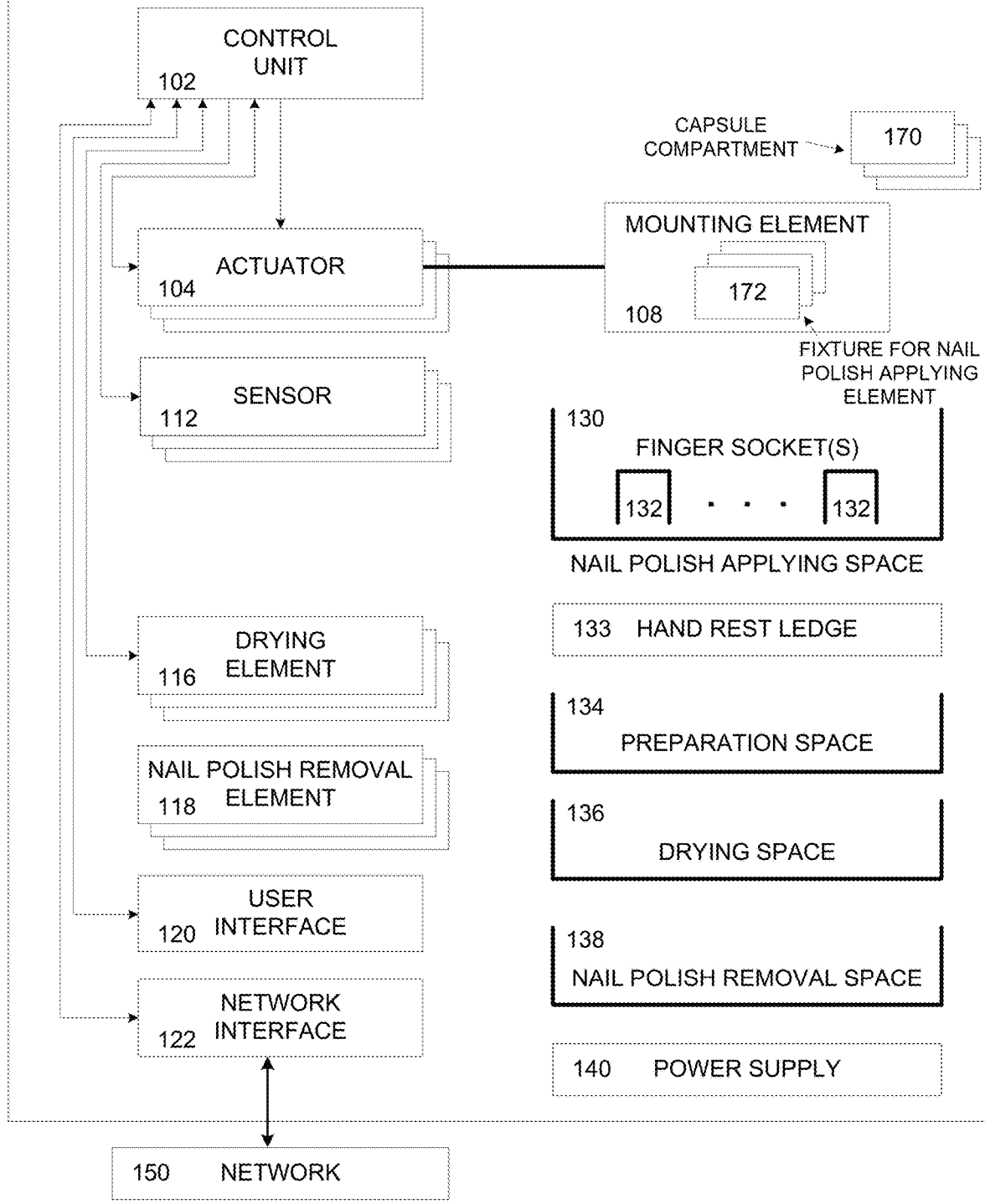
FIG. 16 is a schematic illustration of an exemplary nail polish application apparatus utilizing a two-part capsule with detachable nail polish applying element for applying nail polish fluid to nail surface(s), according to some embodiments of the present invention.

Reference is now made to FIG. 16, which is a schematic illustration of an exemplary nail polish application apparatus utilizing a two-part capsule with detachable nail polish applying element for applying nail polish fluid to nail surface(s), according to some embodiments of the present invention. An exemplary nail polish application apparatus 101C is similar in most aspects, features, implementations and capabilities to the nail polish application apparatus 101A. Accordingly, the nail polish application apparatus 101C includes a control unit such as the control unit 102, one or more actuators such as the actuator 104, a pressure applying element such as the pressure applying element 106, a mounting element such as the mounting element 108, one or more sensors such as the sensor 112, a nail polish applying space such as the nail polish applying space 130 (optionally having one or more finger sockets such as the finger sockets 132) and a power supply such as the power supply 140. Optionally, the nail polish application apparatus 101C includes one or more drying elements such as the drying element 116, one or more nail polish removal elements such as the nail polish removal elements 118, a user interface such as the user interface 120, a network interface such as the network interface 122, a hand rest ledge such as the hand rest ledge 133, a preparation space such as the preparation space 134, a drying space such as the drying space 136 and/or a nail polish removal space such as the nail polish removal space 138.

The nail polish application apparatus 101C however is adapted to receive and accommodate one or more nail polish capsules, in particular disposable two-part nail polish capsules with a detachable nail polish applying elements 305 such as the nail polish applying element 304. Each of the disposable two-part nail polish capsules comprises a nail polish fluid container (body portion) 174 containing nail polish fluid such as the nail polish fluid 310 with the detachable nail polish applying elements 305 covering the container 174. In particular, the detachable nail polish applying element 305 includes a dispensing head, for example, a brush, an application head and/or the like shaped and adapted to apply the nail polish fluid 310 over one or more nail surfaces. The dispensing head may be dipped in the nail polish fluid container 174 in order to collect the nail polish fluid 310 to be applied over the nail surface(s). The nail polish application apparatus 101C includes one or more capsule compartments 170 adapted to receive and accommodate nail polish capsule(s). The mounting element 108 of the nail polish application apparatus 101C includes one or more fixtures 172 adapted to receive and accommodate the detachable nail polish applying element(s) 305. The disposable two-part nail polish capsule may typically be constructed as a flask which contains the nail polish fluid 310 and is sealed with the nail polish applying element 305 serving as a cover. The user may open the flask and place the cover, i.e. the nail polish applying element 305 in the fixture 172 while placing the flask type container 174 in the capsule compartments 170. Optionally, the opening of the flask(s) and placing the detachable nail polish applying element(s) 305 in the fixture(s) 172 is done automatically by the nail polish application apparatus 101C. In some embodiments of the present invention, the two-part nail polish capsule with detachable nail polish applying element 305 is disposable such that both the container 174 and the nail polish applying element 305 are used for a single nail polish application session. The amount of nail polish fluid 310 contained in the container 174 (e.g. the flask body) may be adapted to suffice for a single application of the nail polish fluid 310, for example, on a single nail surface, on nail surfaces of fingers of a single hand, on nail surfaces of fingers of two hands and/or the like.

Reference is now made to FIG. 17, which is a longitudinal cross section view of an exemplary mounting element of a nail polish application apparatus utilizing a two-part capsule with detachable nail polish applying element, according to some embodiments of the present invention. A mounting element of the nail polish application apparatus 101C such as the mounting element 108 includes a fixture 172 adapted to receive and accommodate a detachable nail polish applying element such as the detachable nail polish applying element 305. As described before the mounting element 108 is moveable by one or more actuators such as the actuator 104 operated by a control unit such as the control unit 102.

The control unit 102 may operate the actuator(s) 104 to move the mounting element 108 between one or more nail polish containers 174 (e.g. flasks) of capsules placed in capsule compartments such as the capsule compartment 170 and a nail polish applying space such as the nail polish applying space 130. By operating the actuator(s) 104, the control unit 102 may maneuver the mounting element 108 to dip the dispensing head of the detachable nail polish applying element(s) 305 in nail polish fluid such as the nail polish fluid 310 contained in container 174 of the capsule(s) inserted in the capsule compartment(s) 170. As described for the nail polish application apparatus 101A, the control unit 102 may further operate the actuator(s) 104 to move the mounting element 108 according to analysis of the sensory data collected from the sensor(s) 112 to maneuver the nail polish applying element 305 over the target nail surface(s) in the nail polish applying space 130 in order to accurately apply the nail polish fluid 310 to the nail surface(s). The control unit 102 may analyze the sensory data to estimate, for example, the saturation level of the nail polish fluid 310 in the dispensing head of the detachable nail polish applying element 305 and operate, based on the analysis, the actuator(s) 104 to move the mounting element 108 to dip each of the dispensing head(s) in the container 174 (e.g. flask) placed in the capsule compartment(s) 170. The capsule compartment(s) 170 may be static and located in a fixed location within the nail polish application apparatus 101C, for example, in the nail polish applying space 130, the preparation space 134 and/or the like. Optionally, the capsule compartment(s) 170 are dynamically moveable by one or more actuators such as the actuator 104 operated by a control unit such as the control unit 102

Figure 18C:
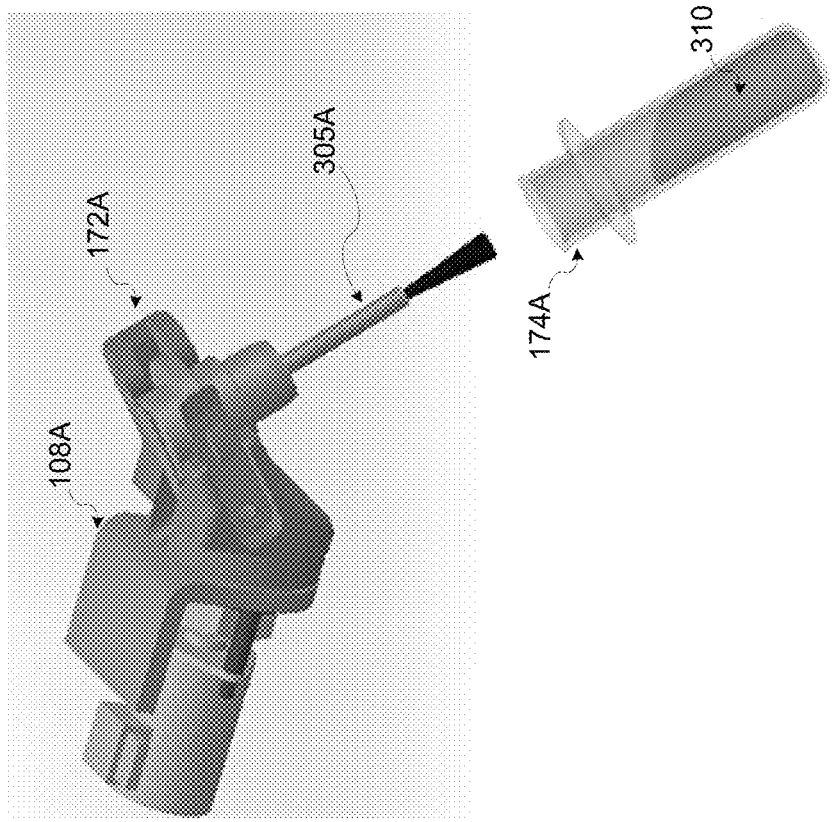
FIG. 18A, FIG. 18B and FIG. 18C are perspective side and front views of an exemplary mounting element of a nail polish application apparatus utilizing a two-part capsule with detachable nail polish applying element, according to some embodiments of the present invention.
Figure 18A:
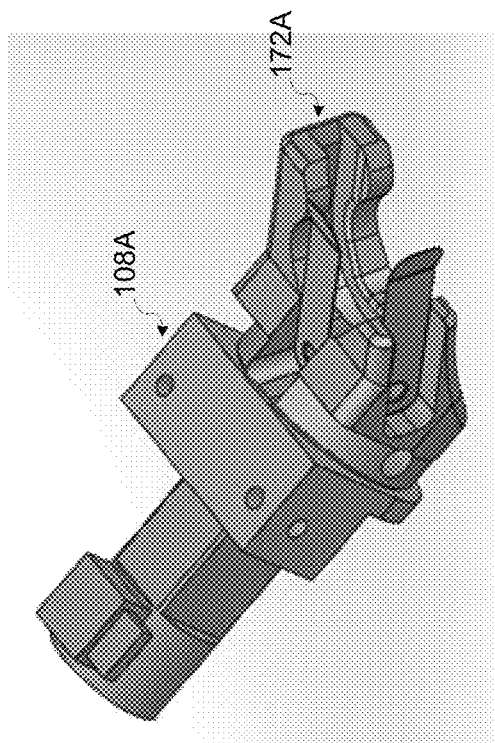
Figure 18B:
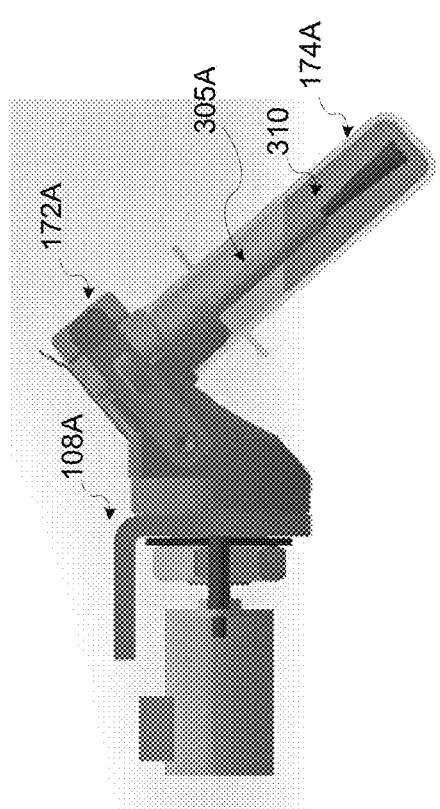

Reference is now made to FIG. 18A, FIG. 18B and FIG. 18C, which are perspective side and front views of an exemplary mounting element of a nail polish application apparatus utilizing a two-part capsule with detachable nail polish applying element, according to some embodiments of the present invention. As shown in FIG. 18A, a mounting element 108A such as the mounting element 108 of a nail polish application apparatus such as the nail polish application apparatus 101C comprises an exemplary fixture 172A such as the fixture 172 adapted to receive and accommodate a detachable nail polish applying element 305A such as the detachable nail polish applying element 305. As shown in FIG. 18B, the mounting element 108A may be maneuvered by one or more actuators such as the actuator 104 operated by a control unit such as the control unit 102 to move the fixture 172A to a capsule compartment such as the capsule compartment 170 hosting a two-part capsule with detachable nail polish applying element 305A. The control unit 102 may operate the actuator(s) 104 to maneuver the mounting element 108A and hence the fixture 172A to lock to the detachable nail polish applying element 305A serving as a cover for a container (e.g. flask) 174A such as the container 174 of the two-part capsule containing a nail polish fluid such as the nail polish fluid 310. As shown in FIG. 18C, the control unit 102 may further operate the actuator(s) 104 to move the mounting element 108A and hence the fixture 172A to detach the detachable nail polish applying element 305A from the container 174A.

Figure 18D:
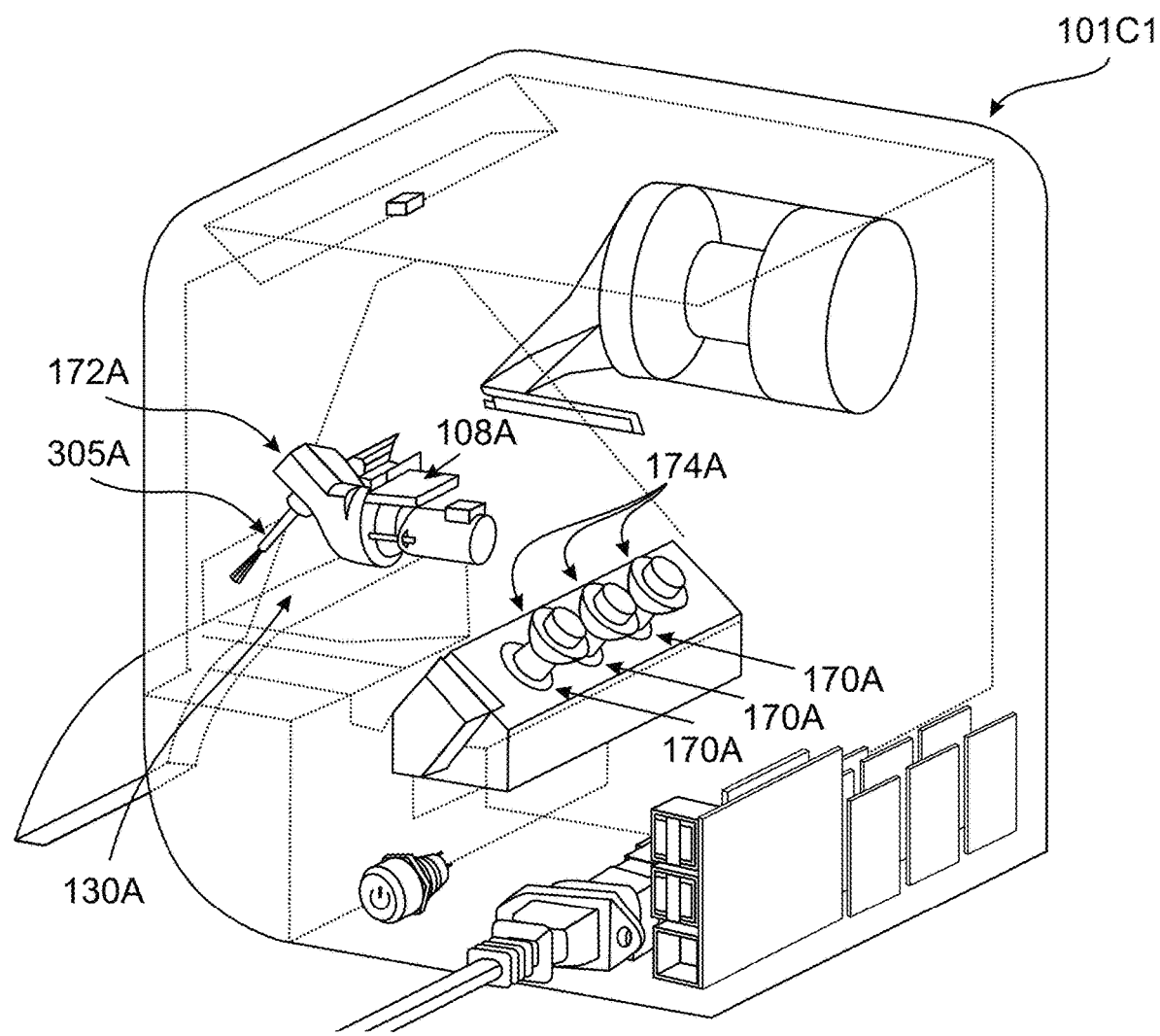
FIG. 18D is a perspective side view of an exemplary nail polish application apparatus utilizing a two-part capsule with detachable nail polish applying element for applying nail polish fluid to nail surface(s), according to some embodiments of the present invention.

Reference is now made to FIG. 18D, which is a perspective side view of an exemplary nail polish application apparatus utilizing a two-part capsule with detachable nail polish applying element for applying nail polish fluid to nail surface(s), according to some embodiments of the present invention. An exemplary nail polish application apparatus 101C1 such as the nail polish application apparatus 101C is adapted to receive and accommodate three disposable two-part nail polish capsules with detachable nail polish applying elements such as the nail polish applying element 305A. The nail polish application apparatus 101C1 comprises three capsule compartments 170A such as the capsule compartments 170 each shaped to receive and accommodate one of the three disposable two-part nail polish capsules with detachable nail polish applying elements 305A. Each of the capsule compartments 170A is shaped to receive and accommodate a container such as the container (flask) 174A of the respective two-part nail polish capsules comprising nail polish fluid such as the nail polish fluid 310. The capsule compartments 170A may utilize one or more implementations, for example, a drawer, a cabinet and/or the like. For example, the capsule compartments 170A may be constructed as a sliding and/or moveable drawer that may be pulled out by the user to place the two-part capsules in the capsule compartments 170A and pushed back into place in the nail polish application apparatus 101C1. The nail polish application apparatus 101C1 further comprises a mounting element such as the mounting element 108A fitted with a fixture such as the fixture 172A adapted to receive and accommodate the detachable nail polish applying element 305A.

The mounting element 108A may be maneuvered by one or more actuators such as the actuator 104 operated by a control unit such as the control unit 102 to move the fixture 172A to the capsule compartments 170A and attach to the detachable nail polish applying elements 305A of one of the nail polish capsules inserted in the capsule compartments 170A. The control unit 102 may operate the actuator(s) 104 to maneuver the mounting element 108A and hence the fixture 172A to lock to the respective detachable nail polish applying element 305 serving as a cover for the container (flask) 174A. The control unit 102 may operate the actuator(s) 104 to move the fixture 172A to detach the detachable nail polish applying element 305A from the container 174A. The control unit 102 may further operate the actuator(s) 104 to maneuver the mounting element 108A carrying the detachable nail polish applying element 305A between the container(s) 174A and a nail polish applying space 130A such as the nail polish applying space 130.

During the nail polish applications session, the control unit 102 may operate the actuator(s) 104 to maneuver the mounting element 108A to move the detachable nail polish applying element 305A in the nail polish applying space 130A such that a dispensing head of the detachable nail polish applying element 305A applies the nail polish fluid 310 to one or more nail surfaces of fingers located in the nail polish applying space 130A. The control unit 102 may also operate the actuator(s) 104 to maneuver the mounting element 108A to move the detachable nail polish applying element 305A to the containers (flasks) 174A and dip the dispensing head in the nail polish fluid 310 in one of the containers 174A.

Figure 19:
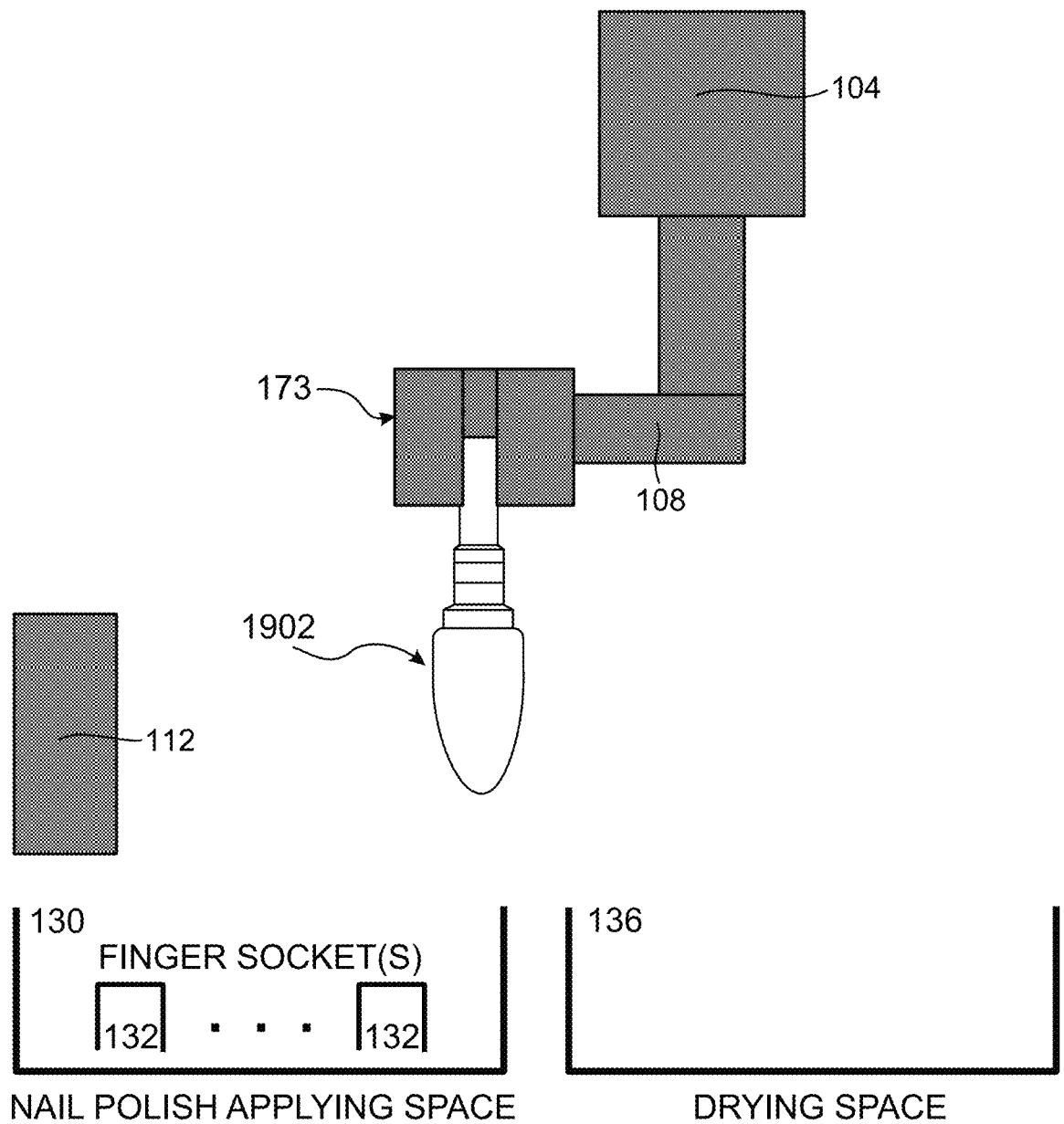
FIG. 19 is a longitudinal cross section view of an exemplary nail shaping element of a nail polish application apparatus, according to some embodiments of the present invention.

Reference is now made to FIG. 19, which is a longitudinal cross section view of an exemplary nail shaping element of a nail polish application apparatus, according to some embodiments of the present invention. A nail polish application apparatus such as the nail polish application apparatus 101C may include one or more nail shaping elements 1902 for treating one or more nail surfaces. The treatment may include, for example, shaping a boundary of the nail surface(s), filling the nail surface(s), shining the nail surface(s), smoothing the nail surface(s) and/or the like. The treatment may further include removing, cutting and/or pushing cuticle(s) from the nail surface(s). A mounting element of the nail polish application apparatus 101C such as the mounting element 108 may include a fixture 173 adapted to receive and accommodate one or more of the nail shaping elements 1902. The nail shaping element 1902 may include a spinning head which may be rotated by one or more actuators such as the actuator 104 operated by a control unit such as the control unit 102. The spinning head may be coated with a crude surface material as typically used for producing nail files used for nail surface treatment, for example, emery paper, glass, metal, ceramic and/or the like.

The control unit 102 may operate the actuator(s) 104 to move the mounting element 108 and maneuver the nail shaping element(s) 1902, in particular the shaping head of the nail shaping element(s) 1902 over the target nail surface(s) in a nail polish applying space such as the nail polish applying space 130. The control unit 102 may analyze the sensory data collected from the sensors 112 to accurately guide, position and/or move the nail shaping element(s) 1902 over the target nail surface(s) to shape and/or fill the target nail surface(s) and/or to remove, cut and/or push cuticles off the target nail surface(s).

Optionally, the fixture 173 is utilized by a fixture such as the fixture 172. The fixture 172 may be designed and constructed to accommodate either the detachable nail polish applying element(s) 305 and/or the nail shaping element(s) 1902. In such design implementation, the control unit 102 may operate the actuator(s) 104 to move the mounting element 108 and hence the fixture 172 to automatically switch between the detachable nail polish applying element 305 and the nail shaping element 1902. Optionally, attaching the nail shaping element(s) 1902 to the fixture 172 and/or the fixture 173 is done manually by the user.

Figure 20A:
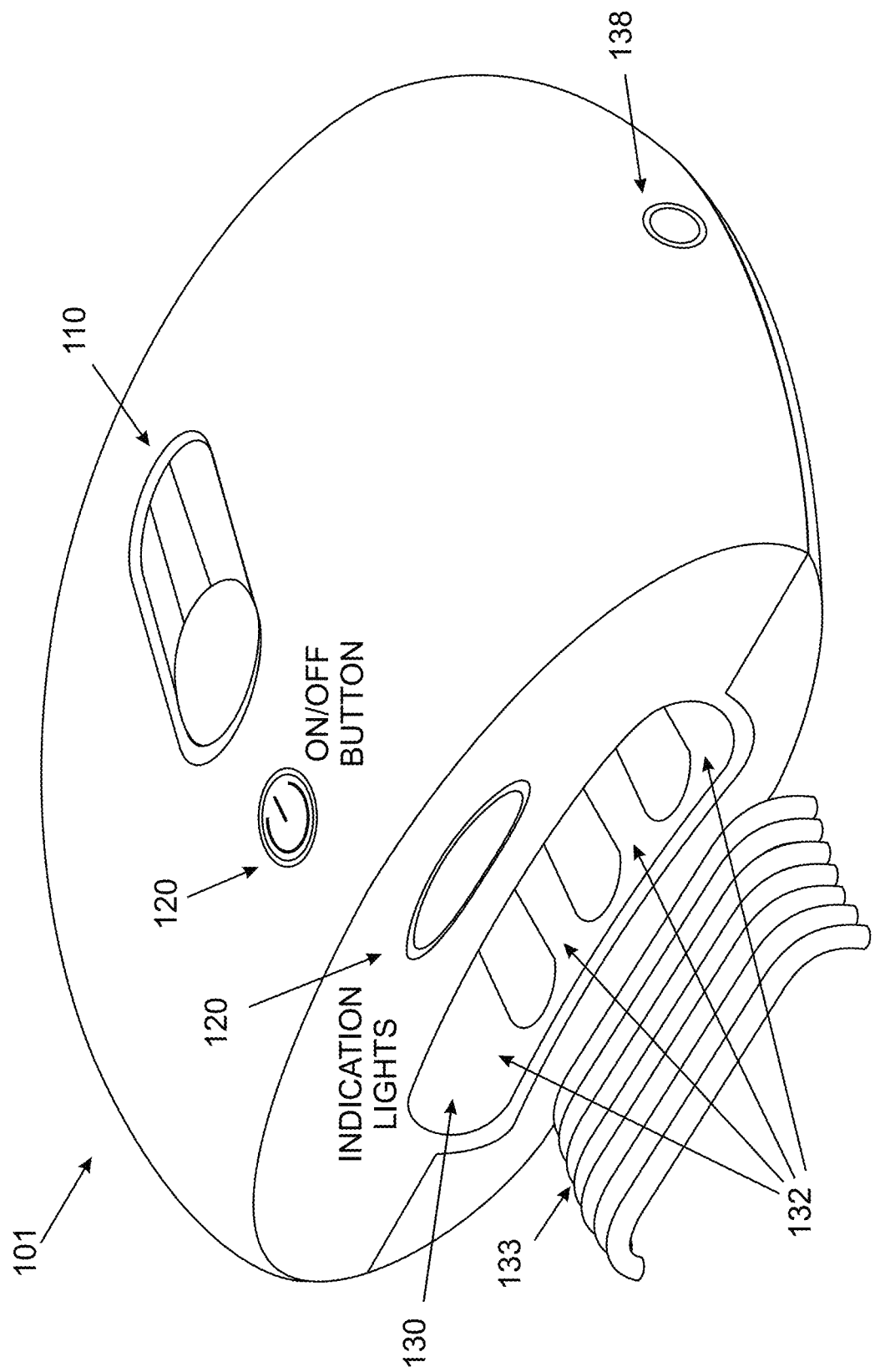
FIG. 20A and FIG. 20B are perspective side and top views of an exemplary nail polish application apparatus, according to some embodiments of the present invention.
Figure 20B:
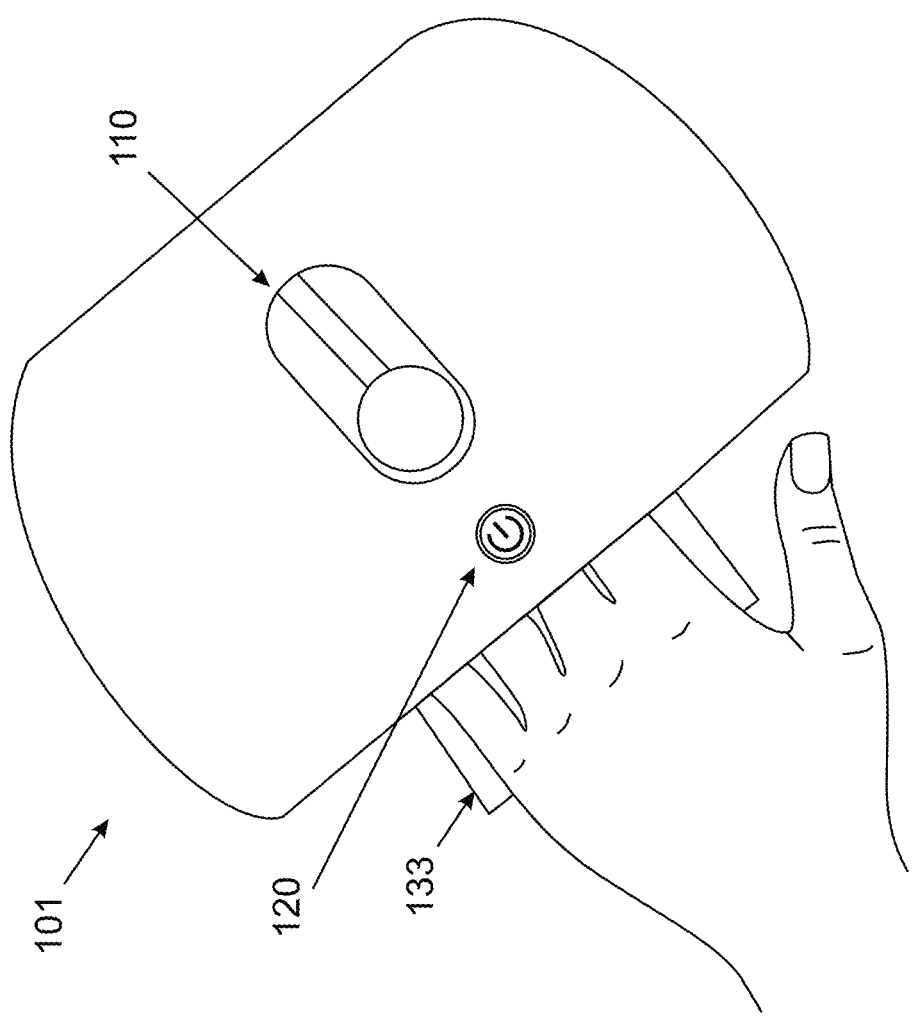

Reference is now made to FIG. 20A and FIG. 20B, which are perspective side and top views of an exemplary nail polish application apparatus, according to some embodiments of the present invention. An exemplary nail polish application apparatus 101 demonstrates an exemplary industrial and functional design which may be applied to one or more of the presented nail polish application apparatuses, for example, the nail polish application apparatus 101A and/or the nail polish application apparatus 101B. The nail polish application apparatus 101 comprises an enclosure made of one or more materials, for example, plastic, metal, complex materials and/or the like which contains the operational elements of described for the nail polish application apparatus 101A and/or the nail polish application apparatus 101B. While most of the operational elements of the nail polish application apparatus 101 may not be visible as they may be internal, at least some of the features presented for the nail polish application apparatus 101A and/or 101B may be seen. The nail polish application apparatus 101 may include an exemplary nail polish applying space such as the nail polish applying space 130. The exemplary nail polish applying space 130 includes 4 finger sockets such as the finger socket 132 to host the four fingers (excluding the thumb) of the user. The nail polish application apparatus 101 further a hand rest ledge such as the hand rest ledge 133 allowing the user to comfortably rest his hand while placing his fingers in the finger sockets 132.

The nail polish application apparatus 101 includes a capsule compartment such as the capsule compartment 110 (and/or 160) adapted to receive and accommodate a disposable capsule such as the capsule 300. The capsule compartment 110 further includes a lid (a cover) that may be closed after inserting the capsule 300 into the capsule compartment 110. The nail polish applying space 130 also includes an exemplary user interface such as the user interface 120 comprising status indication lights, for example, operational status, Bluetooth connection status and mobile device platform type (e.g. iOS, Android, etc.) of the connected (paired) mobile device of the user. The exemplary user interface 120 further includes an ON/OFF push button.

The nail polish application apparatus 101 further includes a nail polish removal space such as the nail polish removal space 138 in which nail polish reside may be removed from the nail surface(s) to which the user wishes to apply the new nail polish fluid 310.

Figure 21:
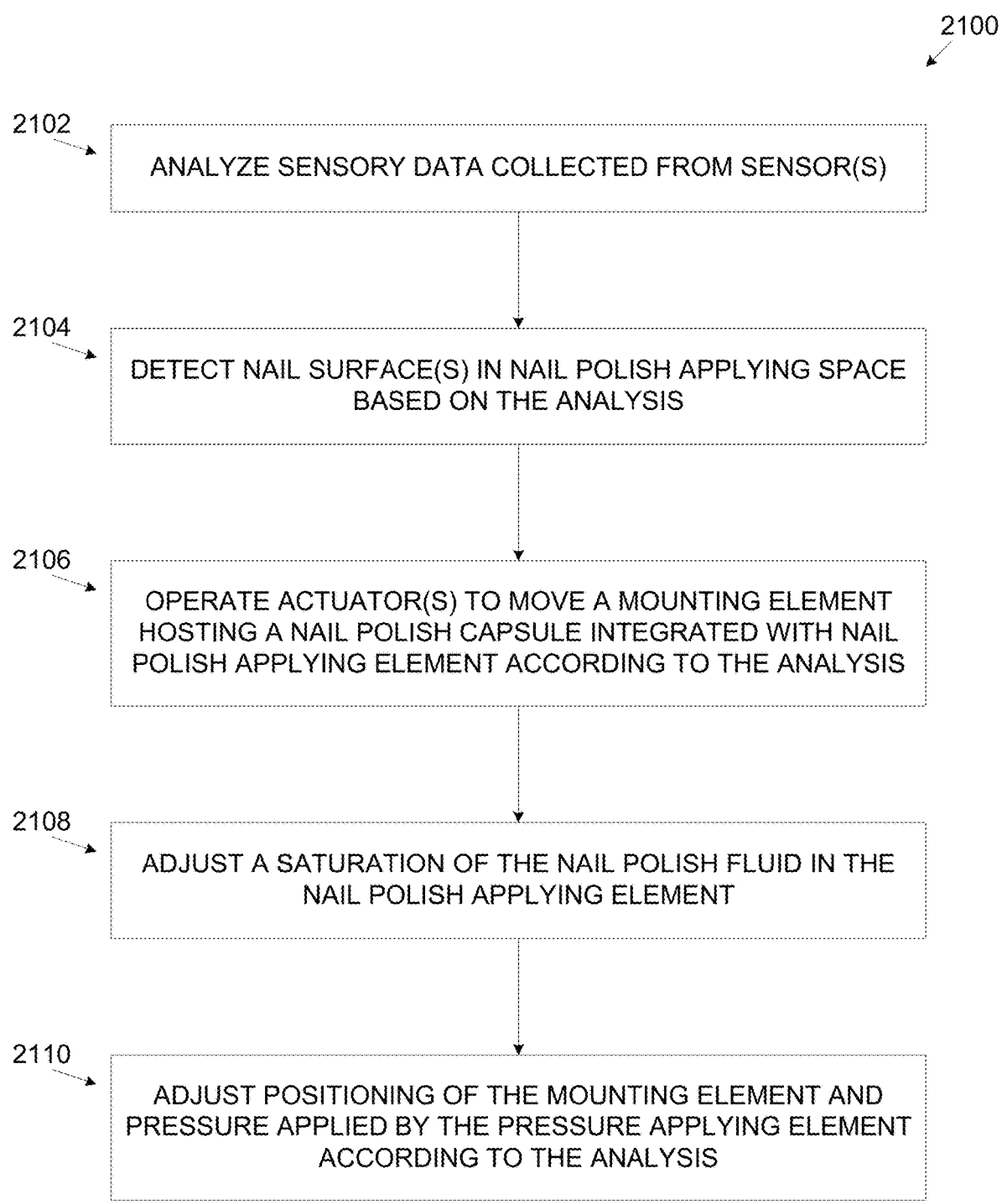
FIG. 21 is a flow chart of an exemplary process of automatically applying nail polish fluid to nail surface(s), according to some embodiments of the present invention.

Reference is now made to FIG. 21, which is a flow chart of an exemplary process of automatically applying nail polish fluid to nail surface(s), according to some embodiments of the present invention. An exemplary process 1900 of automatically applying nail polish to one or more nail surfaces may be executed by a nail polish application apparatus such as the nail polish application apparatus 101, in particular, the nail polish application apparatus 101A, 101B and/or 101C.

As shown at 2102, the automatic nail polish application process 1900 starts with a control unit such as the control unit 102 analyzing sensory data collected form one or more sensors such as the sensors 112 depicting one or more spaces of the nail polish application apparatus 101, for example, the nail polish applying space 130, the preparation space 134 and/or the drying space 136. The control unit 102 may continuously repeat this step throughout the process 1900 to receive updated sensory data. The control unit 102 may further continuously analyze the sensory data in order to automatically control one or more operations of the operational elements of the nail polish application apparatus 101.

As shown at 2104, based on the analysis of the sensory data, the control unit 102 may detect one or more nail surfaces of the user, for example, a finger nail surface and/or a toe nail surface in the nail polish applying space 130.

Optionally, the control unit 102 analyzes the sensory data, for example, one or more images to estimate compliance of the detected nail surface(s) for nail polish application.

The control unit 102 may verify one or more capsules such as the capsule 300 containing nail polish fluid such as the nail polish fluid 310 are properly inserted in one or more capsule compartments such as the capsule compartments 110 and/or 160. The control unit 102 may further verify a nail polish applying element such as the nail polish applying element 304 is properly hosted by a mounting element such as the mounting element 108. For the nail polish application apparatus 101A, the control unit 102 may verify the capsule 300 is properly inserted in the capsule compartments 110. For the nail polish application apparatus 101B, the control unit 102 may verify the capsule 300 is properly inserted in the capsule compartments 160 and that the nail polish applying element 304 is properly locked in a fixture such as the fixture 162. For the nail polish application apparatus 101C, the control unit 102 may verify the nail polish applying element 304 is properly locked in a fixture such as the fixture 172. Optionally, the control unit 102 analyzes the sensory data, for example, the image(s) to estimate quality compliance of the capsule 300. Optionally, for the nail polish application apparatus 101C, the control unit 102 analyzes the sensory data, for example, the image(s), a fluid level sensor and/or the like to estimate existence and/or amount of the nail polish fluid 310 in one or more nail polish fluid containers such as the nail polish fluid container 170.

Optionally, the control unit 102 initiates one or more preparation operations, for example, removing a cover from the capsule(s) 300, shaking the capsule(s) 300 to achieve a homogenous composition of the nail polish fluid 310 contained in the capsule(s) 300, calibrating a positioning of the nail polish applying element 304 with respect to one or more reference points, cleaning the nail polish applying element 304, puncturing the capsules' body portion 302, estimating a saturation level of the nail polish applying element 304 with the nail polish fluid 310, estimating viscosity of the nail polish fluid 310 and/or the like. One or more of the preparation operations may be conducted in the nail polish applying space 130 and/or in the preparation space 134 if available by the nail polish application apparatus 101.

As shown at 2106, based on the analysis of the sensory data, the control unit 102 operates one or more actuators such as the actuator 104 to move the mounting element 108 in a longitudinal axis, a lateral axis across the nail polish applying space 130. In addition, the control unit 102 may operate the actuator(s) 104 to rotate (tilt) the mounting element 108 around the longitudinal axis. The actuator(s) 104 may further move the mounting element 108 in an axis which is substantially perpendicular to the nail surface(s). The control unit 102 operates the actuator(s) 104 to maneuver the mounting element 108 such that the nail polish applying element 304 hosted by the mounting element 108 is properly located and positioned with respect to a location and position of the nail surface(s) to allow the nail polish applying element 304 to dispense the nail polish fluid on the nail surface(s).

As shown at 2108, the control unit adjusts the saturation level of the nail polish fluid in the dispensing head of the nail polish applying element 304. In case of the nail polish application apparatuses 101A and/or 101B, the control unit 102 controls and/or operates a pressure applying element such as the pressure applying 106, for example, the pressure applying 106A, 106B, 106C, 106D, 106E, 106F and/or 106G. The pressure applying 106 may apply pressure to a body portion such as the body portion 302 of the capsule 300 to force extrusion of the nail polish fluid 310 from the body portion 310 through a discharge nozzle such as the discharge nozzle 306 to the nail polish applying element 304. The control unit may analyze the sensory data to detect the flow rate of the nail polish fluid 310 to the nail polish applying element 304. The control unit 102 may adjust the flow rate, for example, maintain, increase or decrease by operating accordingly the pressure applying element 106 to maintain, increase or decrease the pressure applied to the body portion 302. Optionally, the control unit 102 controls the pressure applying element 106 to maintain a predefined pressure in order to maintain a constant flow rate to the nail polish applying element 304. In case of the nail polish application apparatuses 101C, based on the sensory data analysis, in particular estimation of the saturation level of the nail polish fluid in the dispensing head of the nail polish applying element 305, the control unit 102 may operate the actuator(s) 104 to maneuver the mounting element 108 to dip the nail polish applying element 305 in the nail polish fluid container 170.

As shown at 2110, the control unit 102 may continuously, throughout the nail polish application process 1900, collect new sensory data from the sensors 112 and adjust the movement of the mounting element 108 (by operating the actuator(s) 104 accordingly) and/or the flow rate of the nail polish fluid by operating the pressure applying element 106 accordingly.

The process 1900 may be repeated over and over until the nail polish application process is done, i.e. the control unit 102 determines based, for example, on the analysis of the sensory data that the nail polish fluid is properly applied to the nail surface(s). Optionally, the process 1900 is stopped, paused and/or resumed manually by the user of the nail polish application apparatus 101.

Optionally, the control unit 102 control one or more drying elements such as the drying element 116 to dry the nail polish fluid 310 after applied to one or more of the nail surfaces of the user. The drying operation may be conducted in the nail polish applying space 130 and/or in the drying space 136 if available by the nail polish application apparatus 101.

Optionally, the control unit 102 indicates to the user of one or more status indications during the nail polish application process 1900, for example, a current phase, a time remaining to current phase completion, a time remaining to completion of the process 1900, a communication status and/or the like.

Optionally, the control unit 102 communicates with one or more remote devices, for example, a remote node and/or a mobile device of the user. The control unit 102 may communicate with the remote device(s) before, during and/or after completion of the process 1900.

It is expected that during the life of a patent maturing from this application many relevant methodologies, materials and/or substances will be developed and the scope of the terms nail polish fluid is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A nail polish application apparatus, comprising:
   at least one sensor adapted to image the nail polish applying space having a target nail surface therein and generate sensory data accordingly;
   a container containing a nail polish fluid;
   at least one actuator having a nail polish applying element mounted thereto;
   a control unit adapted to:
      perform an analysis of the sensory data, and
      operate, based on the analysis, the at least one actuator to move the nail polish applying element to adjust a saturation level of the nail polish fluid in the nail polish applying element.

2. The nail polish application apparatus of claim 1, wherein the control unit is adapted to change a pressure applied by the nail polish applying element on a target nail according to an outcome of the analysis.

3. The nail polish application apparatus of claim 1, wherein the control unit is adapted to estimate the saturation level of the nail polish applying element with the nail polish according to the analysis; wherein the control unit is adapted to operate, based on the saturation level, the at least one actuator.

4. The nail polish application apparatus of claim 1, wherein the control unit is adapted to estimate a viscosity of the nail polish fluid according to the analysis; wherein the control unit is adapted to operate, based on the viscosity, the at least one actuator.

5. The nail polish application apparatus of claim 1, wherein the nail polish applying element having a cover detached from the container.

6. The nail polish application apparatus of claim 1, further comprising at least one finger socket in the nail polish applying space, the at least one finger socket having a surface shaped to receive and accommodate at least one of: a human finger and a human toe.

7. The nail polish application apparatus of claim 6, further comprising at least one finger restriction element adapted to limit a movement of a respective finger of a user when the respective finger is placed in the at least one finger socket.

8. The nail polish application apparatus of claim 6, further comprising at least one hand restriction element adapted to limit a movement of a palm of a user when at least one finger of a user is placed in the at least one finger socket.

9. The nail polish application apparatus of claim 6, wherein the at least one finger socket further comprising an actuator to actuate at least one skin pushing element adapted to push skin of a fingertip of the finger placed in the at least one finger socket, the at least one skin pushing element is adapted to at least one of:
   push backward skin under the nail surface of the finger, and
   push sideways skin on at least one side of the nail surface.

10. The nail polish application apparatus of claim 1, further comprising a hand resting ledge in front of the polish applying space, the hand resting ledge having a surface shaped to receive and accommodate a palm of a user.

11. The nail polish application apparatus of claim 1, further comprising the nail polish applying space is constructed to reduce external lighting coming in from outside the nail polish applying space.

12. The nail polish application apparatus of claim 1, wherein the nail polish fluid comprises at least one member of a group consisting of: a nail polish fluid, a base coating fluid, a top coating fluid, a gel polish, a drying material, a polish removal fluid, a nail art polish fluid and a medical nail treatment fluid.

13. The nail polish application apparatus of claim 1, wherein the control unit is further adapted to conduct at least one preparation operation on the nail polish applying element prior to applying the nail polish fluid, the at least one preparation operation is calibrating a positioning of the nail polish applying element in relation to the target nail.

14. The nail polish application apparatus of claim 1, wherein the control unit is further adapted to conduct at least one preparation operation on the nail polish applying element prior to applying the nail polish fluid, the at least one preparation operation is estimating the saturation level of the nail polish applying element and adjusting the saturation level.

15. The nail polish application apparatus of claim 1, further comprising at least one nail polish drying element comprising an air blower, a heating element, applying a drying solvent or any combination thereof and the nail polish drying element adaptable, to dry the nail polish fluid before, after and/or during applied to the nail surface, the at least one nail polish drying element is adapted to dry the nail polish fluid in at least one of:
   the nail polish applying space, and
   a dedicated drying space comprising at least one drying socket shaped to receive and accommodate at least one of: a human finger and a human toe.

16. The nail polish application apparatus of claim 15, further comprising the at least one nail polish drying element is moveable by the at least one actuator operated by the control unit.

17. The nail polish application apparatus of claim 1, further comprising at least one nail polish removal element comprising a material infused with polish removal solvent for removing nail polish residue from the nail surface, the at least one nail polish removal element is located and adapted to remove the nail polish residue in at least one of: a nail polish removal space comprising at least one nail polish removal socket and the nail polish applying space, the at least one nail polish removal socket is shaped to receive and accommodate at least one of: a human finger and a human toe.

18. The nail polish application apparatus of claim 1, wherein the at least one sensor is an imaging sensor operated by the control unit to capture at least one image depicting the nail polish applying space during a nail polish application session, and wherein the sensory data used for the analysis comprises the at least one image.

19. The nail polish application apparatus of claim 1, wherein the control unit operates the at least one actuator to maneuver the nail polish applying element to dip in a plurality of containers comprising the container.

20. A method of applying nail, comprising:
  imaging a nail polish applying space having a target nail surface therein and generate sensory data accordingly;
  perform an analysis of the sensory data,
  operate, based on the analysis, at least one actuator to move the nail polish applying element adjust a saturation level of the nail polish fluid in the nail polish applying element.

\* \* \* \* \*